(12) United States Patent
Pham et al.

(10) Patent No.: US 10,423,241 B1
(45) Date of Patent: Sep. 24, 2019

(54) DEFINING OPERATING AREAS FOR VIRTUAL REALITY SYSTEMS USING SENSOR-EQUIPPED OPERATING SURFACES

(71) Applicant: Amazon Technologies, Inc., Seattle, WA (US)

(72) Inventors: Dominick Khanh Pham, Seattle, WA (US); William R. Hazlewood, Seattle, WA (US); Christina Nichole Durbin, Seattle, WA (US); Charles Shearer Dorner, Seattle, WA (US); Alaa-Eddine Mendili, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 88 days.

(21) Appl. No.: 15/665,170

(22) Filed: Jul. 31, 2017

(51) Int. Cl.
*G06F 3/03* (2006.01)
*G06F 3/01* (2006.01)

(52) U.S. Cl.
CPC ............ *G06F 3/0325* (2013.01); *G06F 3/016* (2013.01)

(58) Field of Classification Search
CPC .......... G06F 3/011; G06F 3/016; G06F 3/017; G06F 3/038; G06F 3/0426; G06F 3/0304; G06F 3/04883; G06F 3/012; G06F 3/0346; G06F 3/04842; G06F 2203/04101; G06F 3/005; G06F 3/01; A63F 13/428; A63F 13/26; A63F 13/23; A63F 13/24; A63F 13/213; A63F 13/426; A63F 13/5255; A63F 13/98; A63F 13/215; A63F 2300/538; A63F 13/25; G06K 9/00375; G09G 5/00; H04N 13/271; G06T 19/003; G06T 19/006
See application file for complete search history.

(56) References Cited

U.S. PATENT DOCUMENTS

| | | | |
|---|---|---|---|
| 5,913,727 A | 6/1999 | Ahdoot | |
| 7,382,267 B2 | 6/2008 | Brendley et al. | |
| 7,456,755 B2 | 11/2008 | Blum et al. | |
| 7,746,321 B2* | 6/2010 | Banning | G03B 21/00 345/157 |
| 7,885,002 B2 | 2/2011 | Choi | |
| 8,766,763 B2* | 7/2014 | Takeuchi | G01S 5/16 340/3.1 |
| 8,992,315 B2 | 3/2015 | Lundback et al. | |
| 9,002,680 B2 | 4/2015 | Nurse et al. | |
| 9,849,369 B2 | 12/2017 | Maharbiz et al. | |
| 2005/0123171 A1 | 6/2005 | Kobayashi et al. | |
| 2007/0211027 A1* | 9/2007 | Ohta | G06F 3/0325 345/158 |
| 2012/0056717 A1 | 3/2012 | Maharbiz et al. | |

(Continued)

*Primary Examiner* — Bryan Earles
(74) *Attorney, Agent, or Firm* — Athorus, PLLC

(57) ABSTRACT

An operating area for a virtual reality system may be defined based on the positions of sensors (e.g., infrared sensors) or fiducial markings within an environment where the virtual reality system is to be operated. The sensors or the fiducial markings may be provided on an operating surface in the form of a carpet, a mat or another like floor covering. When the virtual reality system is to be calibrated prior to use, positions of the sensors or the fiducial markings may be sensed by a base station, a headset or another virtual reality system unit, and an operating area may be defined based on virtual boundaries constructed using such positions.

20 Claims, 30 Drawing Sheets

(56) References Cited

U.S. PATENT DOCUMENTS

| | | |
|---|---|---|
| 2012/0086729 A1 | 4/2012 | Baseley et al. |
| 2013/0260886 A1 | 10/2013 | Smith |
| 2015/0258432 A1* | 9/2015 | Stafford ................ A63F 13/213 463/32 |
| 2015/0265920 A1 | 9/2015 | Kim |
| 2015/0321606 A1 | 11/2015 | Vartanian et al. |
| 2016/0124502 A1* | 5/2016 | Sawyer ................ G02B 27/017 345/633 |
| 2016/0339337 A1 | 11/2016 | Ellsworth et al. |
| 2017/0090578 A1 | 3/2017 | Keller et al. |
| 2017/0203213 A1* | 7/2017 | Stafford .............. G06F 3/04815 |
| 2018/0093186 A1 | 4/2018 | Black et al. |
| 2018/0253601 A1* | 9/2018 | Koo ........................ H04W 4/02 |
| 2019/0033989 A1* | 1/2019 | Wang .................... G06F 3/0346 |

* cited by examiner

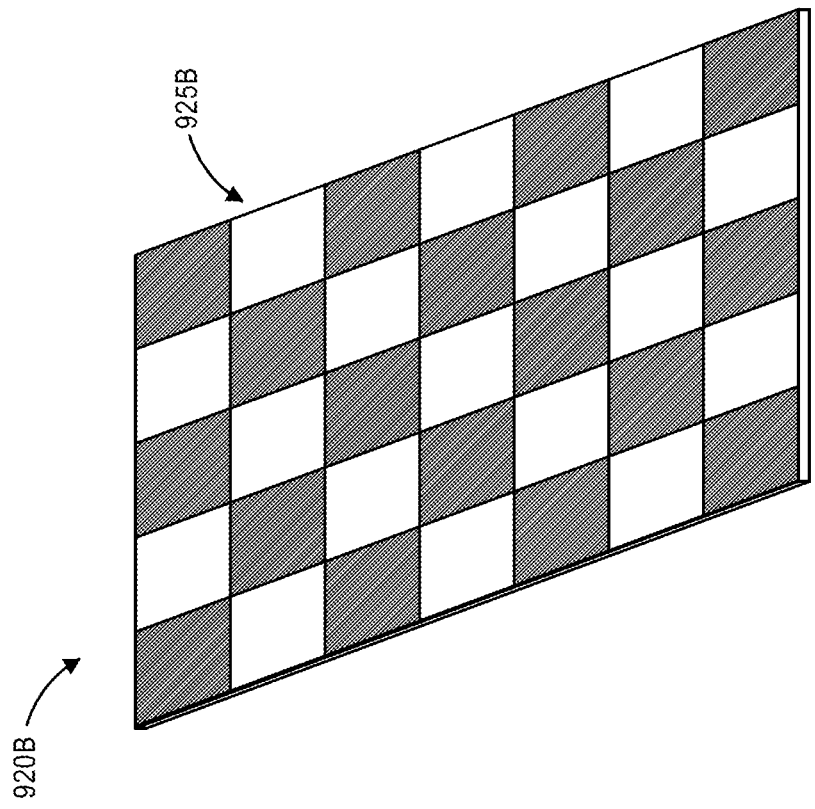
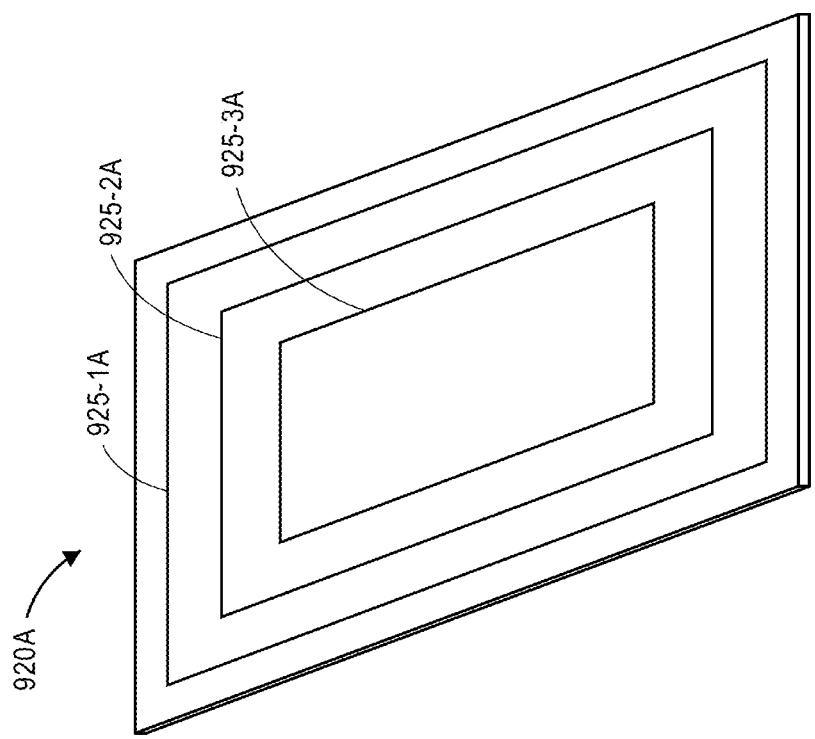

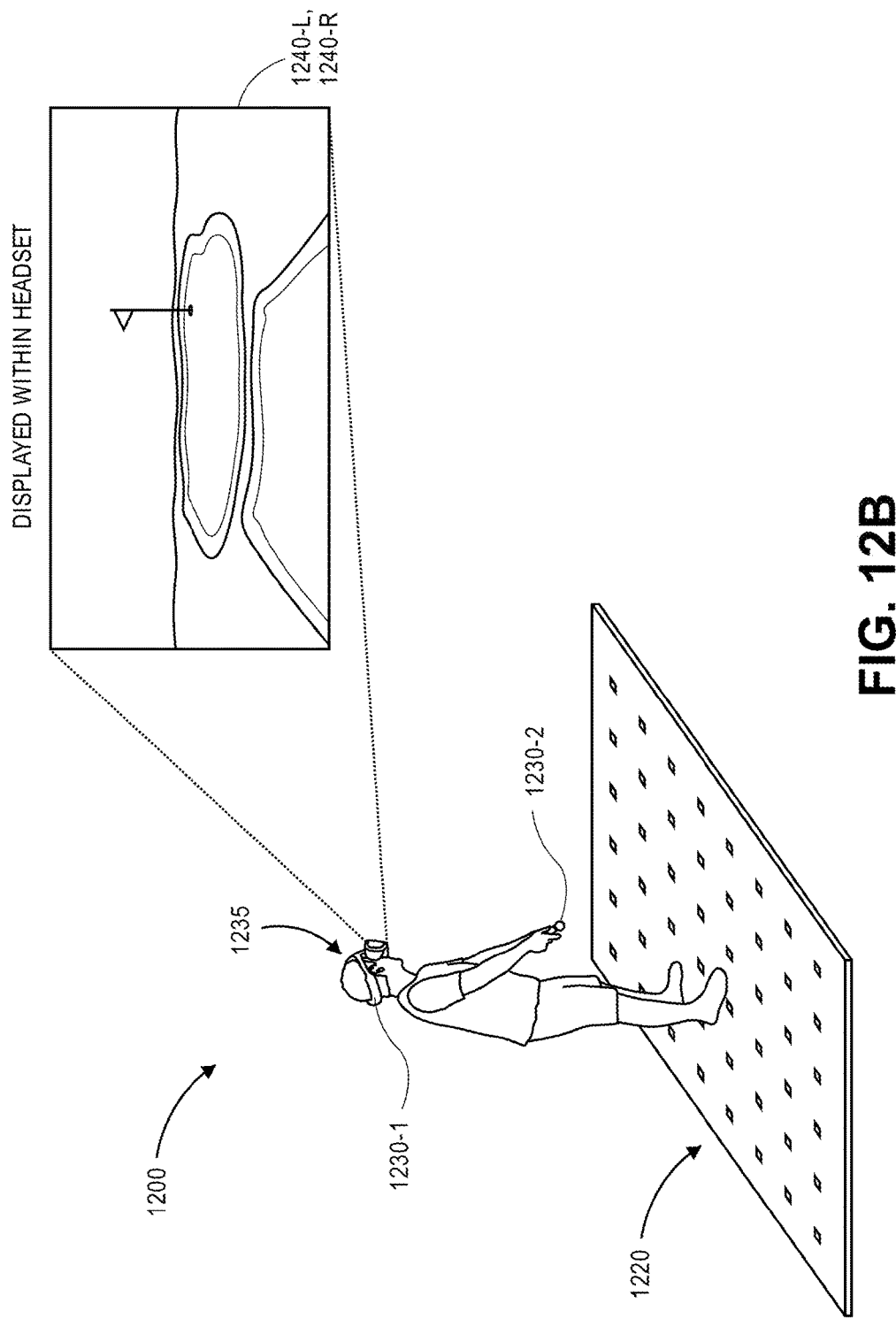

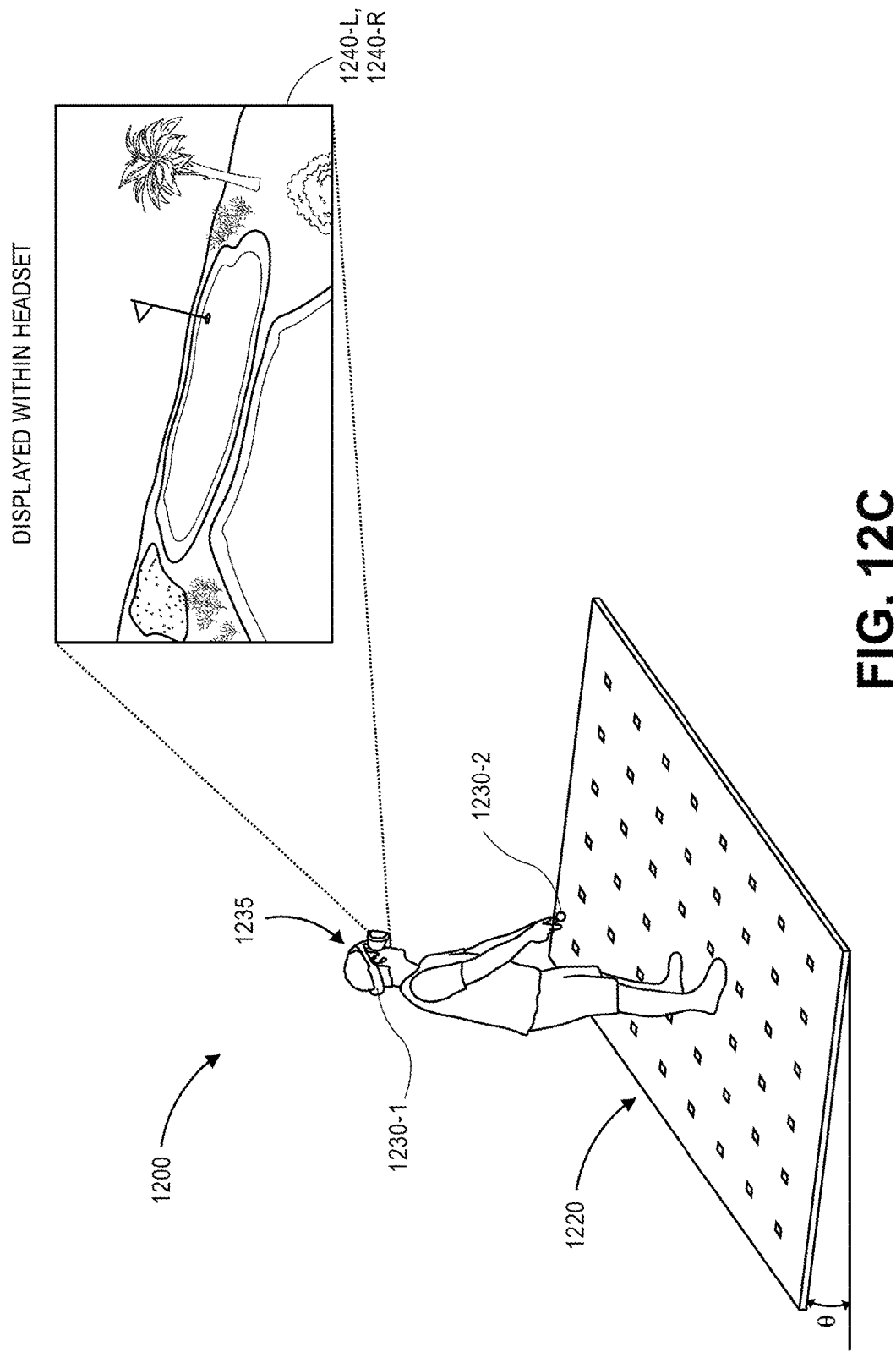

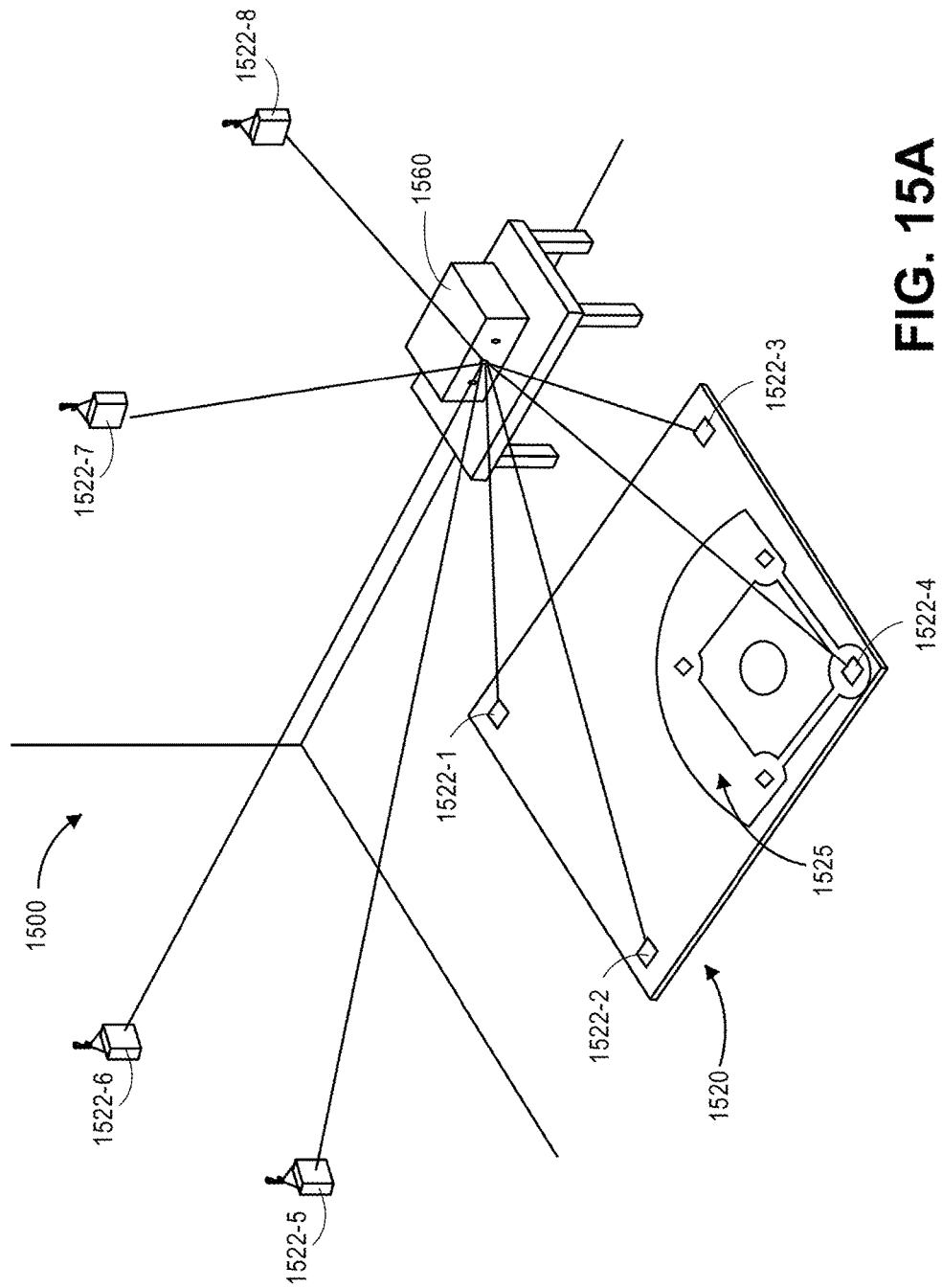

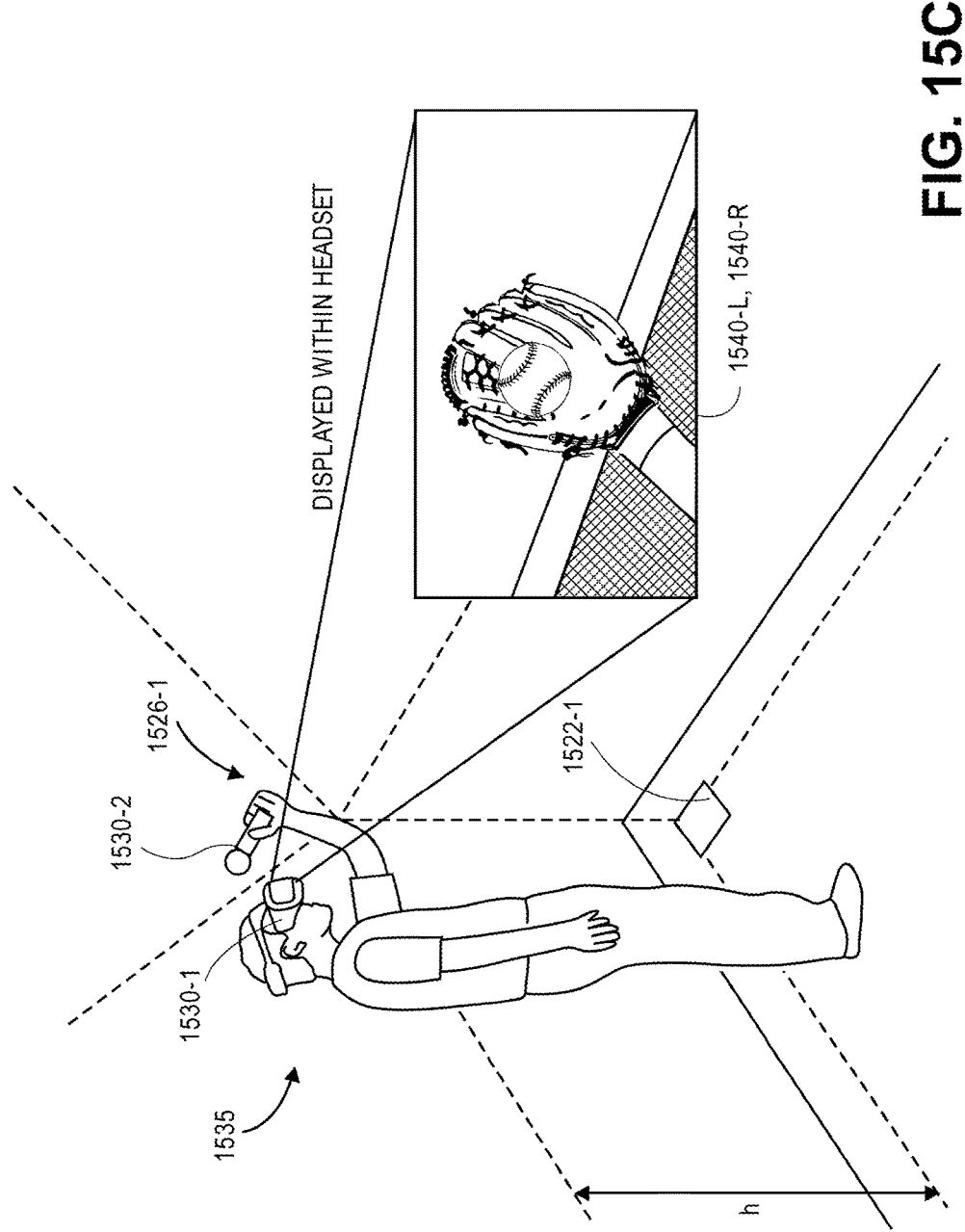

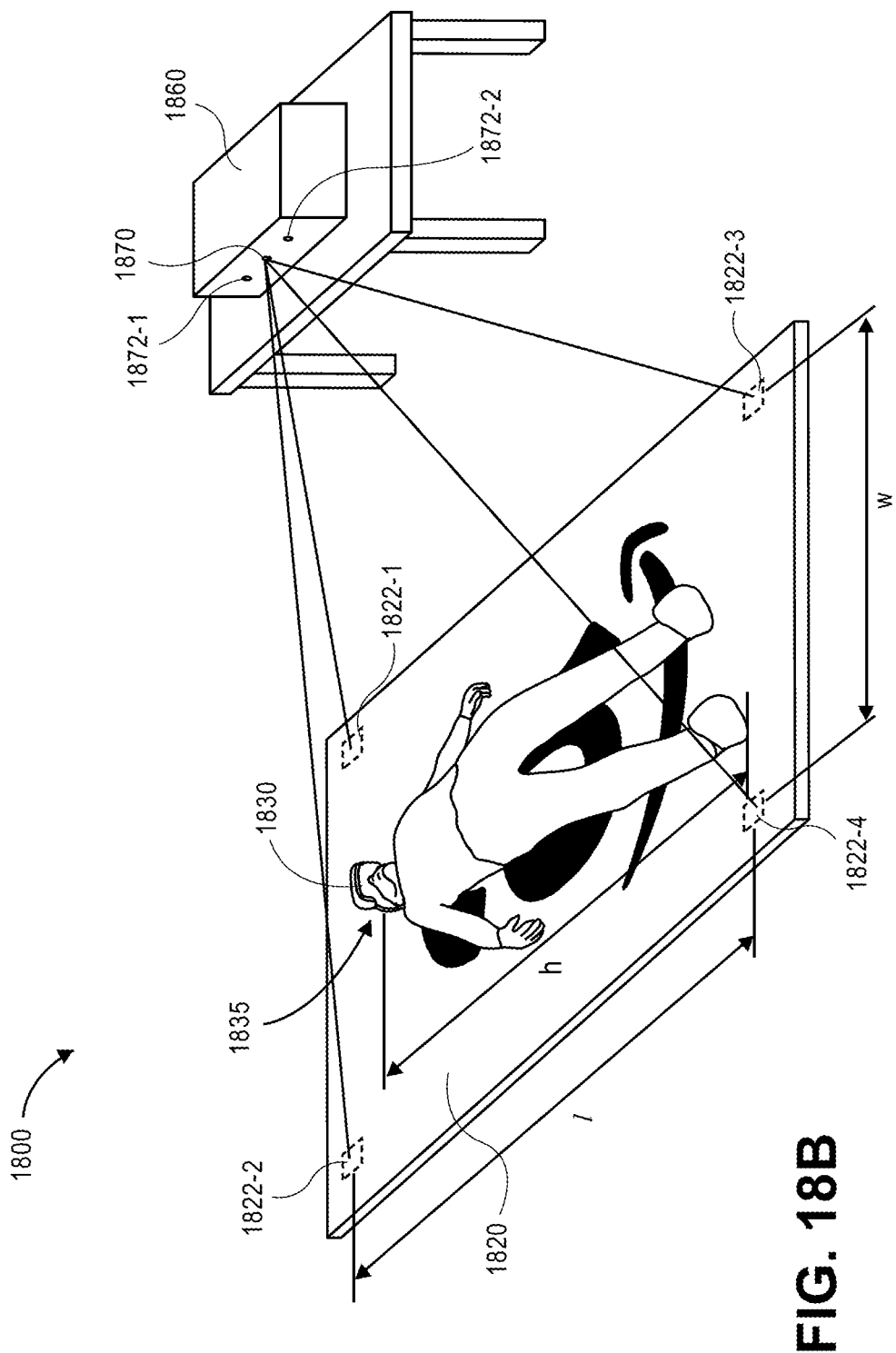

DEFINING OPERATING AREAS FOR VIRTUAL REALITY SYSTEMS USING SENSOR-EQUIPPED OPERATING SURFACES

BACKGROUND

Virtual reality systems (or "virtual environment systems," or "virtual reality environments") are configured to provide an enhanced graphical experience to users of computers, and to effectively immerse the users within their respective computing environments. Virtual reality systems may include any number of monitors or other displays, as well as one or more motion sensors that may be used to track positions and/or motion of one or more limbs or other body parts. In some instances, virtual reality systems include monitors, displays and/or sensors that may be worn on or about the human body. By rendering visual information in a three-dimensional orientation around a user, and tracking the user's movements or other responses to the rendered information, a virtual reality system may permit the user to physically interact with aspects of a simulated environment from within an actual, real-world environment. Currently, virtual reality systems are used not only in graphical applications such as video games or movies but also in other computing environments or platforms such as for virtual training (e.g., for simulating the performance of expensive or complex tasks such as surgical procedures or military operations), virtual modeling (e.g., for describing planned physical structures, such as physical structures that are under construction) or like applications, with the goal of virtually simulating an actual environment to the maximum extent practicable.

Many virtual reality systems must be calibrated prior to use, with the goal of establishing a space, sometimes called a "play area," surrounded by one or more "virtual boundaries," within an actual environment within which a user may operate while interacting with a simulated environment. In some instances, calibrating a virtual system to establish a play area involves tracking one or more portions of a user's body as the user executes one or more gestures or poses within the actual environment. Virtual boundaries may be defined based on the tracked motion of the user's body which, presumably, does not come into contact with any walls, furniture or other obstacles during a calibration process. Once a play area has been established, a user who is within the play area may be alerted by the virtual reality system when he or she has approached or breached a virtual boundary, and may be prompted to return to the play area accordingly.

Currently, many virtual reality systems are plagued by a number of limitations. For example, a play area typically must be established according to one or more calibration processes each time that a virtual reality system is used in a new location. As virtual reality systems become smaller and more portable, this requirement becomes more and more cumbersome. Additionally, not every virtual reality application requires a play area of the same size. Moreover, most virtual reality systems assume that a floor within a play area is perfectly flat, when this assumption frequently does not coincide with reality.

BRIEF DESCRIPTION OF THE DRAWINGS

FIGS. 9A and 9B are views of some operating surfaces in accordance with embodiments of the present disclosure.

FIGS. 12A through 12D are views of aspects of one virtual reality system in accordance with embodiments of the present disclosure.

FIGS. 15A through 15C are views of aspects of one virtual reality system in accordance with embodiments of the present disclosure.

FIGS. 18A and 18B are views of aspects of one virtual reality system in accordance with embodiments of the present disclosure.

DETAILED DESCRIPTION

As is set forth in greater detail below, the present disclosure is directed to systems and methods for defining operating areas for virtual reality systems. More specifically, some of the embodiments of the present disclosure are directed to virtual reality systems that may determine dimensions or attributes of areas of an actual environment in which such systems are operated. In some embodiments, such dimensions or attributes may be determined using operating surfaces that may be placed on floors, or suspended from walls or other locations within such areas. In some embodiments, operating surfaces may be outfitted with one or more sensors. Positions of such sensors may be determined by base stations, headsets or other units or components of a virtual reality system, and virtual boundaries, surface features or other attributes of an operating area associated with the virtual reality system may be determined based on such positions. In some embodiments, operating surfaces may be marked with fiducial markings in the form of one or more colors, patterns, logos or other features. Images of the operating surfaces may be captured by base stations, headsets or other units or components of a virtual reality system, and virtual boundaries, surface features or other attributes of an operating area associated with the virtual reality system may be determined based on an analysis of the imaging data. Once the virtual boundaries, surface features or other attributes of the operating area have been determined, a virtual reality system may incorporate such boundaries, surface features or other attributes into a virtual reality experience, such as by customizing the virtual reality experience to account for aspects of an actual environment in which the virtual reality system is operated.

Referring to FIGS. 1A through 1E, views of aspects of a virtual reality system 100 in accordance with embodiments of the present disclosure are shown. The system 100 includes an operating surface 120, a virtual reality headset 130 and a base station 160.

Figure 1A:
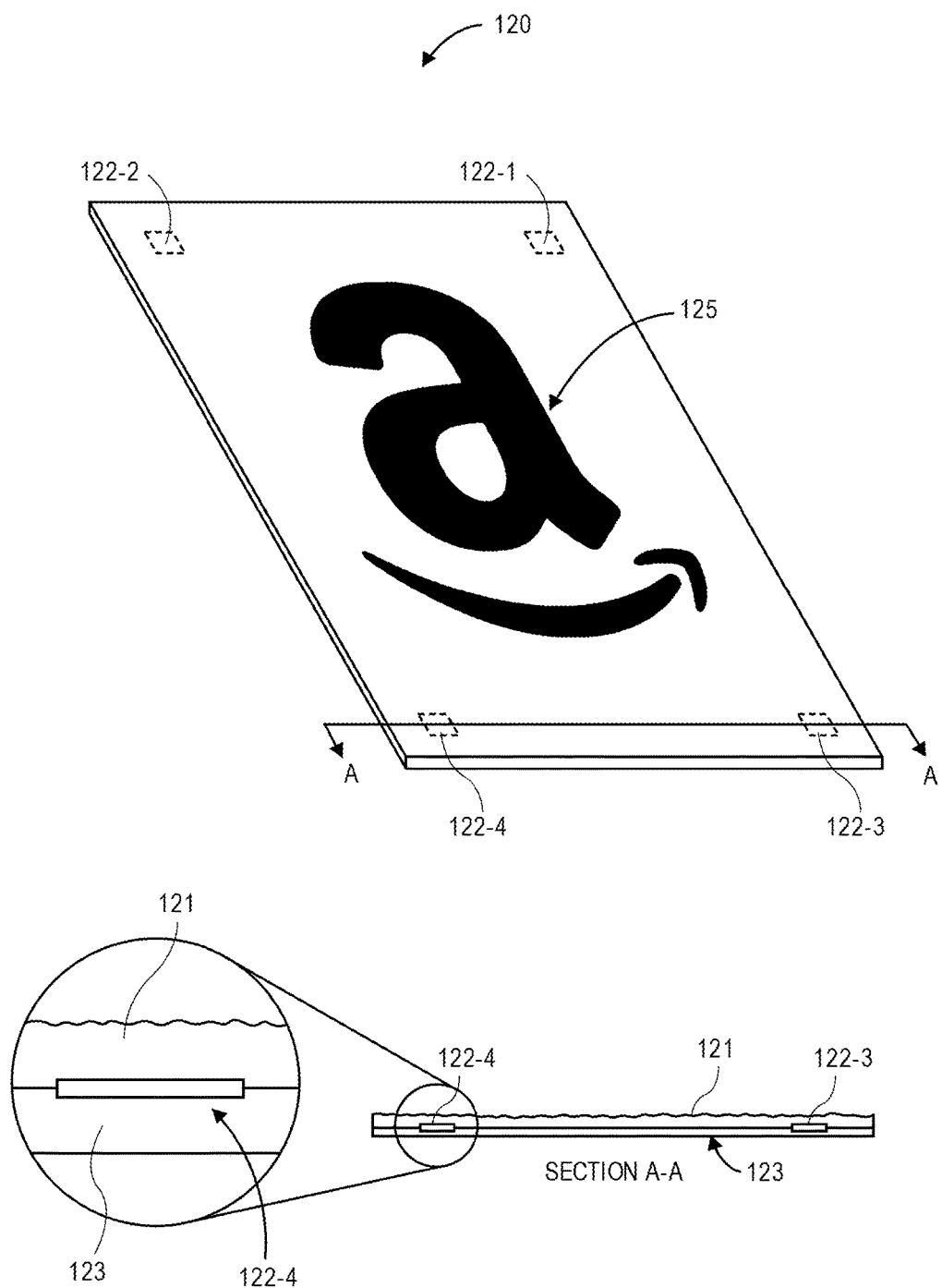
FIGS. 1A through 1E are views of aspects of a virtual reality system in accordance with embodiments of the present disclosure.

As is shown in FIG. 1A, the operating surface 120 includes a plurality of sensors 122-1, 122-2, 122-3, 122-4 disposed between an upper layer (or substrate) 121 and a lower layer (or substrate) 123. Additionally, a fiducial marking 125 is provided on a visible surface of the upper layer 121.

The operating surface 120 may take the form of a carpet, a mat, a drop cloth, a tarp, a sheet or any other covering that may be laid upon a floor or other traveling or working surface, which may include one or more other carpets, mats, drop cloths, tarps, sheets or other like coverings. The upper layer 121 may be formed from any material that is flexible and sufficiently durable to accommodate foot traffic thereon, including but not limited to natural or synthetic fibers (e.g., woven or non-woven fibers) or other substrates. The lower layer 123 may be formed from any material that is flexible and sufficiently durable to provide an interface between the upper layer 121 and a floor or other surface upon which the operating surface 120 is applied. In some embodiments, the lower layer 123 may be formed from the same material as the upper layer 121, or a different material. In some embodiments, the plurality of sensors 122-1, 122-2, 122-3, 122-4 may be embedded within a single, homogenous substrate that may be applied on a floor or other surface. In some embodiments, the plurality of sensors 122-1, 122-2, 122-3, 122-4 may also be placed, installed, embedded or mounted into or onto a floor or other surface, and a separate surface that binds one or more of the sensors 122-1, 122-2, 122-3, 122-4 to one another (e.g., the operating surface 120) need not be utilized. In still other embodiments, the operating surface 120 may be mounted, hung, draped or otherwise oriented vertically, or in any manner other than by applying the operating surface 120 atop a floor or other surface.

The sensors 122-1, 122-2, 122-3, 122-4 may be any type or form of component that is configured to transmit a signal to one or more corresponding components of the virtual reality headset 130 and/or the base station 160, or to receive a signal from one or more of such components and to determine or indicate their respective positions based on the transmission and capture of such signals. The signals transmitted or received by the sensors 122-1, 122-2, 122-3, 122-4 may be homogenous or identical in nature or, alternatively, may be uniquely configured to include any information, data or metadata associated with the operating surface 120, or one or more of the respective sensors 122-1, 122-2, 122-3, 122-4, the headset 130 and/or the base station 160.

The sensors 122-1, 122-2, 122-3, 122-4 may be configured to transmit and/or receive signals according to any protocol. In some embodiments, the sensors 122-1, 122-2, 122-3, 122-4 may be configured to emit and/or capture visible and/or invisible light, and to determine or indicate their respective positions based on the emission and capture of such light. For example, the sensors 122-1, 122-2, 122-3, 122-4 may include one or more photodiodes that are sensitive to light at one or more discrete wavelengths or frequencies (e.g., infrared light or radiation), or one or more light-emitting diodes ("LED") that are configured to emit light at such wavelengths or frequencies. In some embodiments, the sensors 122-1, 122-2, 122-3, 122-4 may be configured to emit and/or capture acoustic signals, and to determine or indicate their respective positions based on the emission and capture of such signals. In some embodiments, the sensors 122-1, 122-2, 122-3, 122-4 may be configured to transmit and/or receive Wireless Fidelity ("Wi-Fi"), signals, Bluetooth® signals, or any type or form of signals within any frequency spectra, and to determine or indicate their respective positions based on the transmission and capture of such signals. Each of the sensors 122-1, 122-2, 122-3, 122-4 may include one or more processors, memory components and/or power sources for transmitting or receiving signals therefrom. Alternatively, the operating surface 120 may include one or more processors, memory components and/or power sources that may be accessed or utilized by the sensors 122-1, 122-2, 122-3, 122-4 in a shared manner, e.g., by way of one or more conductors provided between the upper layer 121 and the lower layer 123, or elsewhere within the operating surface 120.

The fiducial marking 125 may be any single color, pattern or logo, or any other marking, or a collection of two or more colors, patterns, logos or markings, disposed on the visible surface of the upper layer 121. In some embodiments, the sizes, shapes or other attributes of the fiducial marking 125 may be specifically selected to generate a prominent, visual contrast with a floor or other surface upon which the operating surface 120 is to be applied. The virtual reality headset 130 and/or the base station 160 may be programmed or configured to recognize one or more attributes of the fiducial marking 125, e.g., depicted within imaging data captured by one or more sensors.

The virtual reality headset 130 may be any wearable or manually operable unit or component configured for executing one or more virtual reality applications, either autonomously or in conjunction with the base station 160. The headset 130 may include a frame, a strap or one or more features for mounting the headset 130 about a head and/or face of a user 135. For example, the headset 130 may include a frame having one or more openings that are formed or defined from any type or form of material such as one or more rubbers, woven or non-woven fabrics, plastics, composites, leathers, papers (e.g., cardboards) or the like that may be molded or shaped and configured for contact or alignment with left and right eyes of the user, respectively, and a strap that is formed from any suitable material that may flexibly mate the frame with the head or face of the user, including but not limited to rubbers, woven or non-woven fabrics, plastics (e.g., polyesters, nylons), composites, leathers, papers (e.g., cardboards) or the like. Alternatively, the headset 130 may include a temporary or basic frame formed from paper (e.g., cardboard) or light plastics that may be manually pressed against or aligned with the head or face of the user. Within such a frame, the headset 130 may include one or more computer displays that are aligned to render information to the left and right eyes of the user, respectively. The headset 130 may also include one or more imaging devices or other sensors that are aligned to capture imaging data (e.g., colors, textures, outlines or depth information or data) regarding the positions or orientations of aspects of the left and right eyes, respectively, of a user, based on visible light or invisible light (e.g., infrared light or radiation) reflected therefrom. The headset 130 may also include one or more other computer components (not shown), e.g., processors, memory components or the like, in communication with the displays or sensors, as well as one or more communications components (not shown), e.g., transmitters, receivers or transducers, for transmitting or receiving digital or analog data to or from one or more external computer devices, components or systems, including but not limited to the base station 160.

The base station 160 may be any computer-based unit or component that may be configured for executing one or more virtual reality applications, either autonomously or in conjunction with the headset 130. The base station 160 includes one or more sensors such as imaging devices (e.g., visual cameras and/or depth cameras), infrared emitters or receivers, acoustic emitters or receivers, Wi-Fi enabled devices, Bluetooth®-enabled devices, or the like. Accordingly, the base station 160 may be configured to detect the presence and location of the one or more sensors 122-1, 122-2, 122-3, 122-4 within an environment in which the system 100 is configured for operation, as well as the presence or absence of any objects within the environment. The base station 160 may also include one or more other computer components (not shown), e.g., processors, memory components or the like, in communication with the displays or sensors, as well as one or more communications components (not shown), e.g., transmitters, receivers or transducers, for transmitting or receiving digital or analog data to or from one or more external computer devices, components or systems, including but not limited to the headset 130 or any number of other virtual reality units or components. In some embodiments, the base station 160 may have all of the computer-related capabilities and/or components of the headset 130, and vice versa, except that the base station 160 need not be configured for wearing or use about a head and/or face of a user, or configured for operation while so worn.

Figure 1B:
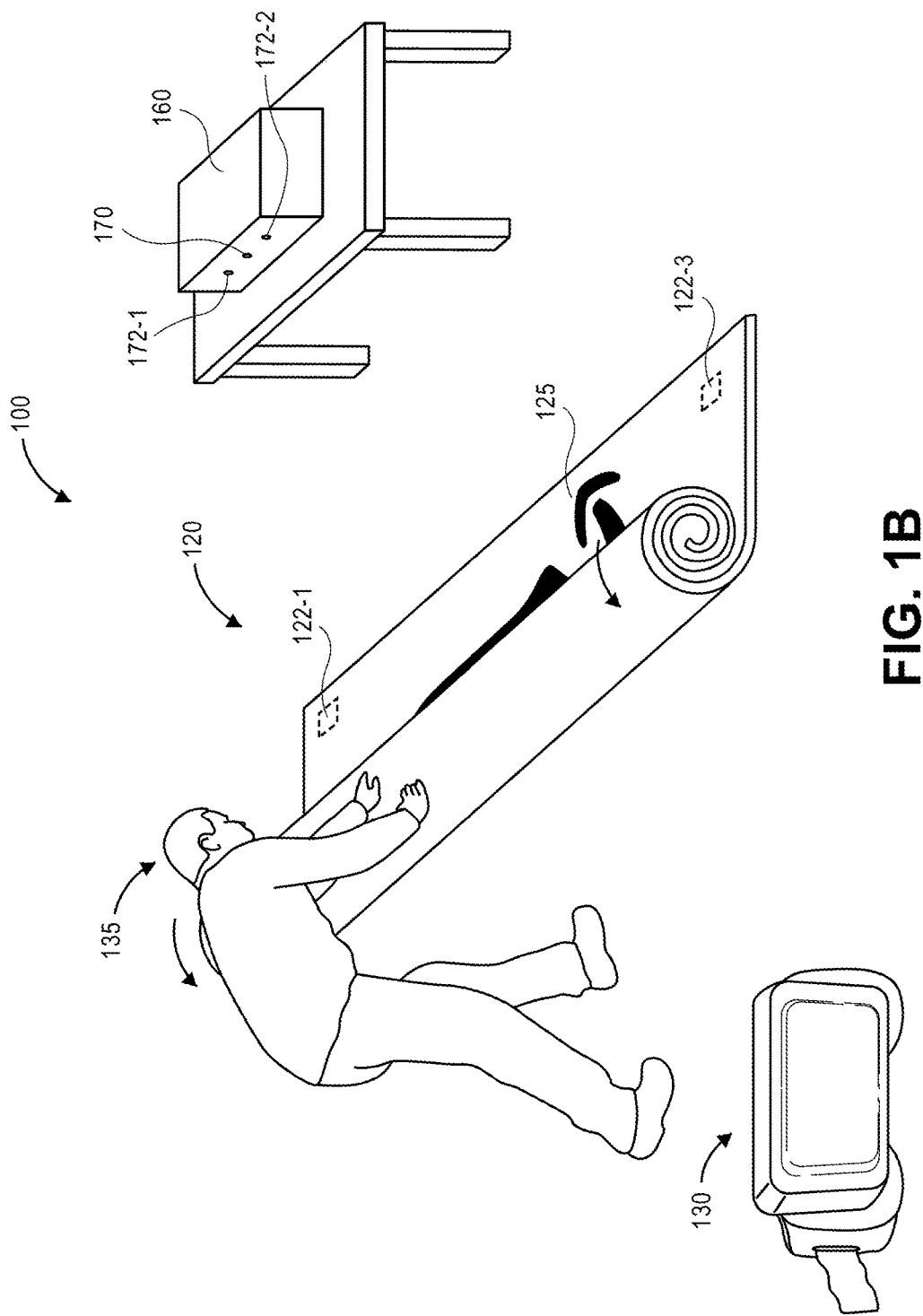
Figure 1C:
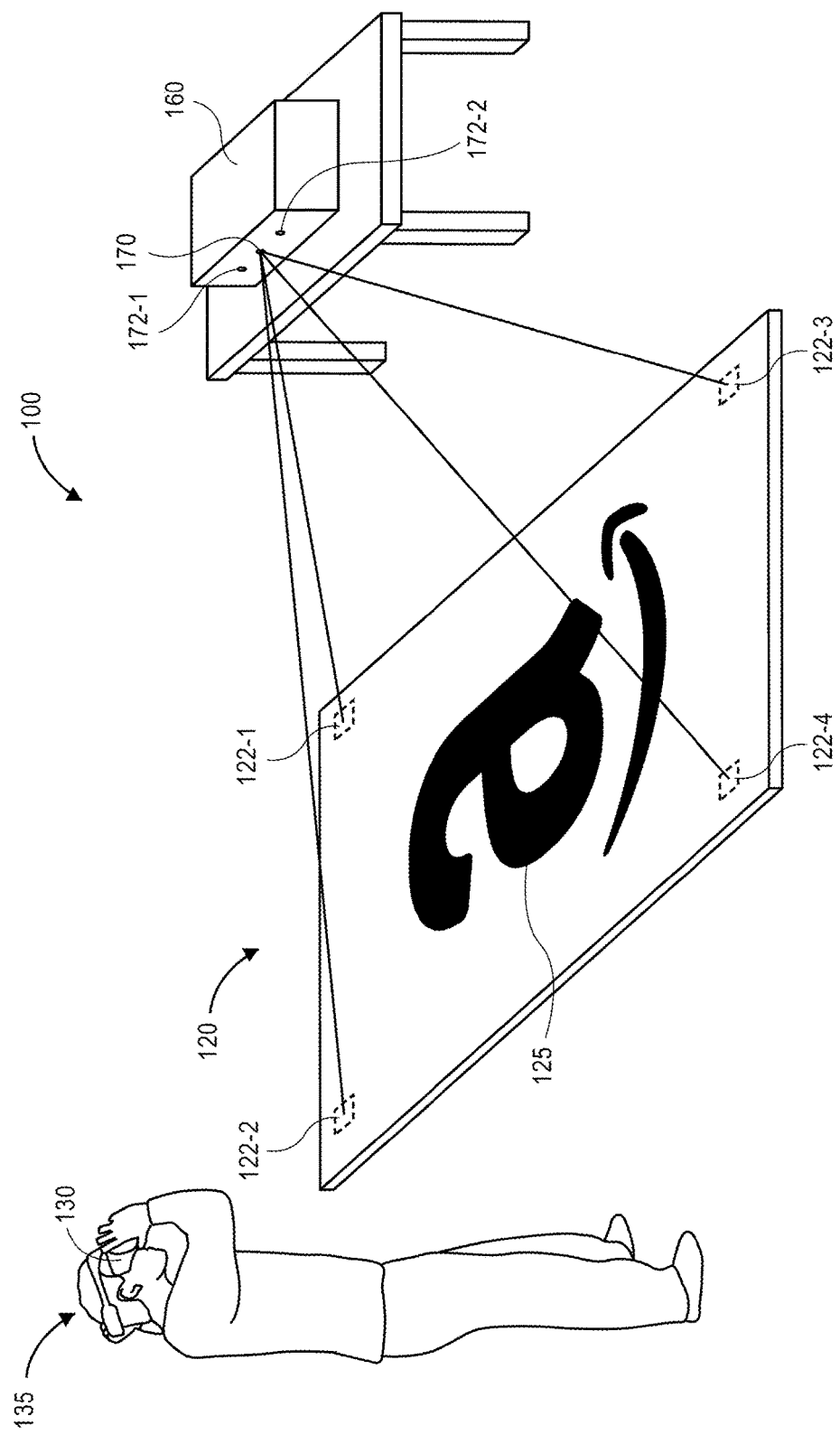

In accordance with the present disclosure, operating surfaces may be used to establish one or more virtual boundaries, and to thereby define an operating area, or "play area," for a virtual reality system based on such boundaries. In some embodiments, the virtual boundaries may include one or more virtual walls in the form of planar or non-planar surfaces. In some other embodiments, the virtual boundaries may include one or more virtual floors or ceilings in the form of planar or non-planar surfaces. As is shown in FIG. 1B, the user 135 may apply the operating surface 120 to a floor or other surface in an environment in which the system 100 is to be utilized, e.g., by unrolling or laying out the operating surface 120 on such a surface within an operating range of the base station 160 and/or one or more other network components (not shown). As is shown in FIG. 1C, after the operating surface 120 has been applied within the environment, the base station 160 may determine the respective positions of each of the sensors 122-1, 122-2, 122-3, 122-4, e.g., using an infrared transceiver 170. The base station 160 may also recognize one or more attributes of the operating surface 120, such as the fiducial marking 125, using a visual imaging device 172-1 and/or a depth imaging device 172-2. Based on the positions of each of the sensors 122-1, 122-2, 122-3, 122-4, or the attributes of the operating surface 120, as determined upon recognizing the fiducial marking 125 as depicted in imaging data, the base station 160 may determine the orientation of the operating surface 120, and define an operating area thereon for use by the user 135 during the operation of the system 100.

Figure 1D:
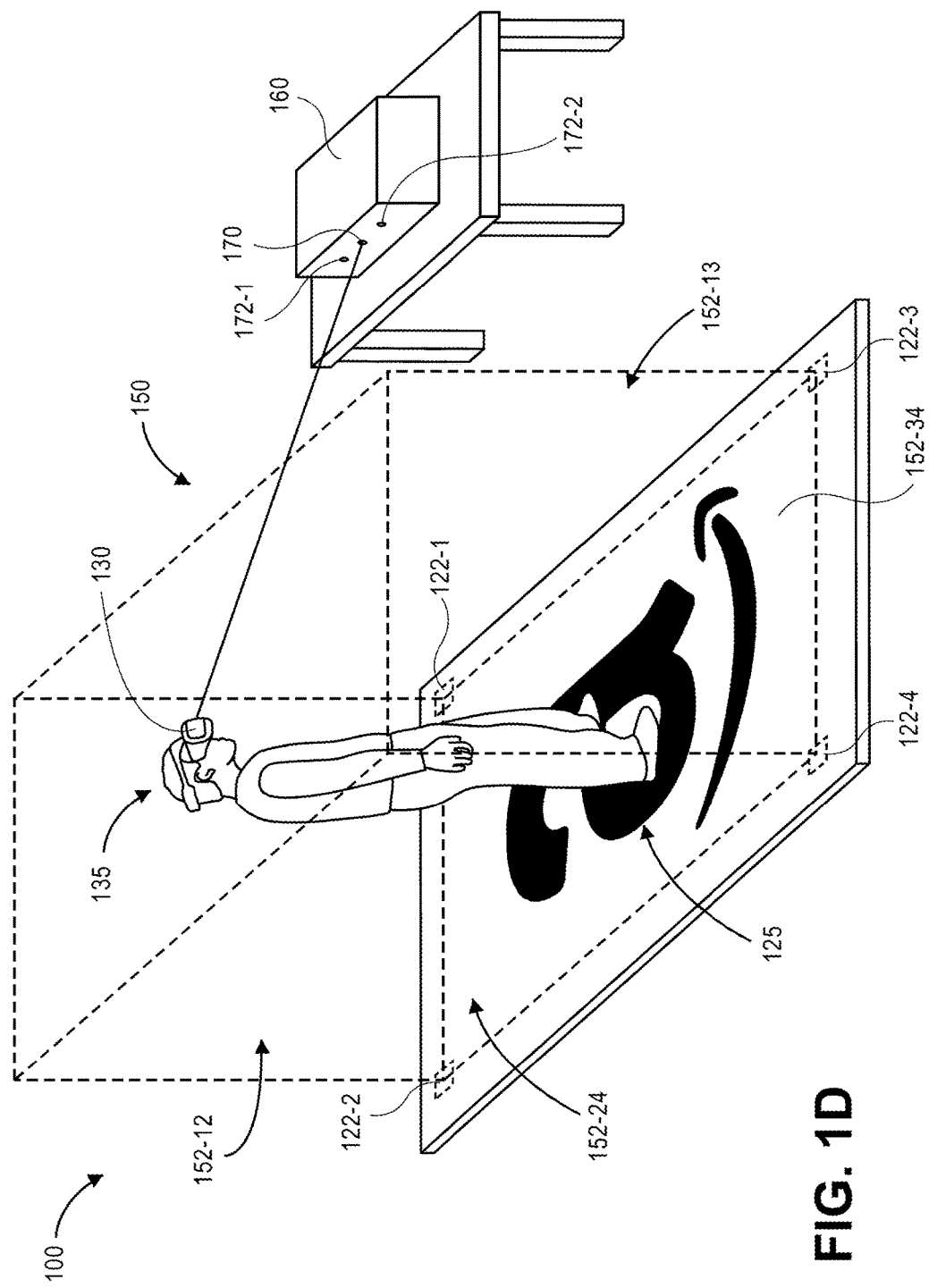

As is shown in FIG. 1D, the base station 160 establishes an operating area 150 having a plurality of virtual boundaries 152-12, 152-13, 152-24, 152-34 based on the positions of each of the sensors 122-1, 122-2, 122-3, 122-4 and/or the attributes of the operating surface 120. For example, as is shown in FIG. 1D, the virtual boundary 152-12 extends between the position of the sensor 122-1 and the position of the sensor 122-2, vertically upward from the operating surface 120. Likewise, the virtual boundary 152-13 extends vertically upward between the positions of the sensor 122-1 and the sensor 122-3, while the virtual boundary 152-24 extends vertically upward between the positions of the sensor 122-2 and the sensor 122-4, and the virtual boundary 152-34 extends vertically upward between the positions of the sensor 122-3 and the sensor 122-4. Alternatively, the operating area 150 may be further defined by a virtual floor that includes the positions of the sensors 122-1, 122-2, 122-3, 122-4. The operating area 150 and/or the virtual boundaries 152-12, 152-13, 152-24, 152-34 may be defined as sets of data indicative of positions of points in space, or ranges of such points in space (e.g., planar, volumetric or other geometric sections of points in space). For example, the operating area 150 may be defined exclusively by the virtual boundaries 152-12, 152-13, 152-24, 152-34, such that the operating area 150 includes all points within a volume or volumetric section defined by the virtual boundaries 152-12, 152-13, 152-24, 152-34.

Once the operating area 150 has been established, points in space corresponding to the operating area 150 and/or one or more of the virtual boundaries 152-12, 152-13, 152-24, 152-34 may be utilized to establish or modify a simulated environment generated by the system 100. For example, as is shown in FIG. 1D, the base station 160 may determine a position of the headset 130 and/or the user 135, and may generate a virtual reality experience for the user 135 that takes into account the position of the headset 130 and/or the user 135 within the operating area 150 and/or with respect to one or more of the virtual boundaries 152-12, 152-13, 152-24, 152-34.

Figure 1E:
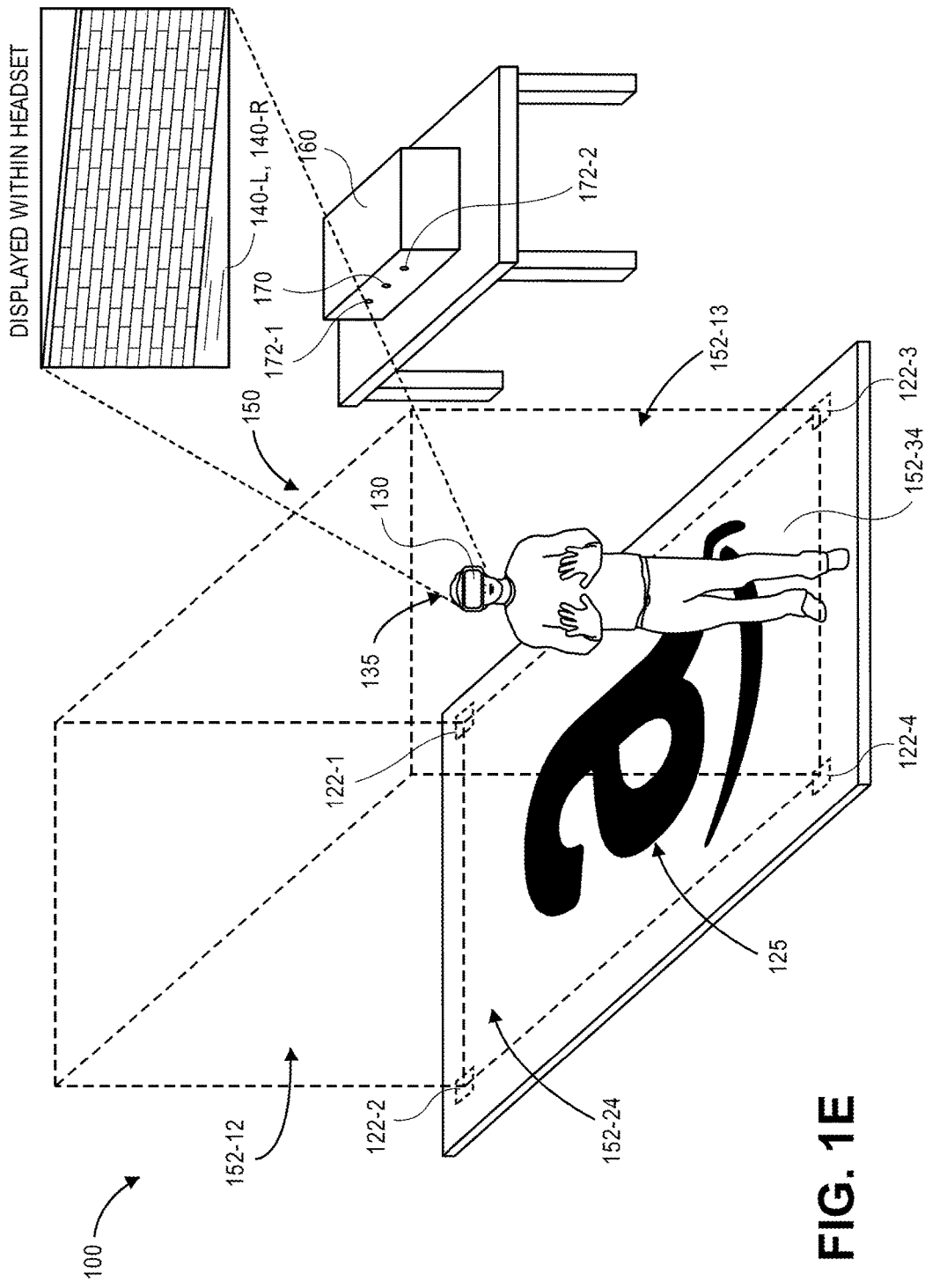

As is shown in FIG. 1E, when the user 135 approaches the virtual boundary 152-34, one or more images (e.g., of a brick wall or other insuperable obstacle) may be displayed by displays 140-L, 140-R within the headset 130, thereby informing the user 135 that he or she should reverse course and/or avoid traveling further in his or her current direction. For example, as the user 135 is tracked within the operating area 150, when the headset 130 and/or the base station 160 determines that one or more aspects of the user 135 has entered within a predetermined threshold distance of one or more of the virtual boundaries 152-12, 152-13, 152-24, 152-34, or has come into contact with one or more of the virtual boundaries 152-12, 152-13, 152-24, 152-34, the headset 130 may provide one or more visual messages to the user 135 by the displays 140-L, 140-R.

In some embodiments, the operating surface 120 may also be configured to provide feedback to the user 135. For example, the upper layer 121 may have a discrete texture that provides a unique feel or sense of touch to the feet of the user 135 when he or she is on the operating surface 120, such that the user 135 may readily recognize when he or she is no longer on the operating surface 120. Alternatively, the operating surface 120 may be outfitted with one or more feedback elements for providing haptic feedback (e.g., vibrations) or audible feedback (e.g., sounds) to the user 135 when he or she approaches or departs the operating surface 120, as determined by the headset 130, the base station 160, or any other aspect of the system 100.

Accordingly, the systems and methods of the present disclosure may define operating areas, or "play areas," for virtual reality systems using operating surfaces that include one or more sensors disposed therein, or feature fiducial markings such as one or more distinct colors, patterns or logos on one or more visible surfaces thereof. The operating areas may be defined by collections of points in space constituting virtual walls, virtual floors, virtual ceilings or other planar or non-planar sections, including points within such sections, such as one or more of the virtual boundaries 152-12, 152-13, 152-24, 152-34 of FIGS. 1A through 1E, or regions of points in space, including points within volumes or volumetric sections defined by such boundaries. The sensors and/or the fiducial markings may be recognized by components of a virtual reality system, e.g., a virtual reality headset and/or a base station, and one or more virtual boundaries may be established accordingly. The sensors and/or the fiducial markings may also be used to determine one or more attributes of a floor or other surface onto which the operating surfaces are applied, and to define the operating area based on such attributes. In some embodiments, the sensors and/or the fiducial markings may be utilized on surfaces other than floors, and at non-horizontal angles, to enable a virtual reality system to define an operating area that is consistent with the actual conditions or constraints of an environment in which the virtual reality system is provided. Once an operating area has been determined, a virtual reality experience of a user may be customized to take into account the various aspects of the operating area.

Virtual reality systems are computer-based systems that are intended to enable users to interact with a responsive, virtual environment while remaining within an actual, real-world environment. Most virtual reality systems include visual displays that immerse users in a virtual environment while blocking out contradictory sensory impressions from an actual environment, along with one or more other feedback devices. Such systems are configured to track a user's positions and actions within an actual environment while constantly rendering a virtual environment that is updated based on such positions and actions. In many virtual reality systems, a head-worn apparatus (e.g., a headset) is worn by a user to facilitate the rendering of a virtual environment to the user while obscuring an actual environment from the user as he or she interacts with the virtual environment from within the actual environment.

Naturally, one intrinsically limiting condition for any virtual reality system is that a user thereof should not contact any walls, ceilings or other obstacles within an actual environment while executing gestures, motions or other actions to interact with a virtual environment. Therefore, determining locations of such obstacles, or defining an operating area that specifically avoids such obstacles, is imperative for a virtual reality system. Moreover, nearly every virtual reality system also requires that a user interact, in some way, with a floor or other traveling or working surface of an actual environment while the user also interacts with a virtual environment, and presumes that such floors or other traveling or working surfaces are flat. Properly identifying locations and orientations of obstacles, and attributes of floors, is imperative to ensuring that a user enjoys a high-quality virtual reality experience. When a user of a virtual reality system unintentionally contacts an obstacle or encounters a non-flat floor or other surface that is neither present nor identifiable within the virtual environment, the user experiences a form of cognitive dissonance in which two of his or her senses are in irreconcilable conflict: what the user sees in the virtual environment is inconsistent with what the user touches or feels within the actual environment. Such cognitive dissonance may result in a dramatic downgrade of the quality of a virtual reality experience of the user.

Most virtual reality systems require an initial set-up or calibration process in which the virtual reality systems are trained as to the configurations and arrangements of the actual environments in which they are situated. During such processes, a user typically performs one or more predetermined or spontaneous gestures, motions or other actions as the locations of one or more of his or her body parts are tracked by the virtual reality system. Data gathered during such gestures, motions or other actions may be used to define a "play area," or an operating area, for the virtual reality system. Typically, where a virtual reality system comprises components that are fixed in location, such set-up or calibration processes must be performed once. Where a virtual reality system comprises mobile components, or where a virtual reality system that includes fixed components is moved from one location to another, such set-up or calibration processes must be repeated in order to determine the physical and virtual constraints of an operating area for the virtual reality system.

Imaging devices such as digital cameras or like machines may operate by capturing light that is reflected from objects, and by subsequently calculating or assigning one or more quantitative values to aspects of the reflected light, e.g., pixels, generating an output based on such values, and storing such values in one or more data stores. Imaging devices may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet. Data files that are stored in one or more data stores may be printed onto paper, presented on one or more computer displays, or subjected to one or more analyses, such as to identify items expressed therein.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field (or focus range), or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

Some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) depicted within the digital images as closely as possible, and in a manner that minimizes noise and disruptions, and does not create false transitions. Some detection algorithms or techniques that may be utilized in order to recognize characteristics of objects or portions thereof depicted in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Once the characteristics of stationary or moving objects or portions thereof have been recognized as being depicted in one or more digital images, such characteristics of the objects or portions thereof may be matched against information regarding edges, contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The systems and methods of the present disclosure are directed to overcoming one or more limitations of virtual reality systems, or to enhancing the operability and efficacy of such systems, by enabling such systems to quickly and accurately define operating areas. In some embodiments, the virtual reality systems include operating surfaces having a plurality of sensors disposed therein or thereon. The operating surfaces may take the form of a carpet, a mat, a drop cloth, a tarp, a sheet or any other covering that may be laid upon a floor or other traveling or working surface where the virtual reality system is to be operated. The positions of such sensors may be determined by one or more components of the virtual reality system, e.g., by corresponding sensors or other components of a virtual reality headset and/or a base station. Based on such positions, an alignment and/or orientation of the operating surface may be determined. Once the alignment and/or orientation of the operating surface has been determined, an operating area, or "play area," may be established for the virtual reality system, such as by constructing one or more virtual boundaries that are consistent with the positions of the sensors. Information or data regarding the operating area, the virtual boundaries and/or the alignment and/or orientation of the operating surface may be utilized by the virtual reality system to enhance a virtual reality experience for a user, and to minimize the likelihood that the user may experience any form of cognitive dissonance during use.

In some embodiments, the operating surfaces may include one or more fiducial markings formed from one or more colors, patterns, logos or other features. Such operating surfaces may also take the form of a carpet, a mat, a drop cloth, a tarp, a sheet or any other covering that may be laid upon a floor or other traveling or working surface where the virtual reality system is to be operated. The positions and/or orientations of such fiducial markings may be determined by one or more components of the virtual reality system, e.g., by one or more visual imaging devices and/or depth imaging devices. Based on such positions and/or orientations, an alignment and/or orientation of the operating surface may be determined, and an operating area may be established for the virtual reality system, such as by constructing one or more virtual boundaries that are consistent with the positions and/or orientations of the fiducial markings. Information or data regarding the operating area, the virtual boundaries and/or the alignment and/or orientation of the operating surface may be utilized by the virtual reality system to enhance a virtual reality experience for a user, and to minimize the likelihood that the user may experience any form of cognitive dissonance during use of the virtual reality system.

Based on the use of one or more sensors and/or fiducial markings in accordance with the present disclosure, an operating area, or one or more virtual boundaries of the operating area, may be defined in any manner. In some embodiments, a virtual boundary may take the form of a virtual wall or one or more planar or non-planar sections. In some other embodiments, a virtual boundary may take the form of a virtual floor and/or a virtual ceiling, or one or more other planar or non-planar sections. For example, in some embodiments, a virtual boundary may be programmatically defined to include positions of one or more sensors, e.g., the sensors 122-1, 122-2, 122-3, 122-4 of FIGS. 1A through 1E, or positions of one or more aspects of a fiducial marking. In some other embodiments, however, a virtual boundary may be programmatically defined with respect to positions of such sensors or aspects of the fiducial marking. For example, when a position of a sensor is determined, a virtual boundary may be defined to include one or more points in space that are located at any distance or in any direction from the position of the sensor, as well as any bounds or limits associated with such points. A virtual boundary need not include positions of any of the sensors or aspects of a fiducial marking from which the virtual boundary was defined. Thus, virtual boundaries may be defined to have any height, length, width or area, and may be defined to have any shape or form, with respect to one or more sensors and/or aspects of fiducial markings in accordance with the present disclosure. The operating areas may thus take the form of a three-dimensional mesh having a plurality of points in space, with the virtual boundaries comprising polygons extending between the respective points of the three-dimensional mesh.

In some embodiments, surfaces that include one or more sensors or bear one or more fiducial markings thereon may be mounted, hung, draped or otherwise provided vertically or at any angle, or in any manner other than by applying the operating surface atop a floor or other surface, and one or more virtual boundaries of an operating area may be defined based on the positions of the sensors included therein or the positions of the fiducial markings borne thereon. In some embodiments, sensors and/or fiducial markings may be utilized in connection with virtual reality systems even if one or more of such sensors or fiducial markings are not associated with a surface (e.g., a sheet-like object). For example, individual sensors or fiducial markings may be mounted, installed, posted or otherwise provided within an actual environment and, when the positions of such sensors or fiducial markings are recognized by a virtual reality system, used to establish one or more virtual boundaries or an operating area of a virtual environment. In some other embodiments, a virtual reality system may use an array or matrix of sensors and/or fiducial markings to determine contours, shapes or other features of a floor or other surface onto which such sensors or fiducial markings are applied. In some embodiments, a virtual reality system may use a plurality of sensors and/or fiducial markings that are applied atop a floor, and area also hung, draped or otherwise provided in a manner other than by applying the sensors and/or fiducial markings atop the floor.

The use of the operating surfaces, sensors and/or fiducial markings disclosed herein provide a number of advantages over traditional virtual reality systems. For example, one or more of the operating surfaces of the present disclosure may be readily and easily applied to a floor or other surface of an actual environment in which a virtual reality system is to be operated. The virtual reality system may rapidly calibrate itself with respect to the operating surfaces, e.g., by triangulating locations of the sensors and/or aspects of the fiducial markings, and an operating area having one or more virtual boundaries may be defined accordingly. Additionally, contours, shapes or other features of a floor or other surface of an actual environment may be determined based on sensed variations in the positions of the sensors and/or the aspects of the fiducial markings, and the operating area may be defined based on the contours, the shapes or the other features of the floor or the other surface accordingly.

Moreover, locations of sensors and/or aspects of fiducial markings may also be used to determine information or data regarding users of the virtual reality system. For example, where an operating surface having sensors arranged at predetermined distances or intervals is applied to a floor or other surface in an environment where a virtual reality system is to be utilized, the distances or intervals between the respective sensors may be used to determine one or more dimensions of a user of the virtual reality system. Avatars or other virtual representations of the user may be accurately determined based on such dimensions accordingly. Similarly, where an operating surface having a fiducial marking with predetermined distances or dimensions is applied to a floor or other surface in an environment where a virtual reality system is to be utilized, the distances or dimensions of the fiducial marking may be used to determine one or more dimensions of a user of the virtual reality system accordingly.

Furthermore, operating surfaces or other aspects of the present disclosure may be utilized to provide active feedback to a user regarding his or her position within an operating area. For example, in some embodiments, an upper layer or substrate of an operating surface may have a distinct texture or feel that may indicate to a user when he or she is on the operating surface while he or she is using a virtual reality system. Conversely, when the user no longer experiences the distinct texture or feel, the user may discern that he or she is no longer on the operating surface. In some other embodiments, an operating surface may be equipped with one or more haptic feedback, audible feedback or other feedback elements that may generate one or more vibrations or sounds when a user approaches or breaches a virtual boundary of a virtual reality system accordingly.

The systems and methods of the present disclosure are not limited to the use of carpets, mats or like coverings having sensors embedded therein or fiducial markings borne thereon. For example, the sensors and/or fiducial markings of the present disclosure may be provided in one or more areas of an actual environment with or without such surfaces or coverings. Moreover, such coverings need not be applied to floors or other like surfaces of an actual environment. Conversely, such coverings may be mounted, hung or otherwise applied vertically, or at non-horizontal angles, within the actual environment. One or more virtual boundaries of an operating area may be determined based on positions of such sensors and/or fiducial markings regardless of the manner or techniques in which such sensors and/or fiducial markings are applied within an actual environment in accordance with the present disclosure.

Figure 2:
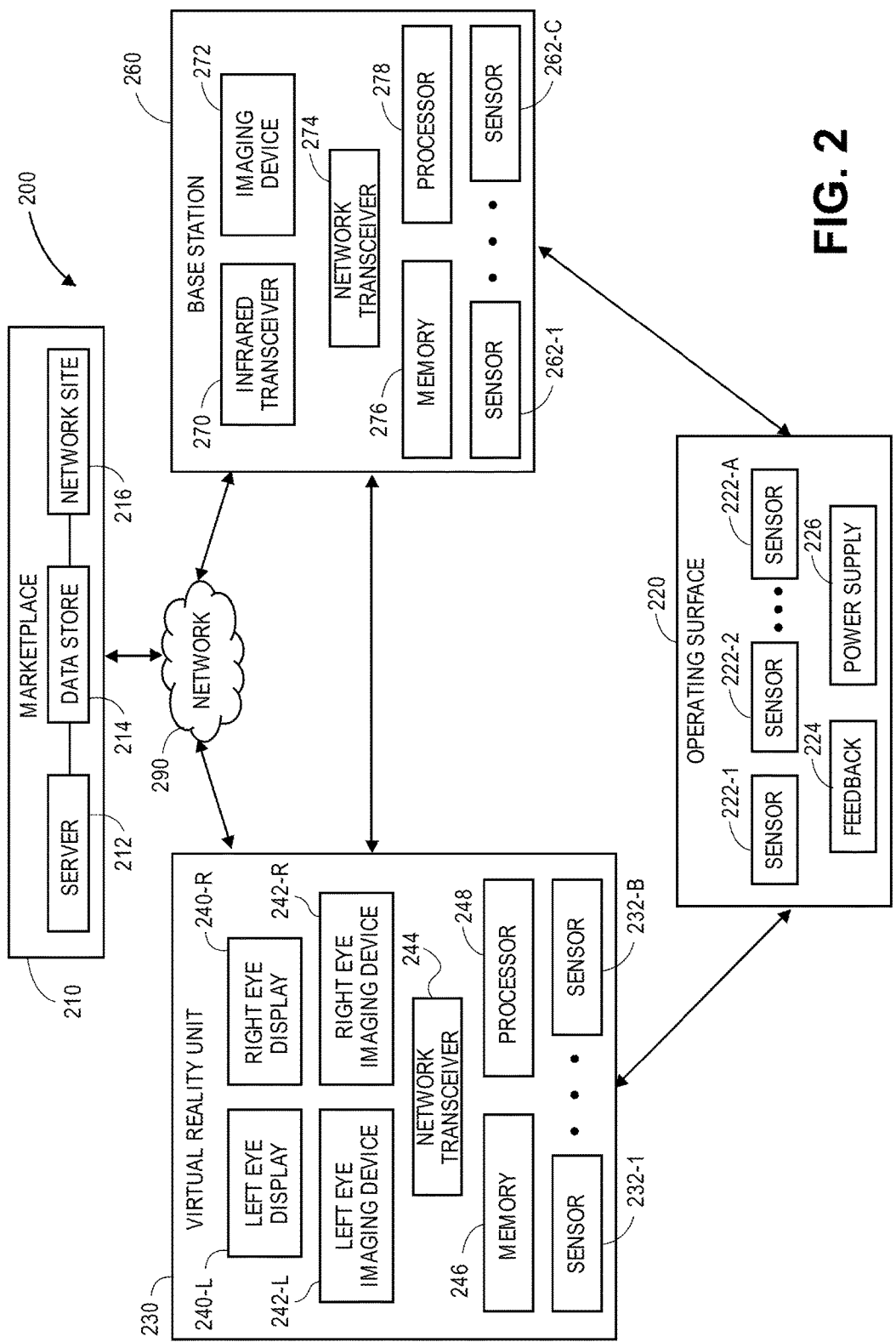
FIG. 2 is a block diagram of components of one system in accordance with embodiments of the present disclosure.

Referring to FIG. 2, a block diagram of components of one system 200 in accordance with embodiments of the present disclosure is shown. Except where otherwise noted, reference numerals preceded by the number "2" shown in the block diagram of FIG. 2 indicate components or features that are similar to components or features having reference numerals preceded by the number "1" shown in the system 100 of FIGS. 1A through 1E.

As is shown in FIG. 2, the system 200 includes a marketplace 210, an operating surface 220, a virtual reality unit 230 and a base station 260 connected to a network 290 that may include the Internet, in whole or in part. The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores 214 (e.g., databases) for hosting a network site 216. The network site 216 may be implemented using the one or more servers 212, which connect or otherwise communicate with the one or more data stores 214 as well as with one or more external computer devices over the network 290, through the sending and receiving of digital data. Moreover, the data store 214 may include any type of information regarding items that have been made available for sale through the marketplace 210, or ordered by customers from the marketplace 210, or any information or data regarding the delivery of such items to such customers, e.g., by any individuals or machines, including but not limited to manned or unmanned carriers such as cars, trucks, trailers, freight cars, container ships or cargo aircraft (e.g., manned aircraft or unmanned aircraft, such as drones). In some embodiments, the data store 214 may include information, data, programs and/or instructions for providing one or more virtual reality experiences, and such information, data programs and/or instructions may be accessed by one or more of the operating surface 220, the virtual reality unit 230, or the base station 260, as appropriate.

The server 212 may operate one or more order processing and/or communication systems and/or software applications having one or more user interfaces, or communicate with one or more other computing devices or machines that may be connected to the network 290, for any other purpose. For example, the server 212 may operate or provide access to one or more reporting systems for receiving or displaying information or data regarding virtual reality experiences provided by one or more of the virtual reality unit 230 and/or the base station 260. The server 212 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the orders, or interactions received from the one or more operators, users, workers or persons.

The marketplace 210 may be physically or virtually associated with one or more storage or distribution facilities, such as a fulfillment center, a warehouse, a bricks-and-mortar retail establishment, or any other like facilities. Such facilities may be adapted to receive, store, process and/or distribute items, and may include any number of stations for receiving, storing and distributing items to customers, including but not limited to one or more receiving stations, storage areas and/or distribution stations. Additionally, such facilities may further include any number of associated servers, data stores, processors or like computer components, any of which may connect or otherwise communicate over the network 290 through the sending and receiving of digital data, or in any other manner. In some embodiments, the marketplace 210 may make available one or more virtual reality experiences over the network 290, e.g., via the network site 216, or via one or more dedicated shopping applications that may connect to the marketplace 210 over the network 290.

The operating surface 220 may comprise one or more layers or substrates formed from materials that may be utilized in connection with one or more virtual reality experiences, including but not limited to virtual reality experiences operated or supported by one or more of the virtual reality unit 230 and/or one or more of the base station 260. As is shown in FIG. 2, the operating surface 220 may include one or more sensors 222-1, 222-2 . . . 222-a, one or more feedback devices 224 and one or more power supplies 226.

The layers or substrates of the operating surface 220 may be formed from any number, type or form of materials. In some embodiments, the operating surface 220 may be formed from materials that are traditionally associated with floor coverings such as carpets, mats, drop cloths, tarps or sheets, or wall or window dressings such as curtains, including but not limited to natural or synthetic materials such as wools, nylons, polypropylenes, polyesters, rubbers, acrylics, cottons, linens, and others. In some embodiments, the operating surface 220 may include a single layer or substrate of such materials, or a plurality of such layers or substrates, which may be formed from the same materials or from different materials, and may have the same thicknesses or different thicknesses. For example, in some embodiments, the operating surface 220 may include an upper layer or substrate, or a pile, having unique textures or feels that may be sensed by feet or other body parts of a user, as well as one or more substrates or sublayers joined to the upper layer (or pile), and form an interface with a floor or other surface to which the operating surface 220 is applied. Additionally, the operating surface 220 may further include one or more features for enabling the operating surface 220 to be applied or mounted, including but not limited to a rubber base for reducing the risk of slippage by users of the operating surface 220, or one or more holes or hooks for hanging the operating surface 220 to a wall or other structure.

The sensors 222-1, 222-2 . . . 222-a may be any devices or system components configured for transmitting and/or receiving one or more signals according to any protocol, and for determining or indicating their respective positions based on one or more of such signals. For example, each of the sensors 222-1, 222-2 . . . 222-a may be configured to transmit signals to one or more of the virtual reality unit 230 and/or the base station 260, or another system unit or component, or to receive signals from one or more of the virtual reality unit 230 and/or the base station 260, or other units or components, in order to enable the virtual reality unit 230 or the base station 260 to determine the positions of each of such sensors 222-1, 222-2 . . . 222-a based on the respective signals.

In some embodiments, the sensors 222-1, 222-2 . . . 222-a may be configured to emit and/or capture visible and/or invisible light of any wavelength or frequency, and to determine or indicate their respective positions based on the emission and capture of such light. For example, the sensors 222-1, 222-2 . . . 222-a may include one or more photodiodes that are sensitive to light at one or more discrete wavelengths or frequencies (e.g., infrared light), or one or more light-emitting diodes ("LED") that are configured to emit light at such wavelengths or frequencies. In some embodiments, the sensors 222-1, 222-2 . . . 222-a may include one or more retroreflectors that are configured to receive light from a source and reflect the light back to the source. Any type of light transmitter and/or receiver may be used in accordance with the sensors 222-1, 222-2 . . . 222-a of the present disclosure.

In some embodiments, the sensors 222-1, 222-2 . . . 222-a may be configured to emit and/or capture acoustic signals of any intensity or within any frequency spectra, and to determine or indicate their respective positions based on the emission and capture of such signals. For example, where the sensors 222-1, 222-2 . . . 222-a include a plurality of speakers or microphones, the sensors 222-1, 222-2 . . . 222-a may capture one or more acoustic signals transmitted by the virtual reality unit 230 and/or the base station 260, or may transmit one or more acoustic signals to the virtual reality unit 230 and/or the base station 260, and patterns of one or more of the acoustic signals may be processed in order to determine times of flight of such signals, or to triangulate directions to or positions of the respective sensors 222-1, 222-2 . . . 222-a based on such signals. In such embodiments, the acoustic signals transmitted and/or received by the sensors 222-1, 222-2 . . . 222-a may be beyond the audible ranges of humans or other animals.

In some embodiments, the sensors 222-1, 222-2 ... 222-*a* may be configured to transmit and/or receive Wireless Fidelity ("Wi-Fi"), signals, Bluetooth® signals, or any type or form of signals within any frequency spectra. Each of the sensors 222-1, 222-2 ... 222-*a* may feature or access one or more processors, memory components and/or power sources for transmitting or receiving signals therefrom. For example, one or more of the sensors 222-1, 222-2 ... 222-*a* may be Bluetooth®-enabled components that may pair with the virtual reality unit 230 and/or the base station 260, and positions of the sensors 222-1, 222-2 ... 222-*a* may be determined based on the strengths of the signals transmitted between the sensors 222-1, 222-2 ... 222-*a* and the virtual reality unit 230 and/or the base station 260. Where the sensors 222-1, 222-2 ... 222-*a* and/or the virtual reality unit 230 or the base station 260 are Wi-Fi-enabled, or include one or more radiofrequency identification (or "RFID") transmitters or readers, positions of such sensors with respect to the virtual reality unit 230 and/or the base station 260 may be determined in a similar manner.

In some embodiments, each of the sensors 222-1, 222-2 ... 222-*a* may be configured to transmit the same signal, or a similar signal, simultaneously or at different intervals. In some other embodiments, each of the sensors 222-1, 222-2 ... 222-*a* may be configured to transmit different signals, e.g., unique signals encoded with any type or form of information, data or metadata, such as an identifier of the respective one of the sensors 222-1, 222-2 ... 222-*a* from which such signals were transmitted.

As is also shown in FIG. 2, the operating surface 220 may further include one or more feedback devices 224 and one or more power supplies 226. In some embodiments, the feedback devices 224 may include one or more audio speakers, e.g., physical components that may be automatically controlled or configured to transmit audible messages, signals or sounds. In some other embodiments, the feedback devices 224 may include one or more haptic vibrators, e.g., physical components that may be automatically controlled or configured to generate tactile vibrations of any frequency or intensity. In some embodiments, the feedback devices 224 may further include one or more components that may be configured to emit or radiate one or more discrete odors, or to cause a user to experience one or more discrete tastes.

Additionally, the power supplies 226 may be one or more batteries or other power cells for powering one or more of the sensors 222-1, 222-2 ... 222-*a* or the feedback devices 224, e.g., dry cell or wet cell batteries such as lead-acid batteries, lithium ion batteries, nickel cadmium batteries or nickel metal hydride batteries, or any other type, size or form of batteries, and may each have any cell voltages, peak load currents, charge times, specific energies, internal resistances or cycle lives, or other power ratings. The power supply 226 may also be any other type, size or form of power source, e.g., other than a battery, including but not limited to one or more fuel cells or solar cells, and may be sources of alternating current (AC) and/or direct current (DC) power at any voltage levels. In some embodiments, the operating surface 220 may have a single power supply 226 for powering each of the sensors 222-1, 222-2 ... 222-*a* and/or feedback devices 224. In some embodiments, one or more of the sensors 222-1, 222-2 ... 222-*a* and/or the feedback devices 224 may include respective power supplies 226. Additionally, in some embodiments, the power supply 226 may be external to the operating surface 220. For example, the operating surface 220 may be configured to plug into an electrical outlet or other port associated with the power supply 226.

The operating surface 220 may further include one or more fiducial markings disposed on an upper layer (e.g., a pile) thereof, such as the fiducial marking 125 provided on the upper layer 121 of the operating surface 120 of FIG. 1A. The fiducial markings may be any type or form of visible indicator such as one or more colors, patterns, logos, alphanumeric characters, symbols, images, or others, and which have an appearance that generates a visible contrast with an appearance of a floor or other surface to which the operating surface 220 is applied. In some embodiments, the operating surface 220 may include a fiducial marking, but need not include any of the sensors 222-1, 222-2 ... 222-*a*, the feedback devices 224 or the power supplies 226. In some other embodiments, the operating surface 220 may include one or more of the sensors 222-1, 222-2 ... 222-*a*, the feedback devices 224 or the power supplies 226, but need not include a fiducial marking. In still other embodiments, such as the operating surface 120 of FIGS. 1A through 1E, the operating surface 220 may include both a fiducial marking and one or more of the sensors 222-1, 222-2 ... 222-*a*, the feedback devices 224 or the power supplies 226. Furthermore, in some embodiments, the sensors 222-1, 222-2 ... 222-*a* need not be connected to any underlying layers or substrates, and may be independently distributed or mounted to one or more floors or other surfaces by other means.

The virtual reality unit 230 includes a plurality of sensors 232-1 ... 232-*b*, a left eye display 240-L, a right eye display 240-R, a left eye imaging device 242-L and a right eye imaging device 242-R. In some embodiments, the virtual reality unit 230 may include a frame adapted for mounting on a human head. In some embodiments, the frame may define a cavity having openings to be aligned with a wearer's eyes when the frame is mounted on his or her head. Such a frame may be formed from any type or form of material such as one or more rubbers, woven or non-woven fabrics, plastics, composites, leathers, papers (e.g., cardboards) or the like that may be molded or shaped and configured for contact or alignment with left and right eyes of the user, respectively. In some embodiments, the virtual reality unit 230 may further include a strap for mounting the frame about a head and/or face of a user. The strap may be formed from any suitable material that may flexibly mate the frame with the head or face of the user, including but not limited to rubbers, woven or non-woven fabrics, plastics (e.g., polyesters, nylons), composites, leathers, papers (e.g., cardboards) or the like. Alternatively, where a strap is not provided, a frame may be manually pressed against or aligned with the head or face of the user. In some embodiments, the frame need not be adapted for mounting on a human head.

The sensors 232-1 ... 232-*b* may include one or more of the same components as the sensors 222-1, 222-2 ... 222-*a* of the operating surface 220, or, alternatively, one or more additional or different components. Additionally, the sensors 232-1 ... 232-*b* may operate according to the same protocol as the sensors 222-1, 222-2 ... 222-*a*, or according to different protocols. For example, the sensors 232-1 ... 232-*b* may include one or more imaging devices (e.g., visual cameras and/or depth cameras), infrared emitters or receivers, acoustic emitters or receivers, Wi-Fi-enabled devices, Bluetooth®-enabled devices, RFID-enabled devices or the like. Thus, the virtual reality unit 230 may be configured to locate and track the operating surface 220 and the base station 260 in the same manner, or in different manners, based on information or data transmitted or received by the respective sensors 222-1, 222-2 . . . 222-*a* and the sensors 232-1 . . . 232-*b* provided in the operating surface 220 and the virtual reality unit 230.

The left eye display 240-L and the right eye display 240-R may be mounted in alignment with the left eye and the right eye, respectively, of a user of the virtual reality unit 230, e.g., to a pair of glasses or goggles, or within a cavity defined by a headset, and may incorporate any number of active or passive display technologies or systems. For example, the left eye display 240-L or the right eye display 240-R, may include or comprise one or more electronic ink systems, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. Such displays may be configured to emit light, to modulate incident light emitted from another source, or both.

The left eye imaging device 242-L and the right eye imaging device 242-R may include or comprise any form of optical recording sensor or device that may be used to photograph or otherwise record information or data regarding the position, movement, alignment or orientation of the left eye and the right eye, respectively, or any other relevant information or data regarding the left eye and the right eye. For example, the left eye imaging device 242-L or the right eye imaging device 242-R may be any type or form of digital camera configured to capture color-based information or data regarding the left eye and the right eye, including but not limited to the positions and orientations of the cornea, pupil, lens and retina of each of the left eye and the right eye. Alternatively, the left eye imaging device 242-L or the right eye imaging device 242-R may be any type or form of depth sensor or range camera configured to capture depth-based or range-based information regarding the positions and orientations of the cornea, pupil, lens and retina of each of the left eye and the right eye, e.g., based on visible or invisible light (e.g., infrared light or radiation) reflected from the left eye or the right eye. The left eye imaging device 242-L or the right eye imaging device 242-R may also include any number of sensors, memory or storage components, processors or other features for capturing, analyzing or storing imaging data captured by such imaging devices.

The virtual reality unit 230 also includes a network transceiver 244 that may functionally join one or more of the left eye display 240-L, the right eye display 240-R, the left eye imaging device 242-L and the right eye imaging device 242-R with one another, or may functionally join the virtual reality unit 230 with one or more systems, devices or components, including but not limited to the marketplace 210, the base station 260, or one or more other external computer systems, devices or components over the network 290, through the sending and receiving of digital data. The network transceiver 244 may be configured to enable the virtual reality unit 230 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol.

The virtual reality unit 230 further includes one or more memory or storage components 246, one or more computer processors 248 for analyzing, modifying and/or storing any imaging data that may be captured using the left eye imaging device 242-L or the right eye imaging device 242-R or displayed upon the left eye display 240-L and the right eye display 240-R, or for performing any other function associated with the operation and use of the virtual reality unit 230, including but not limited to controlling the transmission and/or receipt of signals by one or more of the sensors 232-1 . . . 232-*b*.

The virtual reality unit 230 may include some or all of the components shown in FIG. 2, or additional components. For example, in some embodiments, the virtual reality unit 230 may be a hand-held controller having one or more of the sensors 232-1 . . . 232-*b*, the network transceiver 244, the memory components 246 and/or the computer processors 248, along with any other interactive features, such as buttons, switches or other features. In such embodiments, the virtual reality unit 230 may be used in virtual reality experiences that require motion, gestures or other activity with the hands, such as virtual simulations of golf, tennis, baseball or the like. Where the virtual reality unit 230 is configured for use by hand, the virtual reality unit 230 may but need not include or feature any of the displays 240-L, 240-R or imaging devices 242-L, 242-R. Additionally, in some embodiments, one or more of the sensors 232-1 . . . 232-*b* may be affixed or worn by one or more parts of a human body.

The base station 260 includes a plurality of sensors 262-1 . . . 262-*c*, one or more infrared transceivers 270, one or more imaging devices 272, a network transceiver 274, one or more memory or storage components 276, and one or more computer processors 278. The base station 260 may be provided in the form of a stationary or mobile console or unit that may be placed, installed and/or mounted to one or more surfaces of an environment in which the system 200 is to be operated.

The sensors 262-1 . . . 262-*c* may include one or more of the same components as the sensors 222-1, 222-2 . . . 222-*a* of the operating surface 220 or the sensors 232-1 . . . 232-*b* of the virtual reality unit 230, or, alternatively, one or more additional or different components. Additionally, the sensors 262-1 . . . 262-*c* may operate according to the same protocol as the sensors 222-1, 222-2 . . . 222-*a* or the sensors 232-1 . . . 232-*b*, or according to different protocols. For example, the sensors 262-1 . . . 262-*c* may include one or more imaging devices (e.g., visual cameras and/or depth cameras), infrared emitters or receivers, acoustic emitters or receivers, Wi-Fi enabled devices, Bluetooth®-enabled devices. Thus, the base station 260 may be configured to locate and track the operating surface 220 and the virtual reality unit 230 in the same manner, or in different manners, based on information or data transmitted or received by the respective sensors 222-1, 222-2 . . . 222-*a*, the sensors 232-1 . . . 232-*b* and the sensors 262-1 . . . 262-*c* provided in the operating surface 220, the virtual reality unit 230 and the base station 260.

The infrared transceiver 270 may be any devices or components that are configured to transmit and receive one or more infrared signals, and to interpret information, data or metadata included in such signals. For example, the infrared transceiver 270 may include one or more power supplies, processors, resistors, circuit components, substrates, boards, optical elements or the like. The infrared transceiver 270 may include a transmitting component, e.g., a light-emitting diode (or "LED"), and a receiving component, e.g., a photodiode. The infrared transceiver 270 may be configured to transmit and receive infrared signals according to any protocol or standard, including but not limited to one or more protocols or standards promulgated by the Infrared Data Association ("IrDA"). In some embodiments, the operating surface 220 and/or the virtual reality unit 230 may also include one or more infrared transceivers configured to operate according to the same protocol as the infrared transceiver 270, or according to one or more other protocols. For example, one or more of the sensors 222-1, 222-2 . . . 222-a or the sensors 232-1 . . . 232-b of the operating surface 220 or the virtual reality unit 230, respectively, may be or include one or more infrared transceivers. Moreover, the operating surface 220, the virtual reality unit 230 and/or the base station 260 may be configured to communicate according to protocols or standards other than infrared communication.

The imaging device 272 may be any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the base station 260, or for any other purpose. For example, the imaging device 272 may be configured to capture or detect reflected light if the reflected light is within a field of view of the imaging device 272, which is defined as a function of a distance between an imaging sensor and a lens within the imaging device 272, viz., a focal length, as well as a location of the imaging device 272 and an angular orientation of the lens. Accordingly, where an object appears within a depth of field, or a distance within the field of view where the clarity and focus is sufficiently sharp, the imaging device 272 may capture light that is reflected off objects of any kind to a sufficiently high degree of resolution using one or more sensors thereof, and store information regarding the reflected light in one or more data files.

The imaging device 272 may also include manual or automatic features for modifying a field of view or orientation. For example, the imaging device 272 may be configured with a fixed focal length (e.g., fixed-focus lenses) or angular orientation. Alternatively, the imaging device 272 may include one or more actuated or motorized features for adjusting a focal length (e.g., zooming the imaging device) or an angular orientation (e.g., the roll angle, the pitch angle or the yaw angle) of the imaging device 272, such as by causing a change in the distance between the imaging sensor and the lens (e.g., optical zoom lenses or digital zoom lenses).

Imaging data (e.g., still or moving images, as well as associated audio data or metadata) captured using the imaging device 272 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) depicted within the digital images as closely as possible, and in a manner that minimizes noise and disruptions, and does not create false transitions. Some detection algorithms or techniques that may be utilized in order to recognize characteristics of objects or portions thereof depicted in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The network transceiver 274 may be configured to enable the base station 260 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol. The base station 260 further includes one or more memory or storage components 276, one or more computer processors 278 for performing any function associated with the operation and use of the virtual reality unit 230, including but not limited to controlling the transmission and/or receipt of signals by one or more of the sensors 222-1, 222-2 . . . 222-a or the sensors 232-1 . . . 232-b.

The base station 260 may also include any other input/output features or peripherals such as scanners, readers, keyboards, keypads, touchscreens or like devices, and may further operate or provide access to one or more engines for analyzing information or data captured by one or more sensors. In addition to the sensors 262-1 . . . 262-c, the infrared transceiver 270, the imaging device 272, the network transceiver 274, the memory components 276 and/or the processors 278, the base station 260 may further include any number of other sensors or components, including but not limited to a bar code scanner, a radiofrequency identification (or RFID) reader, a presence detection sensor and/or a motion sensor, as well as one or more speedometers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, radiation sensors (e.g., Geiger counters, neutron detectors, alpha detectors), or ranging sensors (e.g., radar or LIDAR ranging sensors).

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although FIG. 2 is shown as including a single box corresponding to one marketplace 210, a single box corresponding to one operating surface 220, a single box corresponding to one virtual reality unit 230 and a single box corresponding to one base station 260, those of ordinary skill in the pertinent arts will recognize that the system 200 may include and/or utilize any number of marketplaces 210, operating surfaces 220, virtual reality units 230 and/or base stations 260 in accordance with the present disclosure.

The server 212, the processors 248, 278 or one or more other computer devices or machines, e.g., devices or machines that may be accessed over the network 290, may be configured to execute any number of the functions, programs or algorithms for performing any of the tasks or achieving any of the objectives discussed above with regard to the marketplace 210, the virtual reality unit 230 and/or the base station 260. Additionally, the server 212, the processors 248, 278 or one or more other computer devices or machines, e.g., devices or machines that may be accessed over the network 290, may be configured to execute any number of functions, programs or algorithms for performing one or more of the tasks or achieving one or more of the objectives disclosed herein.

The marketplace 210, the virtual reality unit 230 and/or the base station 260 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages or the like. The data and/or computer executable instructions, programs, firmware, software and the like (also referred to herein as "computer executable" components) described herein may be stored on a computer-readable medium that is within or accessible by computers or computer components such as the server 212, the processors 248, 278 or any other computers or control systems utilized by the marketplace 210, the virtual reality unit 230 and/or the base station 260, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
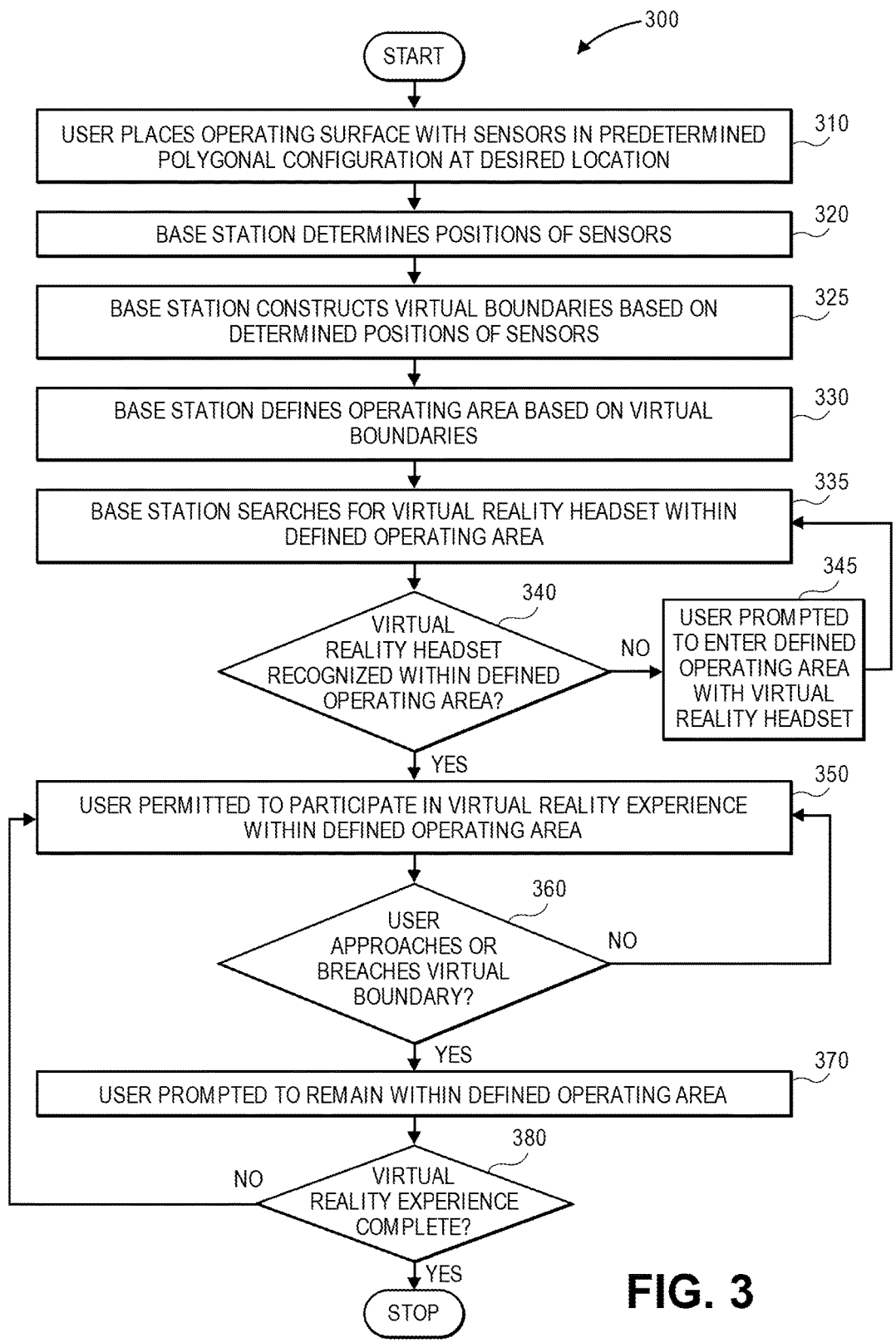
FIG. 3 is a flow chart of one process for defining an operating area for virtual reality systems in accordance with embodiments of the present disclosure.

As is discussed above, an operating area for a virtual reality system may be defined using an operating surface that is outfitted with a plurality of sensors, e.g., infrared sensors, and one or more virtual boundaries of the operating area may be established based on positions and orientations of the sensors. Referring to FIG. 3, a flow chart 300 of one process for defining an operating area for virtual reality systems in accordance with embodiments of the present disclosure is shown. At box 310, a user places an operating surface including a plurality of sensors arranged in a predetermined polygonal configuration at a desired location. For example, the sensors may include one or more photodiodes disposed at predetermined points within the operating surface, and configured to transmit and/or receive one or more signals in response to activation of one or more of the photodiodes by infrared light or radiation at predetermined wavelengths or frequencies. The sensors may be distributed throughout the operating surface, separated by predetermined distances, or disposed within the operating surface at buffers from edges of the operating surface, in any geometric configuration (e.g., rectangular, pentagonal, hexagonal or the like). The desired location may be any actual environment where the use of a virtual reality system is contemplated, including but not limited to spaces within dwellings, educational institutions, sports arenas, public parks, or any other facilities that are temporarily or permanently dedicated to the use of the virtual reality system. The operating surface may be laid down on a floor or other traveling or working surface, hung from a wall or other structure, or otherwise applied in any manner at the desired location. Alternatively, in some embodiments, a plurality of sensors may be installed at the desired location, independent of any operating surface.

At box 320, a base station determines positions of the plurality of sensors. For example, in some embodiments, the base station may transmit, flash or sweep infrared light or radiation across the desired location at predetermined times, and the sensors may indicate their respective positions based on the times at which such sensors are activated by the infrared light or radiation. The sensors may indicate their respective positions to the base station in any manner, and are not limited to the use of infrared technology in determining such positions. Alternatively, the sensors may be configured to communicate with a virtual reality unit such as a headset, or any other component other than a base station. At box 325, the base station constructs virtual boundaries based on the determined positions of the sensors. The virtual boundaries may be defined as planar or other geometric sections formed from a plurality of points in space, including but not limited to points corresponding to the positions of at least two of the sensors. In some embodiments, a virtual boundary may be defined or formed from line segments, arcs or other sections (e.g., curvilinear sections) extending between positions of two sensors, and rays extending vertically upward from the positions of the two sensors, along with each of the points above the line segments, the arcs or the other sections, and between the rays. In some embodiments, the virtual boundary may have lower and/or upper bounds or limits, such that the virtual boundary begins or terminates at a predetermined height. In some embodiments, the virtual boundary may have side bounds or limits, such that the virtual boundary begins or terminates at predetermined points. Where a virtual boundary includes one or more of such bounds or limits, an operating area may continue beyond such bounds or limits, such that users may reach above, below or to the sides of such bounds or limits. Such virtual boundaries may be formed based on positions of any of the sensors. Alternatively, the virtual boundaries may be constructed based on one or more offsets, buffers or other set-offs with respect to positions of sensors. For example, when a position of a sensor is determined, a virtual boundary may be defined based on the position of the sensor, or on the positions of one or more points at any distance from the position of the sensor.

A virtual boundary may also be defined or formed in any other manner. For example, imaging data may be captured at the desired location, and one or more fiducial markings on the operating surface may be recognized as being depicted therein. A virtual boundary may be defined based on positions and/or orientations of the one or more fiducial markings, along with information or data regarding the positions of the sensors.

At box 330, the base station defines an operating area for a virtual reality system based on the virtual boundaries. For example, the operating area may be defined to include the area of a floor or other surface at the desired location, as well as a three-dimensional region above the floor and bounded by the virtual boundaries constructed at box 325. Data representative of the operating area may thus include positions of a plurality of points within the three-dimensional region.

At box 335, the base station searches for a virtual reality headset within the operating area defined at box 330. For example, the headset may be outfitted with one or more sensors that may be the same type or form of sensors included in the operating surface, or different sensors, and the base station may be configured to determine the positions of such sensors in the same manner that the base station determines the positions of the sensors of the operating surface. In some embodiments, the headset and the operating surface may be outfitted with sensors that include one or more light-emitting diodes ("LEDs") and/or photodiodes disposed at predetermined points, and configured to transmit and/or receive one or more signals in response to activation of one or more of the photodiodes by infrared light or radiation at predetermined wavelengths or frequencies. Any type or form of sensing system for determining a position of the headset with respect to the operating area defined at box 330 may be utilized in accordance with the present disclosure.

At box 340, whether a headset is recognized within the defined operating area is determined. If a headset is not recognized within the defined operating area, then the process advances to box 345, where the user is prompted to enter the defined operating area with the headset, before returning to box 335. For example, the user may be prompted by any form of audible feedback (e.g., in the form of tones, alarms or spoken text such as "please enter the operating area now"), visible feedback (e.g., in the form of windows displayed on the virtual reality headset), haptic feedback (e.g., vibrations) or one or more messages (e.g., SMS and/or MMS text messages, social network messages, E-mail), or any other feedback.

If a headset is recognized within the operating area, however, then the process advances to box 350, where the user is permitted to participate in a virtual reality experience within the defined operating area. For example, the virtual reality experience may include one or more video games, virtual tours, news or educational programs, or any other content rendered within a field of view of the user wearing the headset.

At box 360, whether the user has approached or breached a virtual boundary is determined, e.g., based on a sensed position of the headset, or sensed positions of one or more body parts of the user. If the user has not approached or breached the virtual boundary, then the process returns to box 350, where the user is permitted to participate in a virtual reality experience within the defined operating area. If the user has approached or breached the virtual boundary, however, then the process advances to box 370, where the user is prompted to remain within the defined operating area.

At box 380, whether the virtual reality experience is complete is determined. If the virtual reality experience is not complete, then the process returns to box 350, where the user is permitted to participate in a virtual reality experience within the defined operating area. If the virtual reality experience is complete, however, then the process ends.

Figure 4:
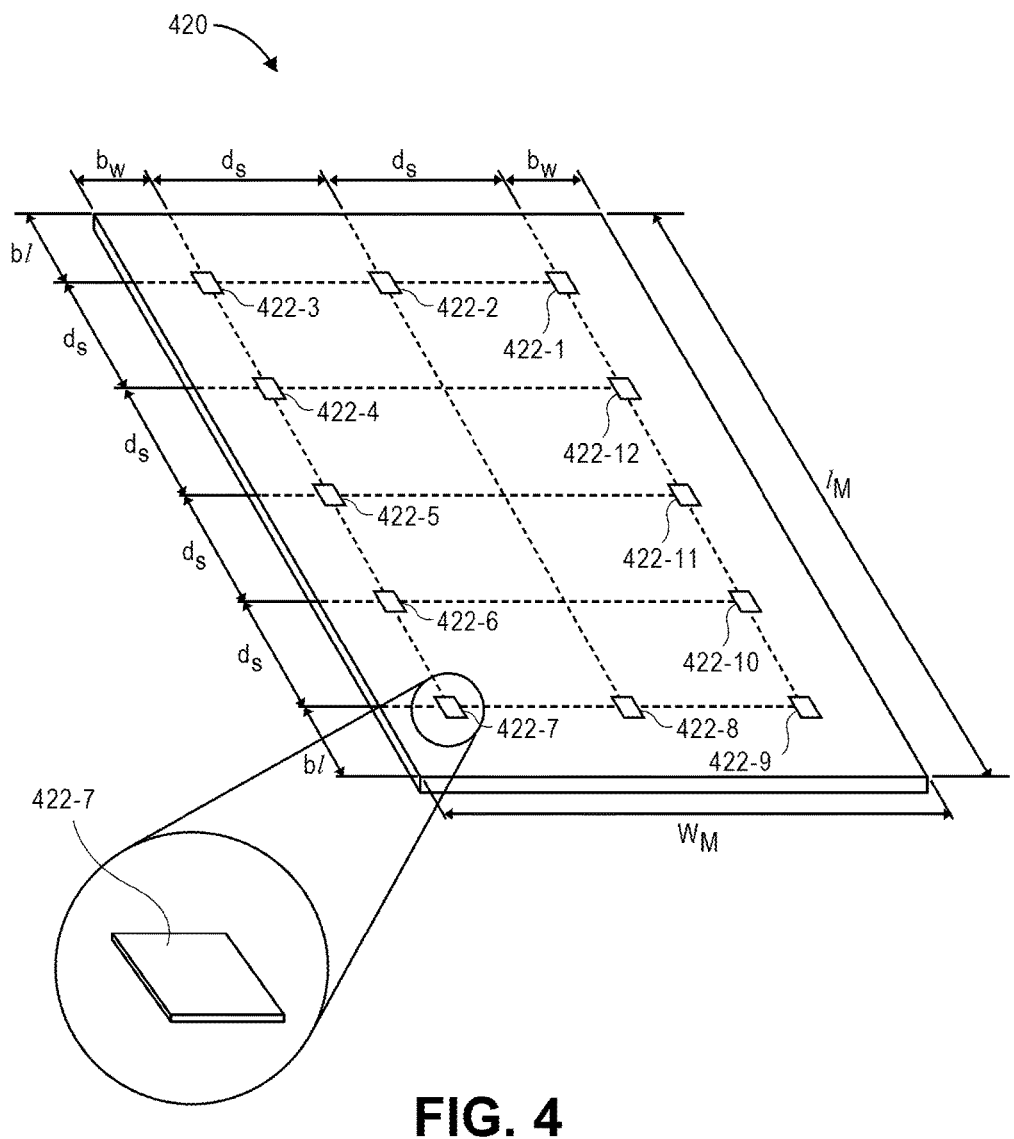
FIG. 4 is a view of one operating surface in accordance with embodiments of the present disclosure.

Referring to FIG. 4, a view of one operating surface in accordance with embodiments of the present disclosure is shown. Except where otherwise noted, reference numerals preceded by the number "4" shown in FIG. 4 indicate components or features that are similar to components or features having reference numerals preceded by the number "2" shown in the block diagram of FIG. 2 or by the number "1" shown in the system 100 of FIGS. 1A through 1E.

As is shown in FIG. 4, an operating surface 420 in the form of a mat or other floor covering is shown. The operating surface 420 has a substantially rectangular shape, with a length $l_M$ and a width $w_M$, and may be formed from any type or form of materials including but not limited to one or more layers of natural or synthetic materials such as wools, nylons, polypropylenes, polyesters, rubbers, acrylics, cottons, linens, and others. Alternatively, the operating surface 420 may be configured for mounting in a non-horizontal configuration, e.g., by hanging the operating surface from a wall or other structure within an environment.

Additionally, as is shown in FIG. 4, the operating surface 420 includes a plurality of sensors 422-1, 422-2, 422-3, 422-4, 422-5, 422-6, 422-7, 422-8, 422-9, 422-10, 422-11, 422-12 arranged about a perimeter of the operating surface 420. For example, the sensors 422-1, 422-2, 422-3 are disposed along a short side of the operating surface 420, and are separated by a distance or interval $d_S$. Likewise, the sensors 422-7, 422-8, 422-9 are also disposed along a short side of the operating surface 420, and are also separated by a distance or interval $d_S$. The sensors 422-3, 422-4, 422-5, 422-6, 422-7 and the sensors 422-1, 422-12, 422-11, 422-10, 422-9 are disposed along long sides of the operating surface 420, and are also separated by a distance or interval $d_S$. Each of the sensors 422-1, 422-3, 422-7, 422-9 are provided near corners of the operating surface 420, and are set off from the short sides by a buffer $b_l$ and from the long sides by a buffer $b_w$.

Components of the sensors 422-1, 422-2, 422-3, 422-4, 422-5, 422-6, 422-7, 422-8, 422-9, 422-10, 422-11, 422-12 may be disposed on top of or below the operating surface 420, or between or within two or more layers or substrates of the operating surface 420. For example, where one or more of the sensors 422-1, 422-2, 422-3, 422-4, 422-5, 422-6, 422-7, 422-8, 422-9, 422-10, 422-11, 422-12 is an infrared sensor having one or more photodiodes and/or or integrated circuits, the photodiodes may be installed in a manner that enables the photodiodes to extend through an upper layer (or pile) of the operating surface 420, while the integrated circuit components remain disposed between two or more of the layers or substrates. The upper layer (or pile) of the operating surface 420 may further have a plurality of fibers with a distinct texture or feel, thereby enabling a user to recognize when he or she is standing thereon based on the texture or feel, and, conversely, when he or she has departed therefrom based on the absence of the texture or feel. Additionally, the operating surface 420 may further include one or more fiducial markings provided on a visible surface of an upper or outermost layer. The position and/or orientation of the fiducial markings may be further utilized in constructing one or more virtual boundaries, and in defining an operating area based on such boundaries.

Although the operating surface 420 of FIG. 4 has the shape of a rectangle, and although the sensors 422-1, 422-2, 422-3, 422-4, 422-5, 422-6, 422-7, 422-8, 422-9, 422-10, 422-11, 422-12 are arranged in a rectangular configuration, those of ordinary skill in the pertinent arts will recognize that the operating surfaces of the present disclosure may take any shape or form, and may include any number of sensors provided in any configuration therein or thereon.

Figure 5:
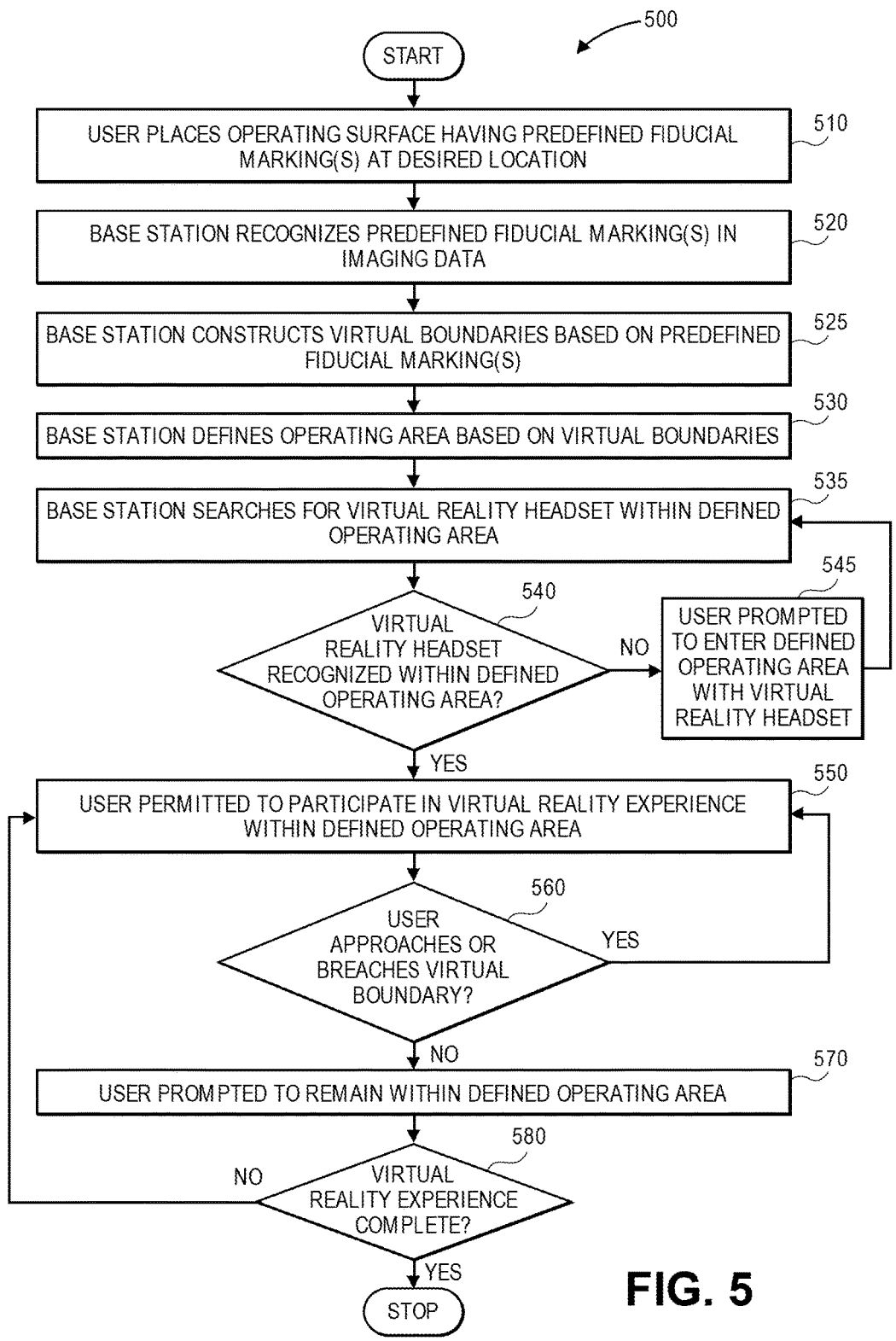
FIG. 5 is a flow chart of one process for defining an operating area for virtual reality systems in accordance with embodiments of the present disclosure.

As is discussed above, an operating area for a virtual reality system may also be defined by an image-based analysis of one or more colors, patterns, logos or other fiducial markings provided on a surface in an environment where the virtual reality system is to be operated. Referring to FIG. 5, a flow chart 500 of one process for defining an operating area for virtual reality systems in accordance with embodiments of the present disclosure is shown. At box 510, a user places an operating surface having one or more predefined fiducial markings thereon at a desired location. For example, the operating surface may include, on an upper or outermost layer, one or more colors, patterns, logos, alphanumeric characters, symbols, images, or others, and which have an appearance that generates a visible contrast with an appearance of a floor or other surface to which the operating surface is applied.

At box 520, a base station recognizes one or more of the predefined fiducial markings in imaging data captured thereby. For example, the base station may be outfitted with one or more visual imaging devices (e.g., color or black-and-white cameras) that may be programmed to capture and analyze one or more still or moving images, such as upon an initial installation or activation of a virtual reality system, or at predetermined times or intervals, e.g., to determine whether the conditions of the environment in which the base station is provided have changed. One or more edges, contours, outlines, colors, textures, silhouettes, shapes or other characteristics of the fiducial markings, or portions of the fiducial markings, expressed in the images may be identified using one or more algorithms or machine-learning tools. Such algorithms or tools may be directed to recognizing and marking transitions (e.g., the edges, contours, outlines, colors, textures, silhouettes, shapes or other characteristics of fiducial markings or portions thereof) depicted within the digital images as closely as possible, and in a manner that minimizes noise and disruptions, and does not create false transitions.

In some embodiments, detection algorithms or techniques that may be utilized in order to recognize characteristics of fiducial markings or portions thereof depicted in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. In some embodiments, once the characteristics of the fiducial markings or portions thereof have been recognized in one or more digital images, such characteristics of the fiducial markings or portions thereof may be matched against information regarding edges, contours, outlines, colors, textures, silhouettes, shapes or other characteristics of known fiducial markings, which may be stored in one or more data stores. In this regard, fiducial markings may be classified based at least in part on the extent to which the characteristics identified in one or more digital images correspond to one or more of the characteristics of the known fiducial markings.

At box 525, the base station constructs one or more virtual boundaries based on the predefined fiducial markings. For example, the virtual boundaries may be defined as planar or other geometric sections formed from a plurality of points in space, including but not limited to points corresponding to the positions of edges, contours, outlines, colors, textures, silhouettes, shapes or other characteristics of the fiducial markings or of the operating surface, as recognized in visible contrast with features of the defined location. In some embodiments, a virtual boundary may be defined or formed from line segments, arcs or other sections (e.g., curvilinear sections) extending between positions of two sensors, and rays extending vertically upward from the positions of the two sensors, along with each of the points above the line segments, the arcs or the other sections, and between the rays. In some embodiments, the virtual boundary may have lower and/or upper bounds or limits, such that the virtual boundary begins or terminates at a predetermined height. In some embodiments, the virtual boundary may have side bounds or limits, such that the virtual boundary begins or terminates at predetermined points. Where a virtual boundary includes one or more of such bounds or limits, an operating area may continue beyond such bounds or limits, such that users may reach above, below or to the sides of such bounds or limits. Such virtual boundaries may be formed based on positions and/or orientations of any aspect of the fiducial markings and/or the operating surface. Alternatively, the virtual boundaries may be constructed based on one or more offsets, buffers or other set-offs with respect to the aspects of the fiducial markings. For example, when a position of an edge, a contour, an outline, a color, a texture, a silhouette, a shape or another characteristic of a fiducial marking is determined, a virtual boundary may be defined based on that position, or on the positions of one or more points at any distance from that position.

A virtual boundary may also be defined or formed in any other manner. For example, the operating surface may include a plurality of sensors that are configured to communicate with the base station and/or one or more components of a virtual reality system. A virtual boundary may be defined based on positions of one or more sensors, along with information or data regarding the positions and/or orientations of the one or more fiducial markings.

At box 530, the base station defines an operating area for a virtual reality system based on the virtual boundaries. For example, the operating area may be defined to include the area of a floor or other surface at the desired location, as well as a three-dimensional region above the floor and bounded by the virtual boundaries constructed at box 525. Data representative of the operating area may thus include positions of a plurality of points within the three-dimensional region.

At box 535, the base station searches for a virtual reality headset within the operating area defined at box 530. For example, the headset may be outfitted with one or more sensors, e.g., infrared sensors, and the base station may be configured to determine the positions of such sensors with respect to the operating area. In some embodiments, the headset may be outfitted with sensors that include one or more light-emitting diodes ("LEDs") and/or photodiodes disposed at predetermined points, and configured to transmit and/or receive one or more signals in response to activation of one or more of the photodiodes by infrared light or radiation at predetermined wavelengths or frequencies. Any type or form of sensing system for determining a position of the headset with respect to the operating area defined at box 530 may be utilized in accordance with the present disclosure.

At box 540, whether a headset is recognized within the defined operating area is determined. If a headset is not recognized within the defined operating area, then the process advances to box 545, where the user is prompted to enter the defined operating area with the headset, before returning to box 535. For example, the user may be prompted by any form of audible feedback (e.g., in the form of tones, alarms or spoken text such as "please enter the operating area now"), visible feedback (e.g., in the form of windows displayed on the virtual reality headset), haptic feedback (e.g., vibrations) or one or more messages (e.g., SMS and/or MMS text messages, social network messages, E-mail), or any other feedback.

If a headset is recognized within the operating area, however, then the process advances to box 550, where the user is permitted to participate in a virtual reality experience within the defined operating area. For example, the virtual reality experience may include one or more video games, virtual tours, news or educational programs, or any other content rendered within a field of view of the user wearing the headset.

At box 560, whether the user has approached or breached a virtual boundary is determined, e.g., based on a sensed position of the headset, or sensed positions of one or more body parts of the user. If the user has not approached or breached the virtual boundary, then the process returns to box 550, where the user is permitted to participate in a virtual reality experience within the defined operating area. If the user has approached or breached the virtual boundary, however, then the process advances to box 570, where the user is prompted to remain within the defined operating area.

At box 580, whether the virtual reality experience is complete is determined. If the virtual reality experience is not complete, then the process returns to box 550, where the user is permitted to participate in a virtual reality experience within the defined operating area. If the virtual reality experience is complete, however, then the process ends.

Figure 6:
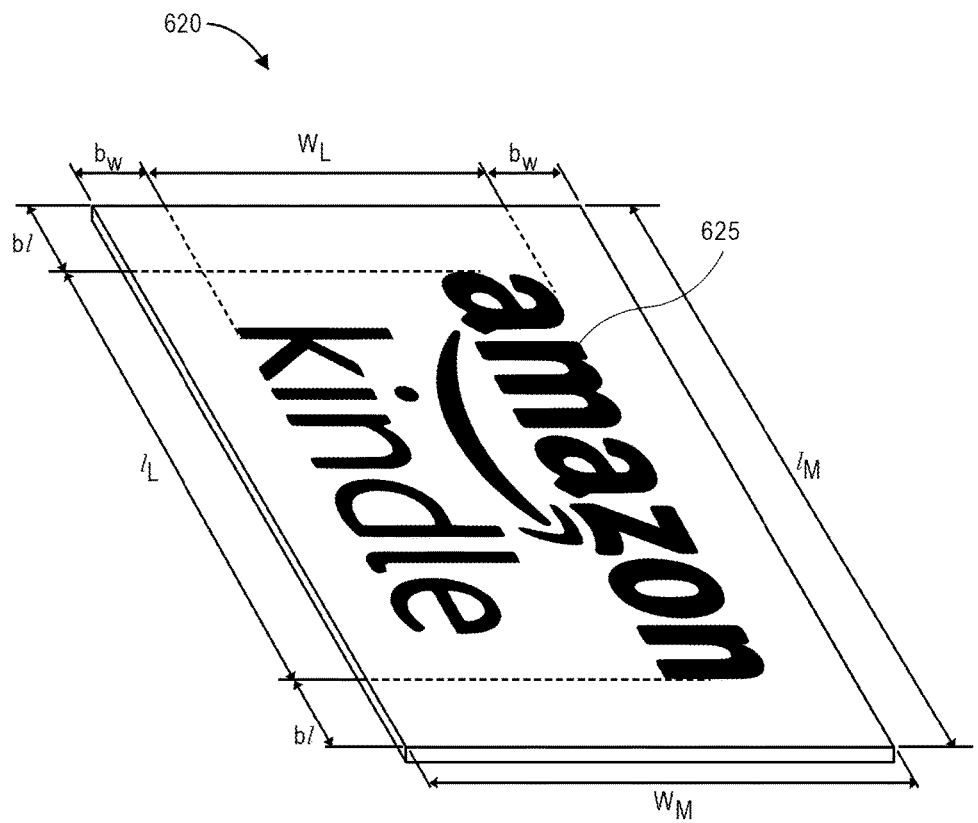
FIG. 6 is a view of one operating surface in accordance with embodiments of the present disclosure.

Referring to FIG. 6, a view of one operating surface in accordance with embodiments of the present disclosure is shown. Except where otherwise noted, reference numerals preceded by the number "6" shown in FIG. 6 indicate components or features that are similar to components or features having reference numerals preceded by the number "4" shown in FIG. 4, by the number "2" shown in the block diagram of FIG. 2 or by the number "1" shown in the system 100 of FIGS. 1A through 1E.

As is shown in FIG. 6, an operating surface 620 in the form of a mat or other floor covering is shown. The operating surface 620 has a substantially rectangular shape, with a length $l_M$ and a width $w_M$, and may be formed from any type or form of materials including but not limited to one or more layers or substrates of natural or synthetic materials such as wools, nylons, polypropylenes, polyesters, rubbers, acrylics, cottons, linens, and others. Alternatively, the operating surface 620 may be configured for mounting in a non-horizontal configuration, e.g., by hanging the operating surface from a wall or other structure within an environment.

Additionally, as is shown in FIG. 6, the operating surface 620 includes a fiducial marking 625 comprising a plurality of alphanumeric characters and other symbols, logos or icons provided on a visible surface of an upper layer of the operating surface 620. The fiducial marking 625 has a length $l_L$ and a width $w_L$, and is applied upon the operating surface 620 at buffers $b_W$ from the long sides of the operating surface 620 and at buffers $b_L$ from the short sides of the operating surface 620.

The fiducial marking 625 of the operating surface 620 is intended to generate a visual contrast with an environment in which the operating surface 620 is provided. For example, when the operating surface 620 is applied to a floor or other traveling or working surface within an environment, or hung from a wall or other structure within the environment, the fiducial marking 625 may be readily recognized as being depicted in imaging data captured by one or more imaging devices of a virtual reality system. Such imaging devices may be provided in a virtual reality headset, a base station, or any other component thereof. The upper layer (or pile) of the operating surface 620 may further have a plurality of fibers with a distinct texture or feel, thereby enabling a user to recognize when he or she is standing thereon based on the texture or feel, and, conversely, when he or she has departed therefrom based on the absence of the texture or feel. Additionally, the operating surface 620 may further include one or more sensors, e.g., infrared sensors having one or more photodiodes and/or integrated circuits, provided therein or thereon. The positions of such sensors, as determined by one or more components of a virtual reality system, may be further utilized in constructing one or more virtual boundaries, and in defining an operating area based on such boundaries.

Figure 7:
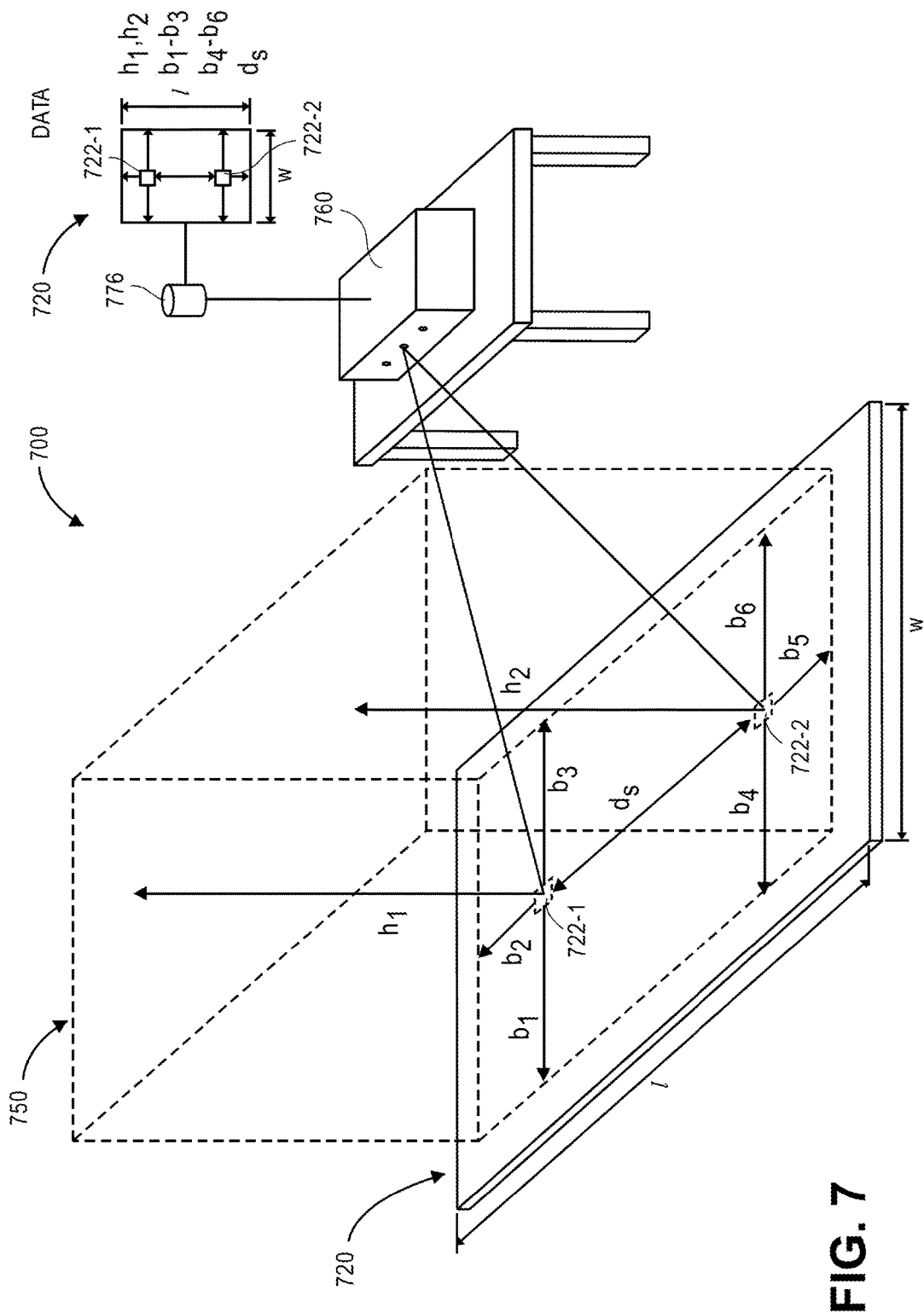
FIG. 7 is a view of aspects of one virtual reality system in accordance with embodiments of the present disclosure.

An operating area having one or more virtual boundaries may be defined based on the positions and/or orientations of one or more sensors, as determined by components of a virtual reality system (e.g., a virtual reality headset and/or a base station). Such positions and orientations may be compared to information or data regarding known operating surfaces, which may be stored in one or more data stores, and an operating area for the virtual reality system may be defined accordingly. Referring to FIG. 7, a view of aspects of one virtual reality system in accordance with embodiments of the present disclosure is shown. Except where otherwise noted, reference numerals preceded by the number "7" shown in FIG. 7 indicate components or features that are similar to components or features having reference numerals preceded by the number "6" shown in FIG. 6, by the number "4" shown in FIG. 4, by the number "2" shown in the block diagram of FIG. 2 or by the number "1" shown in the system 100 of FIGS. 1A through 1E.

As is shown in FIG. 7, a virtual reality system 700 includes an operating surface 720 in the form of a mat or other floor covering and a base station 760 or other virtual reality system component. The operating surface 720 has a substantially rectangular shape, with a length l and a width w, and may be formed from any type or form of materials including but not limited to one or more layers or substrates of natural or synthetic materials such as wools, nylons, polypropylenes, polyesters, rubbers, acrylics, cottons, linens, and others. Additionally, as is shown in FIG. 7, the operating surface 720 includes a pair of sensors 722-1, 722-2, e.g., infrared sensors, provided in discrete locations on the operating surface 720. Alternatively, the operating surface 720 may be configured for mounting in a non-horizontal configuration, e.g., by hanging the operating surface from a wall or other structure within an environment where the virtual reality system 700 is to be used.

As is shown in FIG. 7, the positions of the sensors 722-1, 722-2 may be determined based on signals received by the base station 760, which may include one or more identifiers of the respective sensors 722-1, 722-2 and/or the operating surface 720. The base station 760 may then determine a position and/or an orientation of the operating surface 720 based on the positions of the sensors 722-1, 722-2, e.g., using one or more records maintained in a data store 776 that may reside at the base station 760 or in one or more alternate or virtual locations, e.g., in a "cloud"-based environment, and accessed over one or more networks.

From such records, an operating area 750 for the virtual reality system 700 may be defined to include one or more virtual boundaries with respect to the positions of the sensors 722-1, 722-2. For example, as is shown in FIG. 7, the operating area 750 is defined based on virtual boundaries having heights $h_1$, $h_2$ above positions of each of the sensors 722-1, 722-2, which are separated by a distance $d_S$, as well as buffers $b_1$, $b_2$, $b_3$ with respect to the position of the sensor 722-1 and buffers $b_4$, $b_5$, $b_6$ with respect to the position of the sensor 722-2. In some embodiments, the operating floor may further include a virtual ceiling and/or a virtual floor. Thus, once the operating surface 720 is applied to a portion of a floor or other traveling or working surface, the base station 760 may construct the operating area 750 by simply recognizing the positions of the sensors 722-1, 722-2. Subsequently, if the operating surface 720 is relocated or repositioned with respect to the base station 760, the new positions of the sensors 722-1, 722-2 may be determined by the base station 760 and used to redefine the operating area 760 for the virtual reality system 700.

Therefore, in accordance with the present disclosure, an operating area for a virtual reality system may be quickly and easily established without requiring a user to perform extensive calibration or set-up processes involving the performance of one or more gestures, motions or actions. The placement of an operating surface, such as the operating surface 720, in an environment where a virtual reality system is to be operated and the recognition of positions and/or orientations of one or more sensors therein ensures that the extent of the available space is recognized by the virtual reality system. In some embodiments, the positions and/or orientations of the sensors, and the virtual boundaries of the operating area, may be recognized in the same manner, and as quickly and efficiently, as one or more other components of the virtual reality system (e.g., a headset or other body sensor).

Figure 8B:
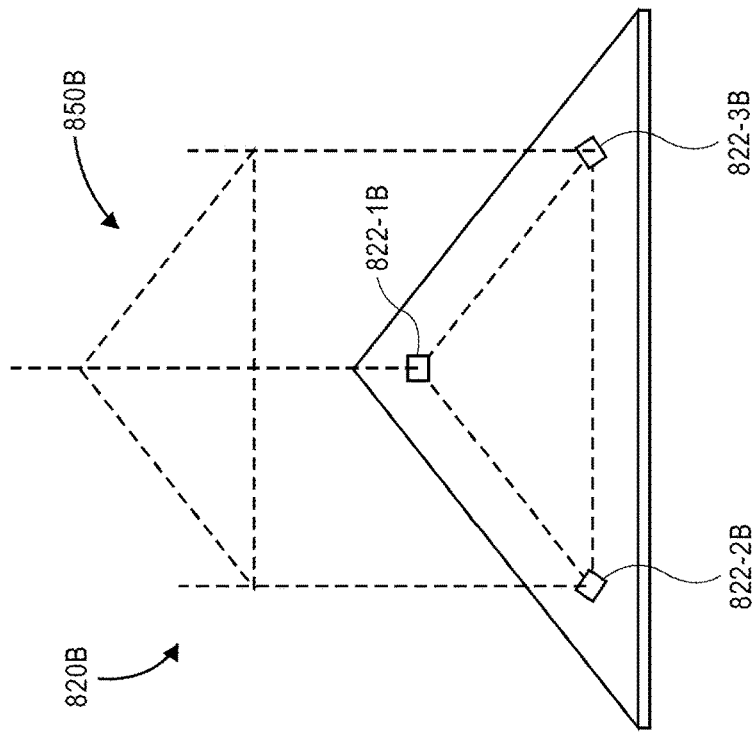
FIGS. 8A and 8B are views of some operating surfaces in accordance with embodiments of the present disclosure.
Figure 8A:
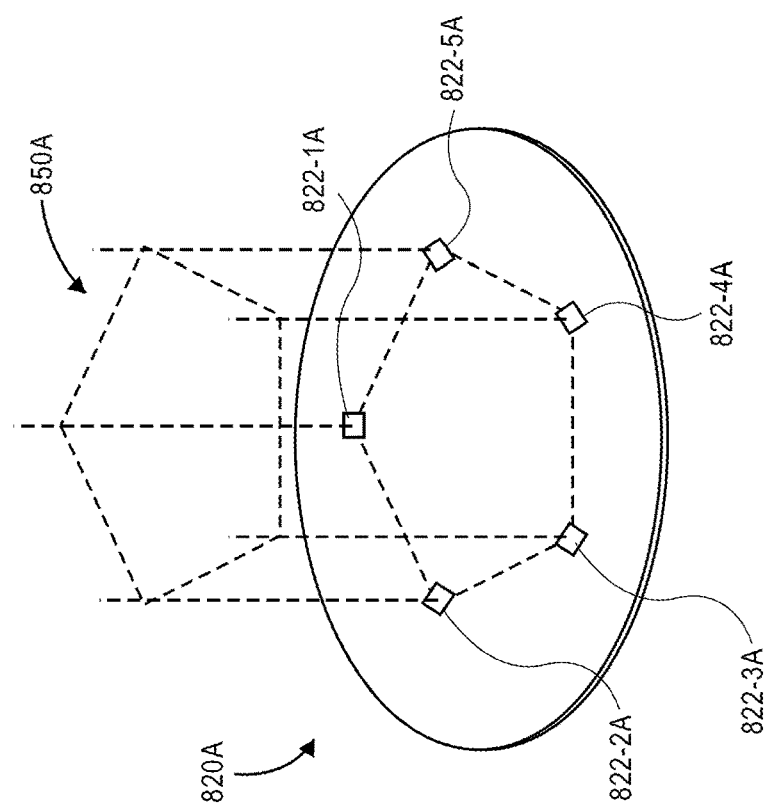

In accordance with the present disclosure, operating surfaces may take any shape or form, and one or more sensors may be provided therein in any polygonal configuration or arrangement. Referring to FIGS. 8A and 8B, views of some operating surfaces in accordance with embodiments of the present disclosure are shown. Except where otherwise noted, reference numerals preceded by the number "8" shown in FIG. 8A or 8B indicate components or features that are similar to components or features having reference numerals preceded by the number "7" shown in FIG. 7, by the number "6" shown in FIG. 6, by the number "4" shown in FIG. 4, by the number "2" shown in the block diagram of FIG. 2 or by the number "1" shown in the system 100 of FIGS. 1A through 1E.

As is shown in FIG. 8A, an operating surface 820A has a shape of a circle or other curved feature (e.g., ellipses, parabolas, hyperbolas or the like). The operating surface 820A may be formed from any type or form of materials including but not limited to one or more layers or substrates of natural or synthetic materials such as wools, nylons, polypropylenes, polyesters, rubbers, acrylics, cottons, linens, and others. As is also shown in FIG. 8A, the operating surface 820A further includes five sensors 822-1A, 822-2A, 822-3A, 822-4A, 822-5A arranged within or on the operating surface 820A in a shape of a regular pentagon. Accordingly, when the operating surface 820A is placed within an operating range of a base station, a virtual reality headset or another unit of a virtual reality system, an operating area 850A having a plurality of virtual boundaries defined by the positions of the sensors 822-1A, 822-2A, 822-3A, 822-4A, 822-5A with respect to the virtual reality unit may be defined and utilized by the virtual reality system. Moreover, the positions of the sensors 822-1A, 822-2A, 822-3A, 822-4A, 822-5A may be used to determine an angle of orientation of the operating surface 820A. For example, where the positions of the sensors 822-1A, 822-2A, 822-3A, 822-4A, 822-5A are each within a common plane, the operating surface 820A may be presumed to be flat. Where one or more of the sensors 822-1A, 822-2A, 822-3A, 822-4A, 822-5A is not within a common plane, the operating surface 820A may be determined to not be flat, or to have one or more disruptions.

As is shown in FIG. 8B, an operating surface 820B has a shape of a triangle, and may also be formed from any type or form of materials. As is also shown in FIG. 8B, the operating surface 820B further includes three sensors 822-1B, 822-2B, 822-3B arranged within or on the operating surface 820B in the shape of an equilateral triangle. Accordingly, when the operating surface 820B is placed within an operating range of a base station, a virtual reality headset or another unit of a virtual reality system, an operating area 850B having a plurality of virtual boundaries defined by the positions of the sensors 822-1B, 822-2B, 822-3B with respect to the virtual reality unit may be defined and utilized by the virtual reality system.

Additionally, an operating surface may include one or more fiducial markings of any size or shape in accordance with the present disclosure. Referring to FIGS. 9A and 9B, views of some operating surfaces in accordance with embodiments of the present disclosure are shown. Except where otherwise noted, reference numerals preceded by the number "9" shown in FIG. 9A or 9B indicate components or features that are similar to components or features having reference numerals preceded by the number "8" shown in FIG. 8A or 8B, by the number "7" shown in FIG. 7, by the number "6" shown in FIG. 6, by the number "4" shown in FIG. 4, by the number "2" shown in the block diagram of FIG. 2 or by the number "1" shown in the system 100 of FIGS. 1A through 1E.

As is shown in FIG. 9A, an operating surface 920A has a shape of a rectangle, and may be formed from any type or form of materials, e.g., natural or synthetic materials such as wools, nylons, polypropylenes, polyesters, rubbers, acrylics, cottons, linens, and others. The operating surface 920A further includes a plurality of fiducial markings 925-1A, 925-2A, 925-3A on a visible surface of an upper layer (or pile) of the operating surface 920A.

When the operating surface 920A is placed within an environment where a virtual reality system is to be used, one or more of the fiducial markings 925-1A, 925-2A, 925-3A may be recognized as being depicted in imaging data that is captured by a base station, a virtual reality headset or another unit of a virtual reality system, and an operating area for the virtual reality system may be defined accordingly. Such imaging data may also be used to determine an angle at which the operating surface 920A is provided, or whether the operating surface has been applied to a non-horizontal surface having one or more disruptions. For example, when the operating surface 920A is applied atop an angled surface (e.g., ramp) or atop a surface having one or more discontinuities (e.g., a set of stairs), the fiducial markings 925-1A, 925-2A, 925-3A will appear in a distorted fashion in imaging data captured by the virtual reality system. Moreover, because the fiducial markings 925-1A, 925-2A, 925-3A are similar shapes, an operating area may be defined based on the extent to which each of the fiducial markings 925-1A, 925-2A, 925-3A appears flat and/or without distortions in the imaging data. For example, where the operating surface 920A is applied to a floor or other traveling or working surface that is flat, but has an area that is smaller than the fiducial marking 925-1A, and larger than the fiducial marking 925-3A, the fiducial marking 925-1A may appear in a distorted fashion in imaging data, e.g., as one or more of the edges of the operating surface 920A is crumpled, wrinkled or folded, while the fiducial marking 925-3A may appear clearly and without distortions in the imaging data. Thus, an operating area may be defined for a virtual reality system based on the innermost fiducial marking 925-3A, within which a user may safely travel.

As is shown in FIG. 9B, an operating surface 920B has a shape of a rectangle, and may be formed from any type or form of materials, e.g., natural or synthetic materials such as wools, nylons, polypropylenes, polyesters, rubbers, acrylics, cottons, linens, and others. The operating surface 920B further includes a fiducial marking 925B in the form of a checkerboard pattern covering an entire visible surface of an upper layer (or pile) of the operating surface 920B.

When the operating surface 920B is placed within an environment where a virtual reality system is to be used, the fiducial marking 925B may be recognized as being depicted in imaging data that is captured by a base station, a virtual reality headset or another unit of a virtual reality system, and an operating area for the virtual reality system may be defined accordingly. Such imaging data may also be used to determine an angle at which the operating surface 920B is provided, or whether the operating surface 920B has been applied to a non-horizontal surface having one or more disruptions. For example, the alternating light and dark squares of the fiducial marking 925B may be expected to create a visual contrast within nearly any environment where the operating surface 920B is applied. Therefore, imaging data captured by a base station, a virtual reality headset or another unit of a virtual reality system may be processed to recognize the checkerboard pattern depicted therein, and one or more virtual boundaries may be generated based on the location and the orientation of the operating surface 920B and the fiducial marking 925B within such an environment. An upper layer of the operating surface 920B may also have a distinct texture or feel that may indicate to a user that he or she is on the operating surface while using a virtual reality system, such as when his or her vision is obscured by a headset or other virtual reality system component. Conversely, when the user no longer experiences the distinct texture or feel, the user may discern that he or she is no longer on the operating surface 920B.

Figure 10:
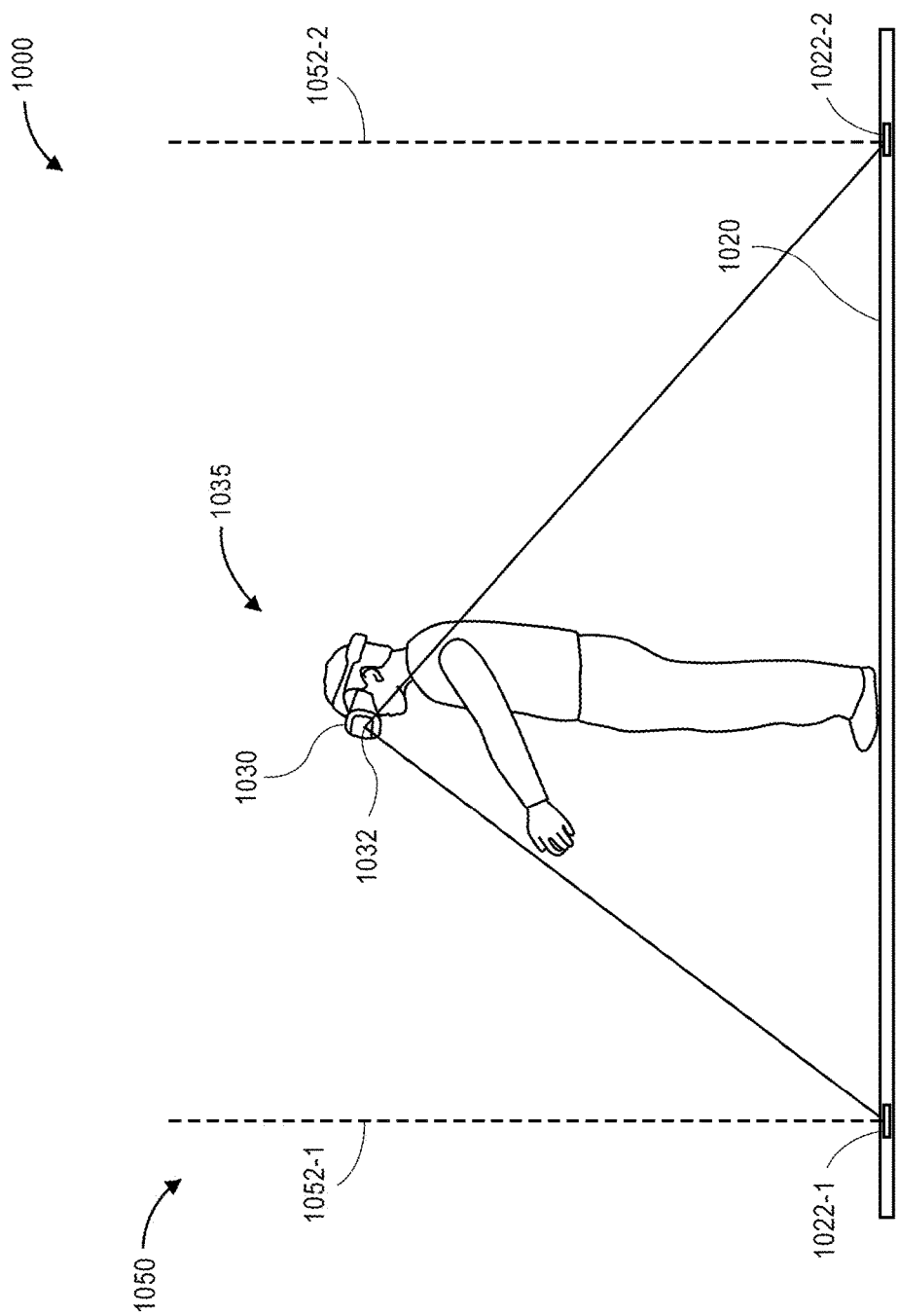
FIG. 10 is a view of aspects of one virtual reality system in accordance with embodiments of the present disclosure.

In accordance with the present disclosure, the sensors and/or fiducial markings disclosed herein may be detected by any type or form of virtual reality unit having one or more corresponding sensors and/or imaging devices, including one or more headsets or mobile devices, and need not be used in conjunction with a fixed console, such as a base station. Referring to FIG. 10, a view of aspects of one virtual reality system in accordance with embodiments of the present disclosure is shown. Except where otherwise noted, reference numerals preceded by the number "10" shown in FIG. 10 indicate components or features that are similar to components or features having reference numerals preceded by the number "9" shown in FIG. 9A or 9B, by the number "8" shown in FIG. 8A or 8B, by the number "7" shown in FIG. 7, by the number "6" shown in FIG. 6, by the number "4" shown in FIG. 4, by the number "2" shown in the block diagram of FIG. 2 or by the number "1" shown in the system 100 of FIGS. 1A through 1E.

As is shown in FIG. 10, a virtual reality system 1000 includes an operating surface 1020 and a virtual reality headset 1030. The operating surface 1020 includes a pair of sensors 1022-1, 1022-2 disposed therein or thereon. The virtual reality headset 1030 is shown as being worn by a user 1035 who is operating the virtual reality system 1000. The virtual reality headset 1030 includes a plurality of sensors 1032, e.g., infrared sensors that may be configured to transmit and/or receive infrared signals and to determine positions of the sensors 1022-1, 1022-2 based on such signals.

For example, as is shown in FIG. 10, the virtual reality headset 1030 determines the positions of the sensors 1022-1, 1022-2, and generates the virtual boundaries 1052-1, 1052-2 based on the positions of the sensors 1022-1, 1022-2. The virtual boundaries 1052-1, 1052-2 may be used to define an operating area 1050 for the virtual reality system 1000. Accordingly, the virtual reality headset 1030 may continue to track its position with respect to the operating area 1050, and prompt the user 1035, e.g., by one or more visible or audio messages, or in any other manner, if the user 1035 approaches or breaches one or more of the virtual boundaries 1052-1, 1052-2.

Although the virtual reality headset 1030 is shown as having a head-mounted or face-mounted frame and strap, those of ordinary skill in the pertinent arts will recognize that any type or form of portable virtual reality unit may be utilized in accordance with the present disclosure. For example, a virtual reality unit formed from a mobile device having one or more sensors and a temporary frame (e.g., cardboard) that does not include a strap or is not configured for rigid mounting to the head or the face of the user may also be utilized.

As is discussed above, when one or more virtual boundaries or other attributes of an environment are determined using one or more of the sensors and/or fiducial markings of the present disclosure, such virtual boundaries or attributes may be incorporated into a virtual reality experience, thereby enabling a virtual reality system to customize the virtual reality experience for a given environment. For example, whether a user intends to operate a virtual reality system indoors or outdoors, in an expansive auditorium or in a narrow hallway, in a wide open family room or in a low-ceiling basement, the systems and methods of the present disclosure may be utilized to define an operating area for the virtual reality system so that any virtual reality experience operated thereby may be appropriately tailored to the constraints of the actual environment in which the virtual reality system is to be utilized.

Figure 11:
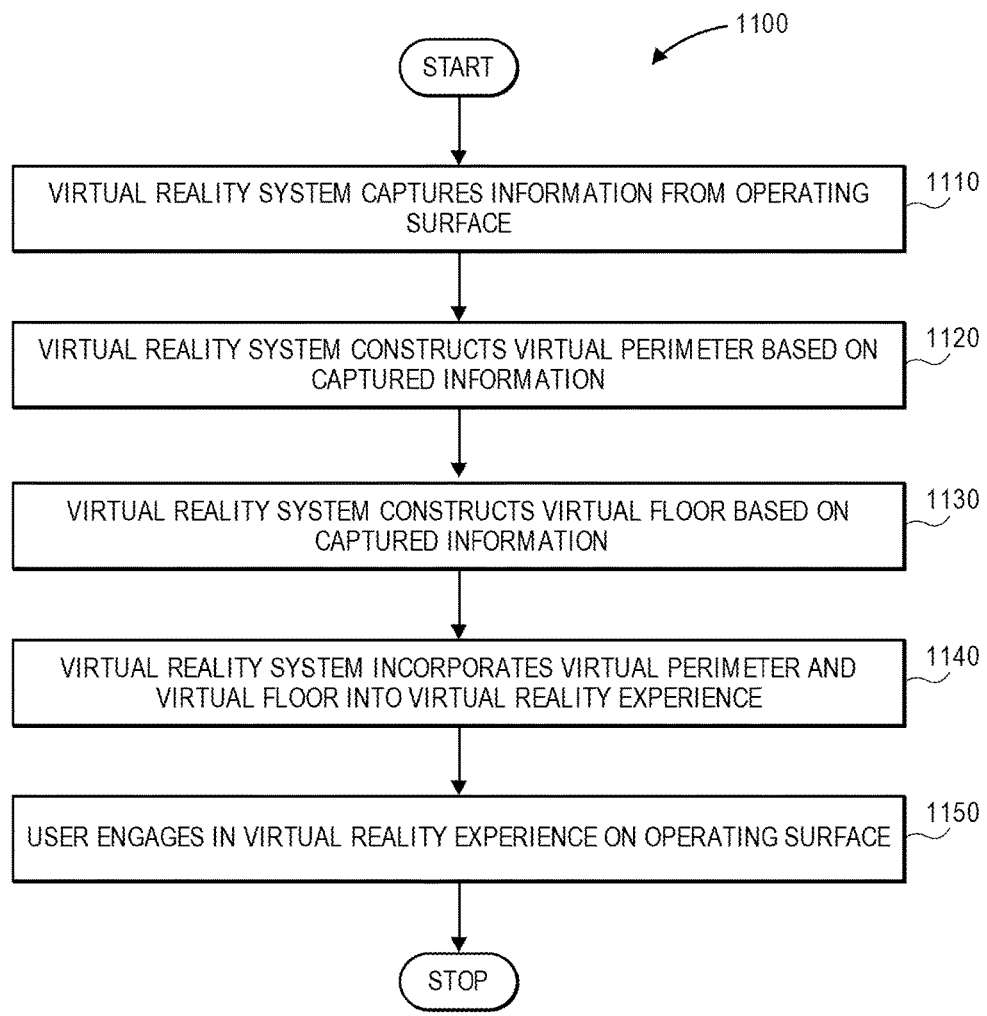
FIG. 11 is a flow chart of one process for defining an operating area for virtual reality systems in accordance with embodiments of the present disclosure.

Referring to FIG. 11, a flow chart 1100 of one process for defining an operating area for virtual reality systems in accordance with embodiments of the present disclosure is shown. At box 1110, a virtual reality system captures information from an operating surface. For example, where the operating surface includes one or more sensors, the operating surface may transmit one or more signals (e.g., infrared signals) to a base station, a virtual reality headset, or another unit of the virtual reality system, or receive one or more signals from the base station, the virtual reality headset or the other unit, and may determine information regarding the operating surface based on such signals. Where the operating surface includes one or more fiducial markings, e.g., colors, patterns, logos or other markings, one or more images of the operating surface may be captured, and information regarding the operating surface may be determined based on one or more analyses of the images. Some of the information that may be determined from such signals may include, but is not limited to, the positions of sensors and/or edges, contours, outlines, colors, textures, silhouettes, shapes or other characteristics of any fiducial markings within the images, surface angles, or orientations of the operating surface, as well as any surface discontinuities or other features of an underlying floor or other traveling or working surface onto which the operating surface is applied, which may be identified based on relative differences between the respective positions of sensors and/or visible distortions in the fiducial markings, as expressed in one or more images.

At box 1120, the virtual reality system constructs a virtual perimeter based on the captured information. The perimeter may include one or more virtual boundaries and may define an operating area for the virtual reality system. Where the captured information includes positions of one or more sensors, one or more virtual boundaries may be defined based on line segments, arcs or other segments (e.g., curvilinear segments) extending between two of the positions, along with rays extending vertically upward from such positions, as well as any points in space between such rays and above such line segments, arcs or other segments. Where the captured information includes positions or orientations of any aspects of fiducial markings on the operating surface, one or more virtual boundaries may be defined based on two or more aspects of the fiducial markings, along with rays extending vertically upward from such aspects, and any points in space between such rays and above such aspects. Visual boundaries may also be defined with respect to one or more offsets, buffers or other set-offs with respect to positions of sensors or aspects of one or more fiducial markings, as well.

At box 1130, the virtual reality system constructs a virtual floor based on the captured information. For example, where the operating surface includes a plurality of sensors distributed throughout a mat or other like covering for a floor or other traveling or working surface, or one or more fiducial markings, a virtual floor that corresponds with an actual floor of an environment where the virtual reality system is operated may be constructed based on the positions of the sensors and/or the appearance of one or more fiducial markings within imaging data. The positions of the sensors and/or the appearance of the fiducial markings may indicate whether the actual floor is flat or angled, or includes any discontinuities such as stairs, curbs or bumps.

At box 1140, the virtual reality system incorporates the virtual perimeter and the virtual floor into a virtual reality experience. For example, where a virtual reality experience is programmed to include specific virtual boundaries and/or a specific floor, such as video games, virtual tours, news or educational programs, the virtual reality experience may be modified to reflect the virtual perimeter defined at box 1120 and the virtual floor defined at box 1130. To the extent that the virtual perimeter and the virtual floor mimic the actual constraints of an environment in which the virtual reality system is operated, the adverse effects of cognitive dissonance may be mitigated. At box 1150, the user engages in the virtual reality experience on the operating surface, and the process ends.

Where an operating surface includes a plurality of distributed sensors, or fiducial markings thereon, an operating area may be defined based on relative differences in the determined positions of such sensors, or the positions and/or orientations of aspects of the fiducial markings. Aspects of the operating area that may be defined include, but are not limited to, the placement, the size and/or the location of one or more virtual boundaries and/or surface features of a virtual floor. Referring to FIGS. 12A through 12D, views of aspects of one virtual reality system in accordance with embodiments of the present disclosure are shown. Except where otherwise noted, reference numerals preceded by the number "12" shown in FIGS. 12A through 12D indicate components or features that are similar to components or features having reference numerals preceded by the number "10" shown in FIG. 10, by the number "9" shown in FIG. 9A or 9B, by the number "8" shown in FIG. 8A or 8B, by the number "7" shown in FIG. 7, by the number "6" shown in FIG. 6, by the number "4" shown in FIG. 4, by the number "2" shown in the block diagram of FIG. 2 or by the number "1" shown in the system 100 of FIGS. 1A through 1E.

Figure 12A:
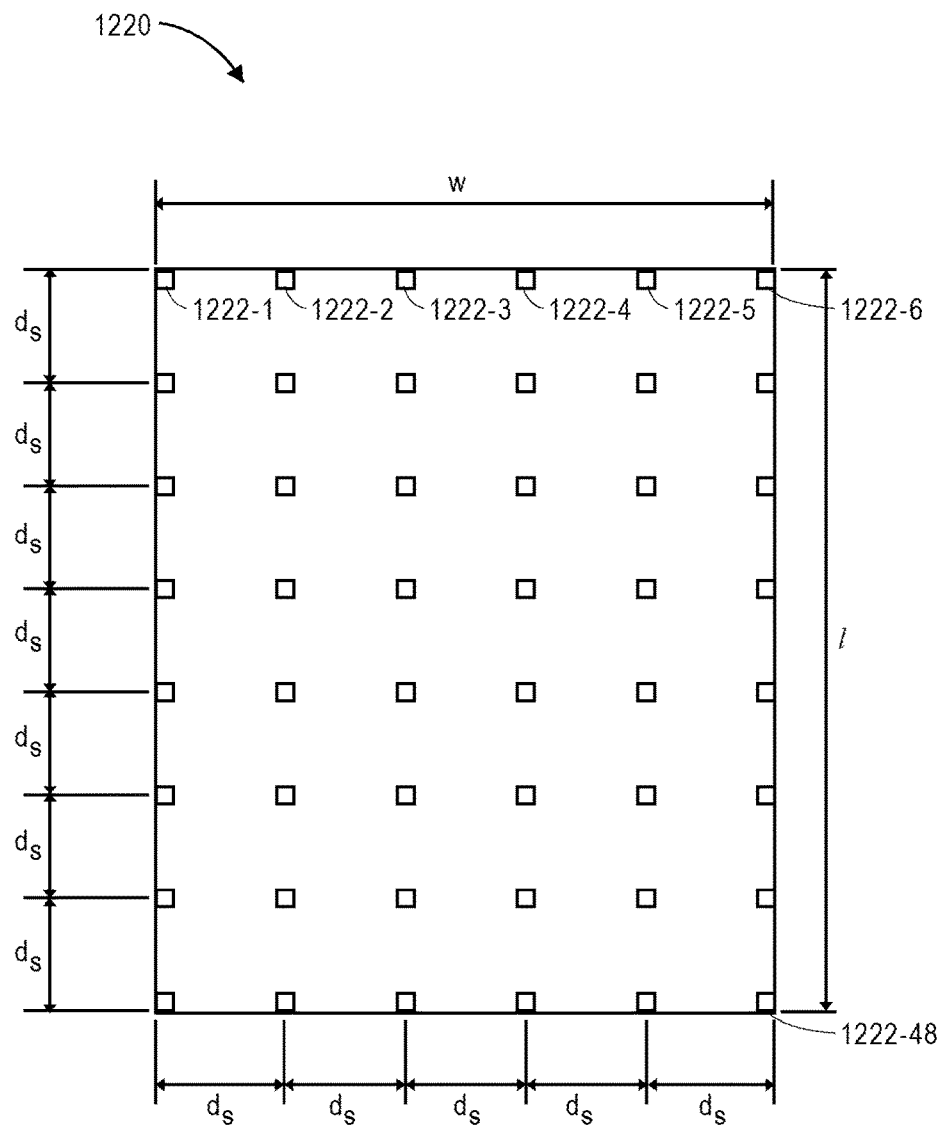

As is shown in FIGS. 12A-12E, a virtual reality system 1200 includes an operating area 1220, a virtual reality headset 1230-1 and a virtual reality controller 1230-2. As is shown in FIG. 12A, the operating surface 1220 has a length l and a width w, and includes forty-eight sensors 1220-1 through 1220-48 evenly distributed throughout or in association with an upper layer (or pile) of the operating surface 1220. Each of the sensors 1220-1 through 1220-48 is shown as separated by an even distance (or interval) $d_S$. For example, where the operating surface 1220 has a width w of five feet and a length l of seven feet, the distance $d_S$ separating the respective sensors is approximately one foot.

The positions of the respective sensors with respect to themselves and one another may be used to define one or more aspects of the operating area, e.g., virtual boundaries such as a virtual perimeter and/or a virtual floor, and information or data regarding such aspects may be used to customize a virtual reality experience for a user, to ensure that the virtual environment in which the user is engaged responds to the actual environment in which the user is located. As is shown in FIG. 12B, where the operating surface 1220 is applied to a flat floor or other traveling or working surface, such that each of the sensors 1222-1 through 1222-48 is provided in a common plane and at a common height, a virtual reality experience (e.g., a simulated golf game) displayed to a user 1235 on displays 1240-L, 1240-R within the virtual reality headset 1230-1 includes a correspondingly flat surface.

As is shown in FIG. 12C, where the operating surface 1220 is applied to a floor or other traveling or working surface at an angle θ with respect to horizontal, such that each of the sensors 1222-1 through 1222-48 is provided in a common plane but at varying heights with respect to one another, the same virtual reality experience displayed to the user 1235 on the displays 1240-L, 1240-R includes a surface provided at approximately the angle θ with respect to horizontal, mimicking the actual environment in which the operating surface 1220 is provided.

Figure 12D:
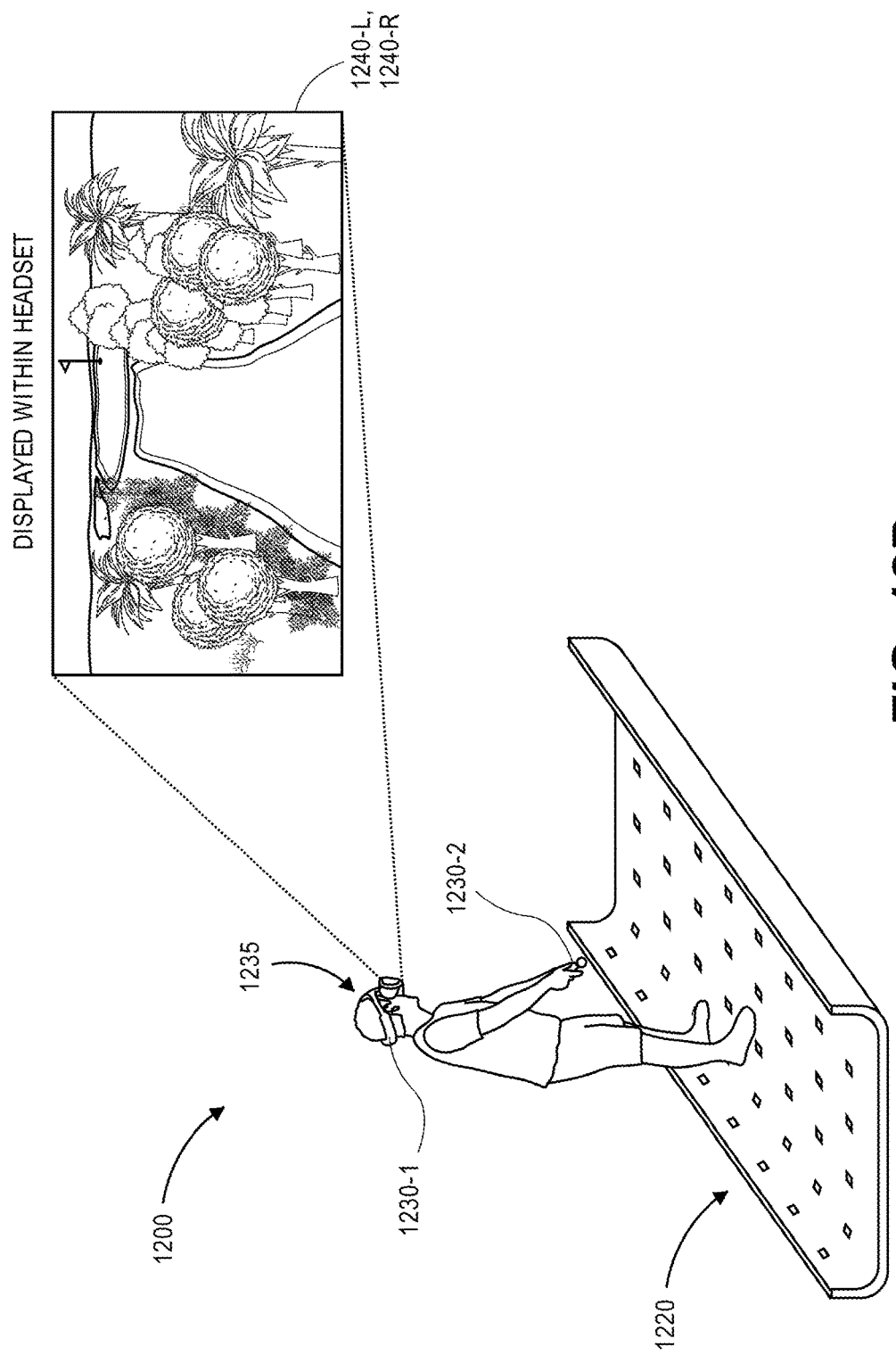

As is shown in FIG. 12D, where the operating surface 1220 is applied to a floor that is narrower than the width w of the operating surface 1220, thereby causing portions of the operating surface 1220 to curl on either side, some of the sensors 1222-1 through 1222-48 are provided on a common, flat plane, while others of the sensors 1222-1 through 1222-48 are curled vertically upward with respect to the common, flat plane. As a result, the same virtual reality experience that is displayed to the user 1235 on the displays 1240-L, 1240-R includes a central surface that is flat and narrow, with occlusions to the left and the right sides of the central surface, mimicking the actual environment in which the operating surface 1220 is provided.

Figure 13A:
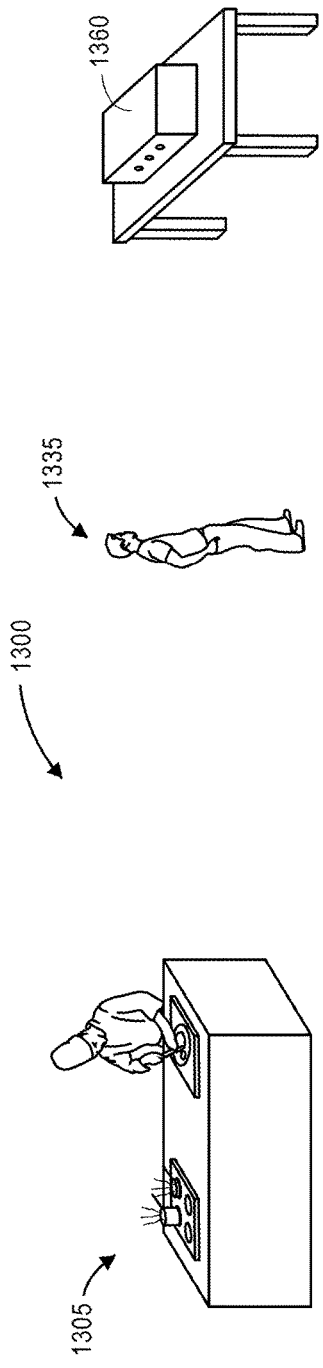
FIGS. 13A and 13B are views of aspects of one system in accordance with embodiments of the present disclosure.
Figure 13B:
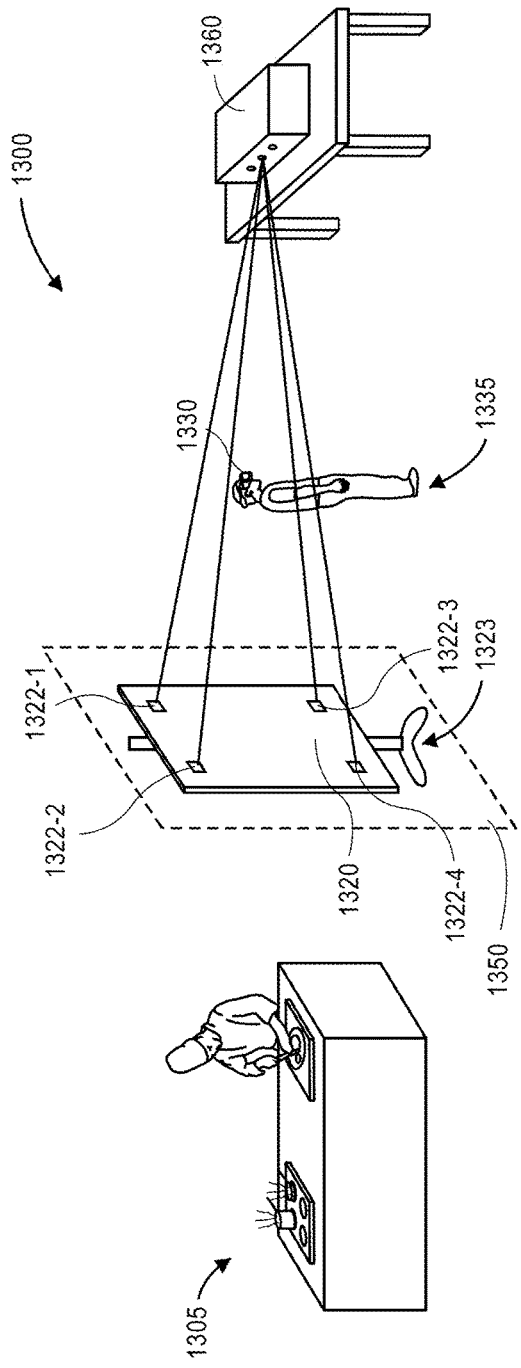

As is discussed above, one or more operating surfaces of the present disclosure may be applied vertically as well as horizontally, or at any other angles, and used to construct one or more virtual boundaries or other features of an operating area for a virtual reality system. Referring to FIGS. 13A and 13B, views of aspects of one system in accordance with embodiments of the present disclosure are shown. Except where otherwise noted, reference numerals preceded by the number "13" shown in FIG. 13A or 13B indicate components or features that are similar to components or features having reference numerals preceded by the number "12" shown in FIGS. 12A through 12D, by the number "10" shown in FIG. 10, by the number "9" shown in FIG. 9A or 9B, by the number "8" shown in FIG. 8A or 8B, by the number "7" shown in FIG. 7, by the number "6" shown in FIG. 6, by the number "4" shown in FIG. 4, by the number "2" shown in the block diagram of FIG. 2 or by the number "1" shown in the system 100 of FIGS. 1A through 1E.

As is shown in FIGS. 13A and 13B, a system 1300 includes a restricted access area 1305 (e.g., a kitchen), an operating surface 1320, a virtual reality headset 1330 and a base station 1360. The operating surface 1320 comprises a plurality of sensors 1322-1, 1322-2, 1322-3, 1322-4 disposed therein, e.g., at or near corners of one or more rectangular-shaped layers or substrates.

In accordance with the present disclosure, where a user 1335 intends to operate the virtual reality headset 1330 and/or the base station 1360 in a given location, the user 1335 may create a safe operating area by mounting the operating surface 1320 to an easel 1323 (or a stand or other structure or fixture) between the given location and the restricted access area 1305. As is shown in FIG. 13B, after the operating surface 1320 has been mounted to the easel 1323, the base station 1360 may determine positions of the respective sensors 1322-1, 1322-2, 1322-3, 1322-4, and may construct a virtual boundary 1350 in the form of a planar section for the base station 1360 and/or the virtual reality headset 1330 based on the positions of the sensors 1322-1, 1322-2, 1322-3, 1322-4. After the virtual boundary 1350 has been constructed, the user 1335 may be alerted if he or she approaches the restricted access area 1305 while wearing the virtual reality headset 1330, e.g., by one or more audible or visible prompts, or other forms of feedback.

Alternatively or additionally, those of ordinary skill in the pertinent arts may recognize that the operating surface 1320 may include one or more fiducial markings thereon. The virtual boundary 1350 may be constructed once the virtual reality headset 1330 and/or the base station 1360 recognizes the fiducial markings.

In some embodiments, a plurality of sensors may be used to define one or more virtual boundaries even if the sensors are not associated with a sheet-like layer or substrate. For example, sensors may be manually distributed and/or installed in one or more discrete locations, and one or more virtual boundaries may be constructed once the positions of such sensors are recognized. Referring to FIGS. 14A through 14E, views of aspects of one virtual reality system in accordance with embodiments of the present disclosure are shown. Except where otherwise noted, reference numerals preceded by the number "14" shown in FIGS. 14A through 14E indicate components or features that are similar to components or features having reference numerals preceded by the number "13" shown in FIG. 13A or 13B, by the number "12" shown in FIGS. 12A through 12D, by the number "10" shown in FIG. 10, by the number "9" shown in FIG. 9A or 9B, by the number "8" shown in FIG. 8A or 8B, by the number "7" shown in FIG. 7, by the number "6" shown in FIG. 6, by the number "4" shown in FIG. 4, by the number "2" shown in the block diagram of FIG. 2 or by the number "1" shown in the system 100 of FIGS. 1A through 1E.

As is shown in FIGS. 14A through 14E, a virtual reality system 1400 includes a plurality of sensors 1422A, 1422B, 1422C, 1422D, as well as a virtual reality headset 1430 and a base station 1460. The virtual reality headset 1430 is configured for wearing about a head or a face of a user 1435.

Figure 14A:
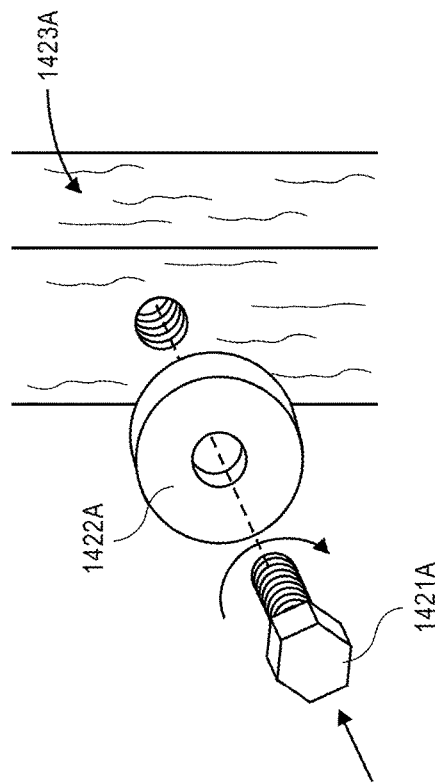
FIGS. 14A through 14E are views of aspects of one virtual reality system in accordance with embodiments of the present disclosure.

The sensors of the present disclosure may take any shape or form, and may be mounted within an actual environment where a virtual reality system is to be operated in any manner. For example, as is shown in FIG. 14A, the sensor 1422A has a substantially annular or toroidal construction, with a bore extending therethrough. The sensor 1422A may be mounted to a surface 1423A quickly and efficiently, by a fastener of any type or kind that may be accommodated within the bore and fixedly or releasably joined to the surface 1423A. For example, as is shown in FIG. 14A, a threaded bolt 1421A having a nominal and/or major diameter less than an internal diameter of the bore of the sensor 1422A may be extended through the bore and rotated into an opening of the surface 1423A having internal threads corresponding to the external threads of the threaded bolt 1421A. Once the sensor 1422A is mounted to the surface 1423A, the sensor 1422A may receive signals from one or more sources, and a position of the sensor 1422A may be determined in response to such signals.

Figure 14B:
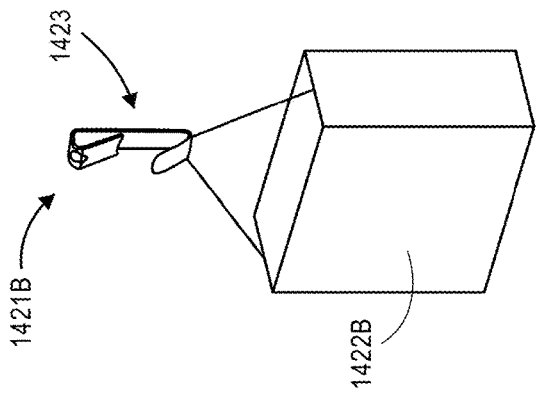
Figure 14C:
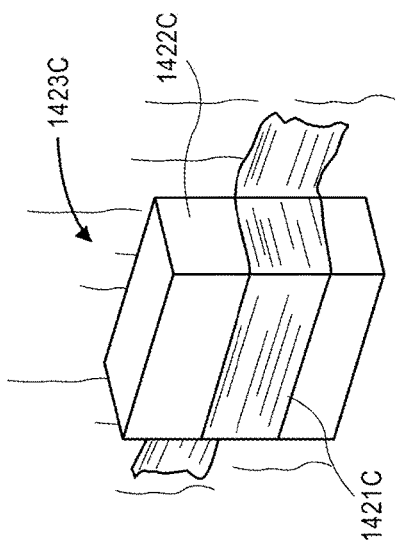
Figure 14D:
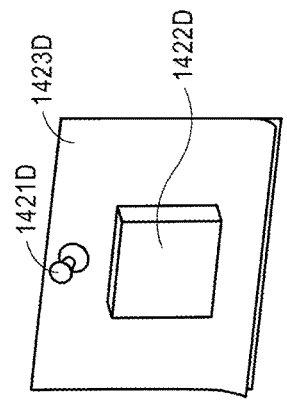

Similarly, as is shown in FIG. 14B, the sensor 1422B may include a loop of wire, rope or another tensile member that enables the sensor 1422B to be hung from a hook 1421B or other hanging element mounted to a surface 1423B. As is shown in FIG. 14C, the sensor 1422C may be adhered to a surface 1423C by any means, including but not limited to a strip 1421C of an adhesive member. As is shown in FIG. 14D, the sensor 1422D may be mounted to a substrate 1423D and applied to a surface by poking a pin 1421D or another fastener through the substrate. Those of ordinary skill in the pertinent arts will recognize that the sensors of the present disclosure may be mounted and/or installed in any manner and by any means, including but not limited to one or more belts, straps, bands, clamps, clips, glues, straps, tapes, fasteners, stakes, nails or posts, any other tension members, compression members or adhesives or the like, and the sensors need not be joined to an actual surface. Alternatively, those of ordinary skill in the pertinent arts will recognize that one or more fiducial markings may also be mounted within such an environment in any manner, such as by one or more of the techniques or features shown in FIGS. 14A through 14D.

Figure 14E:
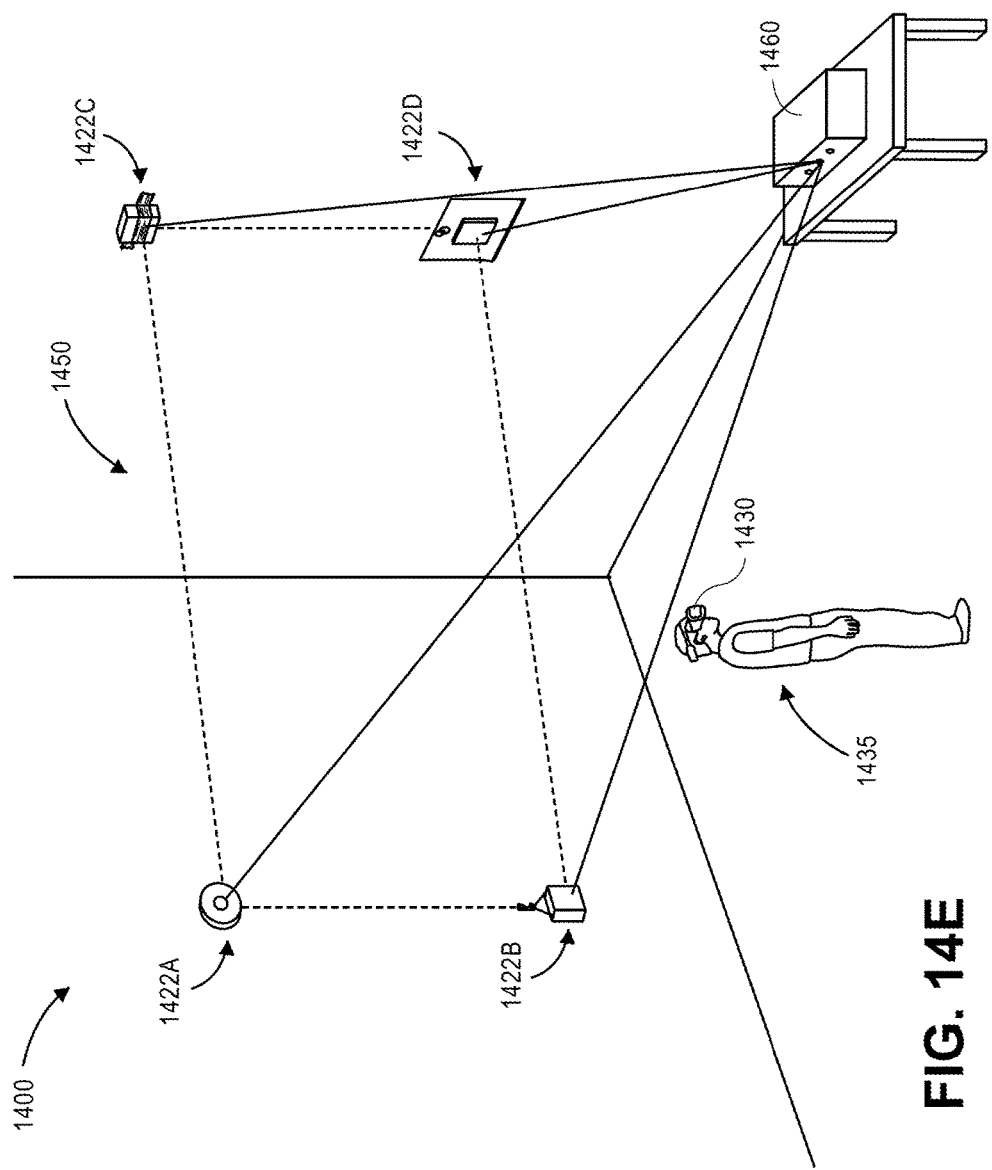

Once the sensors 1422A, 1422B, 1422C, 1422D have been installed within an environment, such sensors may be used to define an operating area for a virtual reality system. For example, as is shown in FIG. 14E, when the base station 1460 recognizes the positions of the sensors 1422A, 1422B, 1422C, 1422D, an operating area 1450 may be defined from such positions. Alternatively, the positions of the sensors 1422A, 1422B, 1422C, 1422D may be determined by the virtual reality headset 1430, and the operating area 1450 may be defined based on such positions.

As is discussed above, the virtual boundaries of the present disclosure may take any form, and may have any dimensions. For example, the virtual boundaries may have any shape and may be defined with respect to one or more bounds or limits, and a virtual reality experience may be customized based on the shapes of the virtual boundaries. A user of a virtual reality system within an operating area defined by such virtual boundaries may execute any number of gestures, motions or other actions with respect to such virtual boundaries, subject to the constraints imposed by such bounds or limits. For example, the user may reach above, below or around any virtual boundaries, as such boundaries are represented within the virtual reality experience.

Figure 15B:
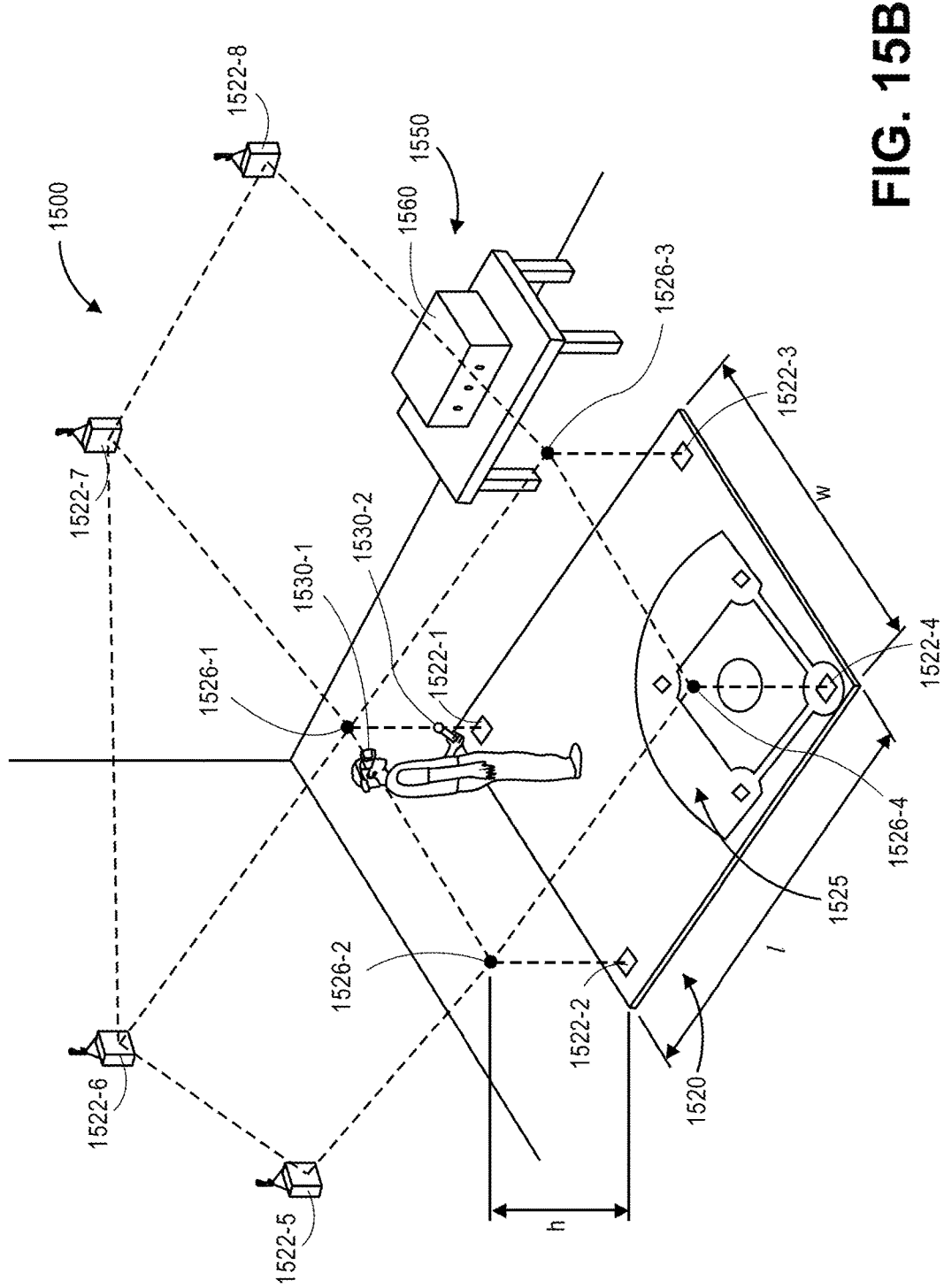

Referring to FIGS. 15A through 15C, views of aspects of one virtual reality system in accordance with embodiments of the present disclosure are shown. Except where otherwise noted, reference numerals preceded by the number "15" shown in FIGS. 15A through 15C indicate components or features that are similar to components or features having reference numerals preceded by the number "14" shown in FIGS. 14A through 14E, by the number "13" shown in FIG. 13A or 13B, by the number "12" shown in FIGS. 12A through 12D, by the number "10" shown in FIG. 10, by the number "9" shown in FIG. 9A or 9B, by the number "8" shown in FIG. 8A or 8B, by the number "7" shown in FIG. 7, by the number "6" shown in FIG. 6, by the number "4" shown in FIG. 4, by the number "2" shown in the block diagram of FIG. 2 or by the number "1" shown in the system 100 of FIGS. 1A through 1E.

As is shown in FIGS. 15A through 15C, a virtual reality system 1500 includes an operating surface 1520, a plurality of sensors 1522-1, 1522-2, 1522-3, 1522-4, 1522-5, 1522-6, 1522-7, 1522-8, a virtual reality headset 1530-1, a virtual reality controller 1530-2 and a base station 1560. The operating surface 1520 has the form of a mat or other floor covering in the shape of a rectangle, and includes the sensors 1522-1, 1522-2, 1522-3, 1522-4 disposed within corners of the operating surface 1520. The operating surface 1520 further includes a fiducial marking 1525 (e.g., an image of a portion of a baseball diamond) on an upper layer (or pile) thereof. Additionally, the sensors 1522-5, 1522-6, 1522-7, 1522-8 are mounted to portions of walls within a room.

In accordance with the present disclosure, the virtual reality system 1500 of FIGS. 15A through 15C may be configured to generate an operating area 1550 based on the positions of the sensors 1522-1, 1522-2, 1522-3, 1522-4, 1522-5, 1522-6, 1522-7, 1522-8. As is shown in FIG. 15B, the operating area 1550 includes a box-like region defined by a plurality of virtual boundaries, and has a length l defined by the distance between the sensor 1522-1 and the sensor 1522-3, or between the sensor 1522-2 and the sensor 1522-4, and a width w defined by the distance between the sensor 1522-1 and the sensor 1522-2, or between the sensor 1522-3 and the sensor 1522-4. The box-like region has upper bounds at a height h extending vertically upward from the positions of each of the sensors 1522-1, 1522-2, 1522-3, 1522-4 to points 1526-1, 1526-2, 1526-3, 1526-4. The operating area 1550 is further defined by virtual boundaries formed by polygonal sections extending between the positions of the sensors 1522-5, 1522-6, 1522-7, 1522-8 and the points 1526-1, 1526-2, 1526-3. Thus, a user 1535 of the virtual reality system 1500 may wear a virtual reality headset 1530-1 and/or operate a handheld virtual reality controller 1530-2 within the box-like region defined by the positions of the sensors 1522-1, 1522-2, 1522-3, 1522-4 and the points 1526-1, 1526-2, 1526-3, 1526-4, and above and over the upper bounds at the height h, subject to the virtual boundaries formed by the polygonal sections extending between the positions of the sensors 1522-5, 1522-6, 1522-7, 1522-8 and the points 1526-1, 1526-2, 1526-3.

As is shown in FIG. 15C, a virtual reality experience may be customized based on the operating area 1550, thereby enabling the user 1535 to reach over the upper bounds of the box-like region during the virtual reality experience. For example, as is shown in FIG. 15C, as the user 1535 extends the virtual reality controller 1530-2 over the upper bounds of the box-like region during a simulated baseball game within a virtual stadium, images that are displayed to the user 1535 on displays 1540-L, 1540-R within the virtual reality headset 1530-1 depict the user 1535 reaching over a fence of the virtual stadium to make a play. The virtual reality system 1500 thus takes into account the shapes and dimensions of the operating area 1550, as determined by the positions of the sensors 1522-1, 1522-2, 1522-3, 1522-4, 1522-5, 1522-6, 1522-7, 1522-8, and customizes the virtual stadium and, therefore, the reality experience of the user 1535 based on the operating area 1550. For example, if the user 1535 relocates or repositions the operating surface 1520, the virtual stadium will appear differently to the user 1535 on the displays 1540-L, 1540-R. Various attributes of the virtual reality experience, including but not limited to the height h, or the length l or the width w of the virtual boundaries, may be varied accordingly.

Figure 16A:
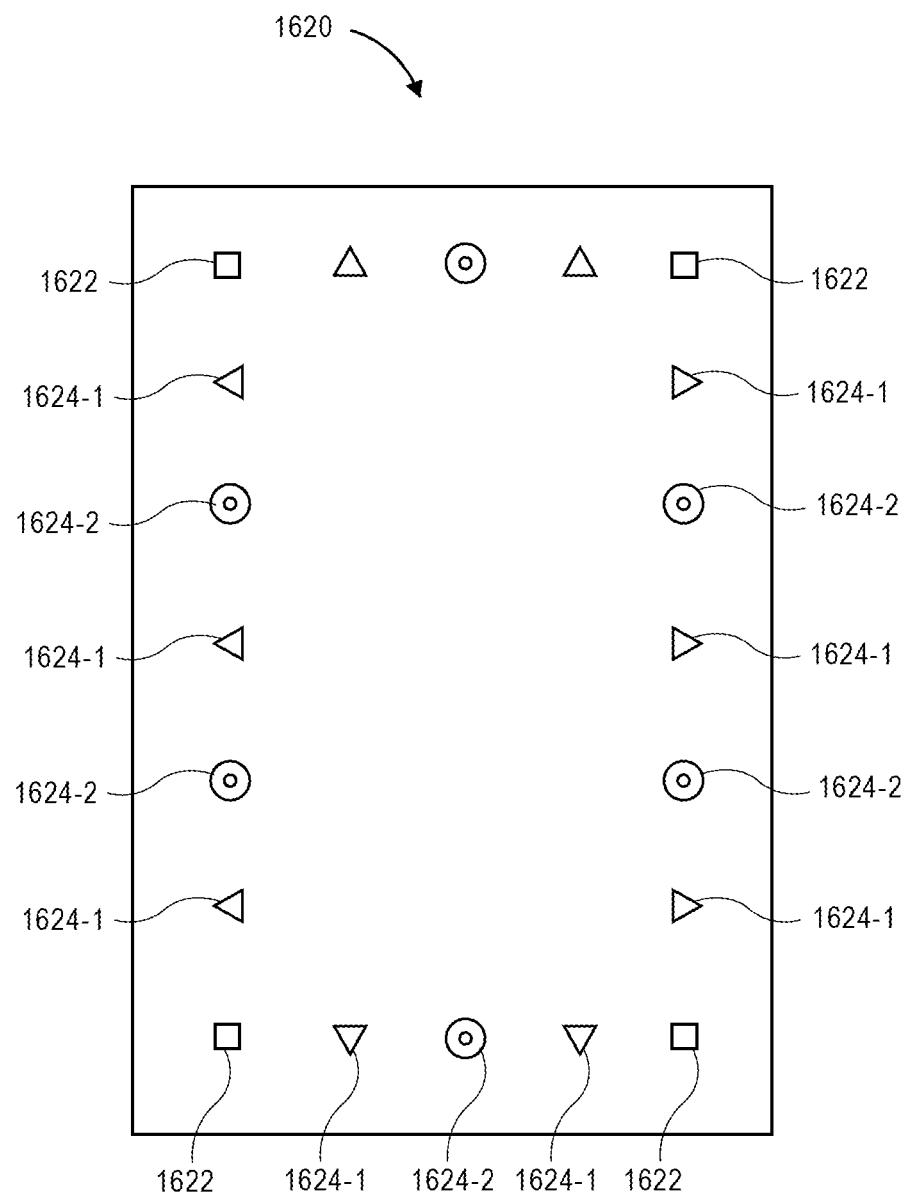
FIGS. 16A and 16B are views of aspects of one virtual reality system in accordance with embodiments of the present disclosure.
Figure 16B:
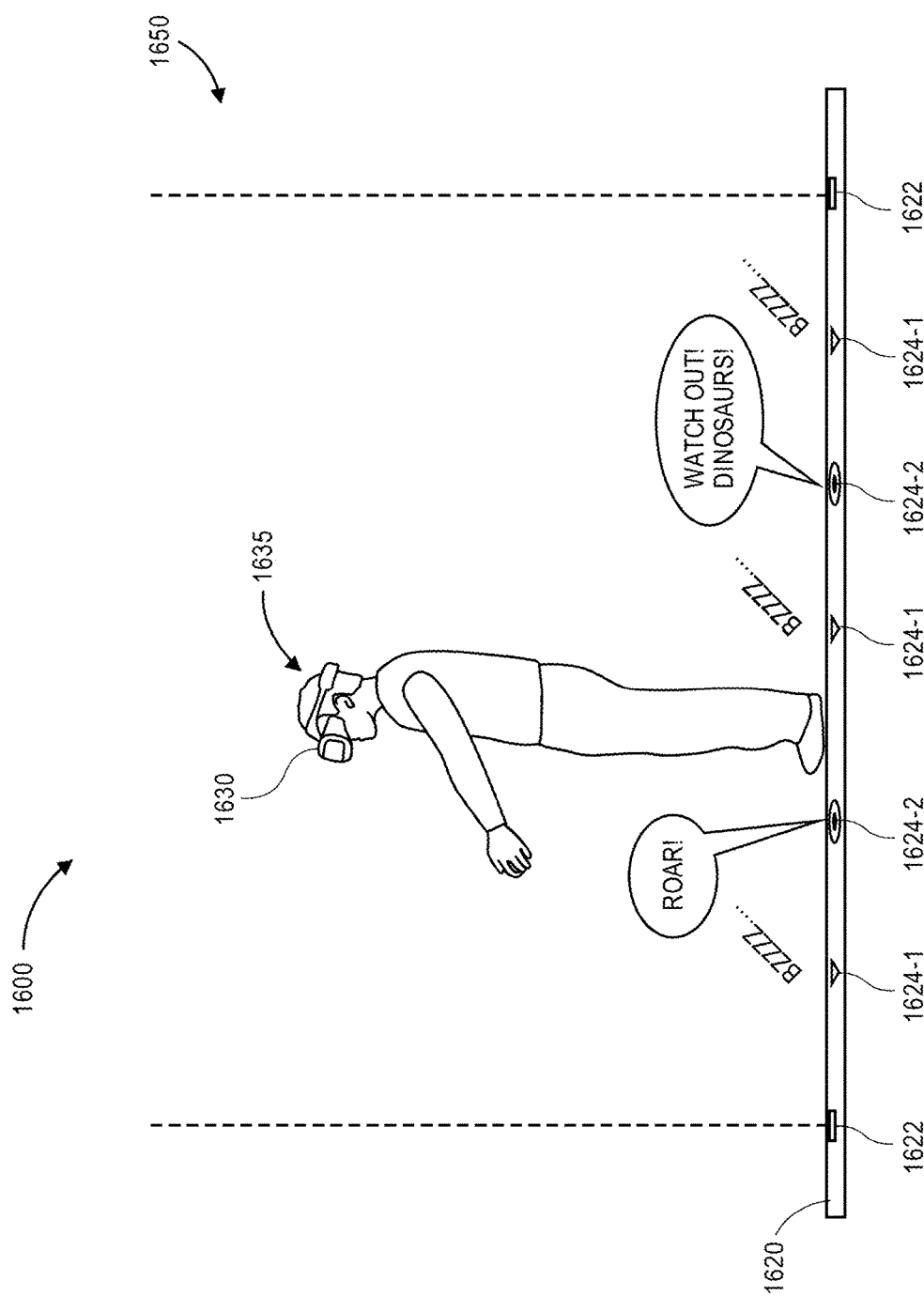

In accordance with the present disclosure, any type or form of feedback may be provided to users of virtual reality systems when such users approach or breach one or more virtual boundaries of an operating area. For example, information including one or more indications that the user has approached or breached a virtual boundary may be displayed to a user on one or more displays (e.g., within a virtual reality headset). Alternatively, any other feedback may be provided to the user, including but not limited to audible feedback and/or haptic feedback. Referring to FIGS. 16A and 16B, views of aspects of one virtual reality system in accordance with embodiments of the present disclosure are shown. Except where otherwise noted, reference numerals preceded by the number "16" shown in FIGS. 16A and 16B indicate components or features that are similar to components or features having reference numerals preceded by the number "15" shown in FIGS. 15A through 15C, by the number "14" shown in the FIGS. 14A through 14E, by the number "13" shown in FIG. 13A or 13B, by the number "12" shown in FIGS. 12A through 12D, by the number "10" shown in FIG. 10, by the number "9" shown in FIG. 9A or 9B, by the number "8" shown in FIG. 8A or 8B, by the number "7" shown in FIG. 7, by the number "6" shown in FIG. 6, by the number "4" shown in FIG. 4, by the number "2" shown in the block diagram of FIG. 2 or by the number "1" shown in the system 100 of FIGS. 1A through 1E.

As is shown in FIGS. 16A and 16B, a virtual reality system 1600 includes an operating surface 1620 and a virtual reality headset 1630. The operating surface 1620 includes a plurality of sensors 1622 (e.g., infrared sensors) at or near corners of one or more rectangular-shaped layers or substrates. The operating surface 1620 further includes a number of feedback devices provided along a perimeter of the operating surface 1620, including a plurality of haptic feedback elements 1624-1 and a plurality of audio speakers 1624-2. Alternatively or additionally, the virtual reality system 1600 may further include one or more base stations (not shown). The haptic feedback elements 1624-1 may be any type or form of physical components that may be automatically controlled or configured to generate tactile vibrations of any frequency or intensity. The audio speakers 1624-2 may be any type or form of components for converting electrical signals into sound energy such as electrodynamic speakers, electrostatic speakers, flat-diaphragm speakers, magnetostatic speakers, magnetostrictive speakers, ribbon-driven speakers, planar speakers, plasma arc speakers, or others.

As is shown in FIG. 16B, when the user 1635 approaches or breaches a virtual boundary of an operating area defined by the positions of the sensors 1622 at least in part, one or more of the haptic feedback elements 1624-1 and/or the audio speakers 1624-2 may provide vibratory or audible feedback to the user 1635. Any type or form of feedback may be provided to the user 1635. In some embodiments, the vibratory or audible feedback may be selected based on a virtual reality experience in which the user 1635 is a participant. For example, as is shown in FIG. 16B, the audible feedback provided to the user 1635 by the audio speakers 1624-2 may include sounds associated with one or more video games, virtual tours, news or educational programs, or any other content rendered by the virtual reality headset 1630 (e.g., "roar!" or "watch out for dinosaurs!"). Likewise, the type or form of feedback may be indicative of whether the user 1635 has merely approached a virtual boundary of the operating area 1650, or has actually breached the operating area 1650. For example, the haptic feedback elements 1624-1 may generate tactile vibrations at a first frequency or intensity when the user 1635 approaches a virtual boundary, and may generate tactile vibrations at a second frequency or intensity when the user 1635 has breached the virtual boundary.

The specific feedback elements that are used to provide feedback to the user 1635 may be selected in any manner. For example, when the user 1635 approaches or breaches the operating area 1635 feedback may be provided by each of the haptic feedback elements 1624-1 and/or each of the audio speakers 1624-2 on the operating surface 1620, or only by specific haptic feedback elements 1624-1 and/or the specific audio speakers 1624-2 closest to the user 1635 at the time of his or her approach or breach. Furthermore, feedback provided by the haptic feedback elements 1624-1 or the audio speakers 1624-2 may be augmented by visual feedback rendered on one or more displays within the headset 1630. Moreover, one or more of the operating surfaces of the present disclosure may be configured to provide passive feedback to a user. For example, an upper layer of an operating surface may have a distinct texture or feel that may indicate to a user when he or she is on the operating surface while he or she is using a virtual reality system. Conversely, when the user no longer experiences the distinct texture or feel, the user may discern that he or she is no longer on the operating surface.

The sensors and/or the fiducial markings of the present disclosure may also aid a virtual reality system in making more accurate measurements of users thereof. For example, where an operating surface includes a plurality of sensors distributed thereon at predetermined distances or intervals, or one or more fiducial markings having known dimensions provided thereon, imaging data captured of a user on the operating surface may be used to determine dimensions of the user, e.g., by comparison to such predetermined distances or intervals, or such known dimensions. The dimensions of the user may be used for any purpose, including but not limited to enhancing a virtual reality experience of the user, by ensuring that the experience is properly adapted for the dimensions of the user.

Figure 17:
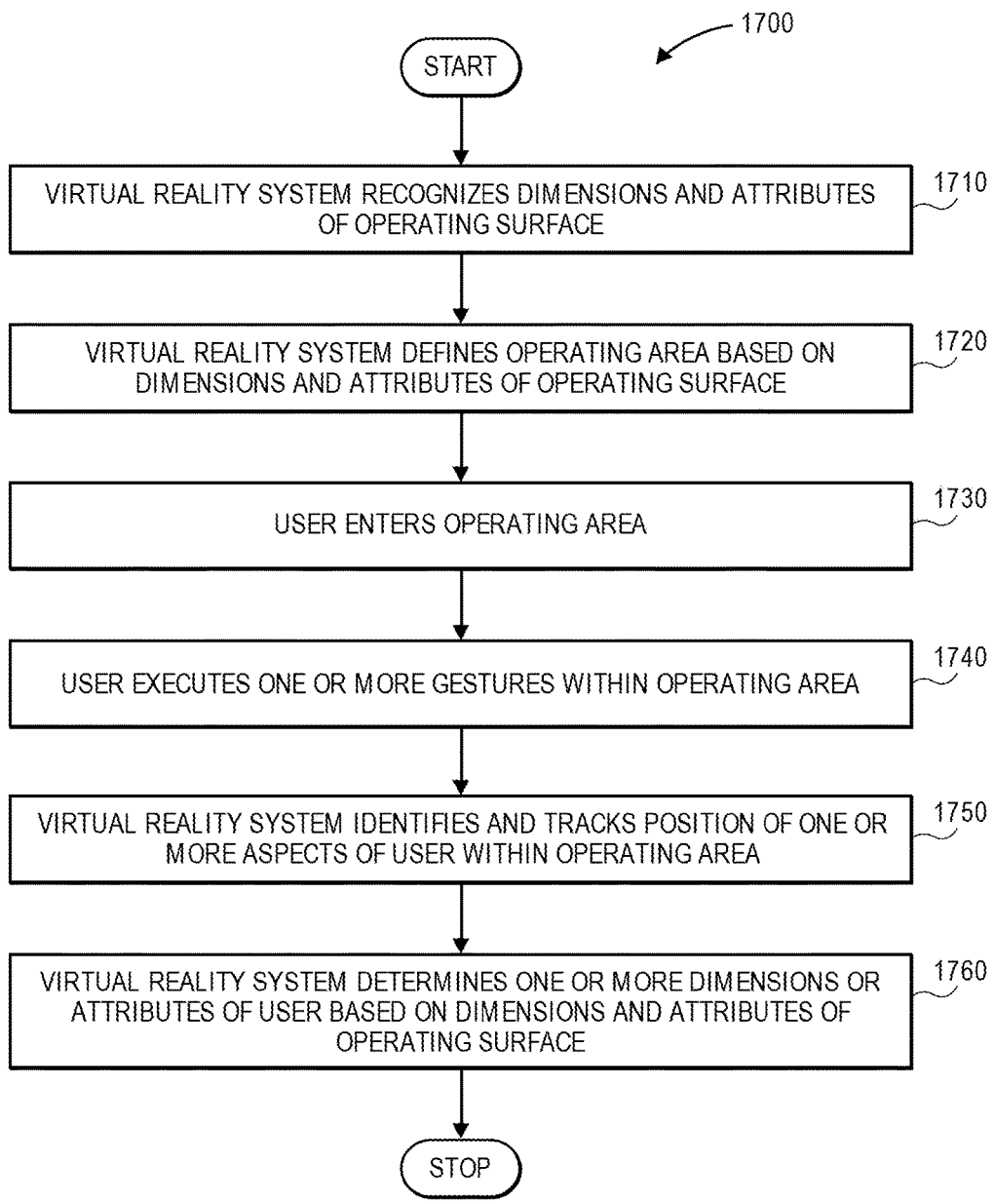
FIG. 17 is a flow chart of one process for defining an operating area for virtual reality systems in accordance with embodiments of the present disclosure.

Referring to FIG. 17, a flow chart 1700 of one process for defining an operating area for virtual reality systems in accordance with embodiments of the present disclosure is shown. At box 1710, a virtual reality system recognizes the dimensions and attributes of an operating surface. For example, the operating surface may include one or more sensors, e.g., infrared sensors, and the dimensions and/or attributes may be determined in response to signals transmitted or received by such sensors. The operating surface may also include one or more fiducial markings thereon, and the dimensions and/or attributes may be determined based on imaging data captured from the operating surface. The dimensions and/or attributes of the operating surface may be determined in any manner, in accordance with the present disclosure.

At box 1720, the virtual reality system defines an operating area based on the dimensions and attributes of the operating surface determined at box 1710. For example, the operating area may be defined by one or more virtual boundaries, which may include a plurality of points within one or more planar sections defined by line segments extending between positions of sensors and rays extending vertically upward from such positions, or defined by aspects of one or more fiducial markings (e.g., line segments, arcs or other sections, such as curvilinear sections), and rays extending vertically upward from such aspects. The operating area may be further defined to include a virtual floor constructed from one or more of the positions of the sensors, or one or more of the aspects of the fiducial markings, and any number of points in space associated with such positions or aspects.

At box 1730, a user enters the operating area, and at box 1740, the user executes one or more gestures within the operating area. For example, the user may don a virtual reality headset, or carry one or more virtual reality units into the operating area, and perform any number of predetermined or spontaneous gestures, motions or other actions as the locations of one or more of his or her body parts are tracked by the virtual reality system. For example, the user may stand, walk, twirl, jump, dance or perform any other actions within the operating area. Alternatively, the user need not wear a virtual reality headset or carry any virtual reality units into the operating area, and his or her gestures, motions or actions may be tracked by a base station (e.g., a visual imaging device and/or a depth imaging device) or one or more sensors provided on a body of the user.

At box 1750, the virtual reality system identifies and tracks the positions of one or more aspects of the user within the operating area, e.g., the limbs, the head, the torso or other features of the user, as the user executes the one or more gestures within the operating area. The virtual reality system may track such positions based on one or more sensors worn by the user, e.g., in a virtual reality headset or other wearable systems, or carried by the user, e.g., on a virtual reality controller. Alternatively, the virtual reality system may track such positions using an imaging device, e.g., a visual imaging device and/or a depth imaging device, and processing imaging data captured thereby to recognize specific limbs or other body parts.

At box 1760, the virtual reality system determines one or more dimensions or attributes of the user based on the dimensions and attributes of the operating surface, and the process ends. For example, where the operating area is defined by a mat having four sensors arranged in a rectangle having known dimensions of five feet by seven feet (5 ft), dimensions of a user such as lengths, circumferences, diameters or thicknesses of heads, necks, shoulders, backs, arms, waists, hips, seats, legs or feet may be determined with respect to the positions of the sensors and the dimensions of the rectangle. Alternatively, where the operating area is defined by a carpet having a fiducial marking in the form of a visually prominent circular logo having a known diameter of four feet (4 ft), dimensions of the user may be determined with respect to the dimensions of the logo.

Figure 18A:
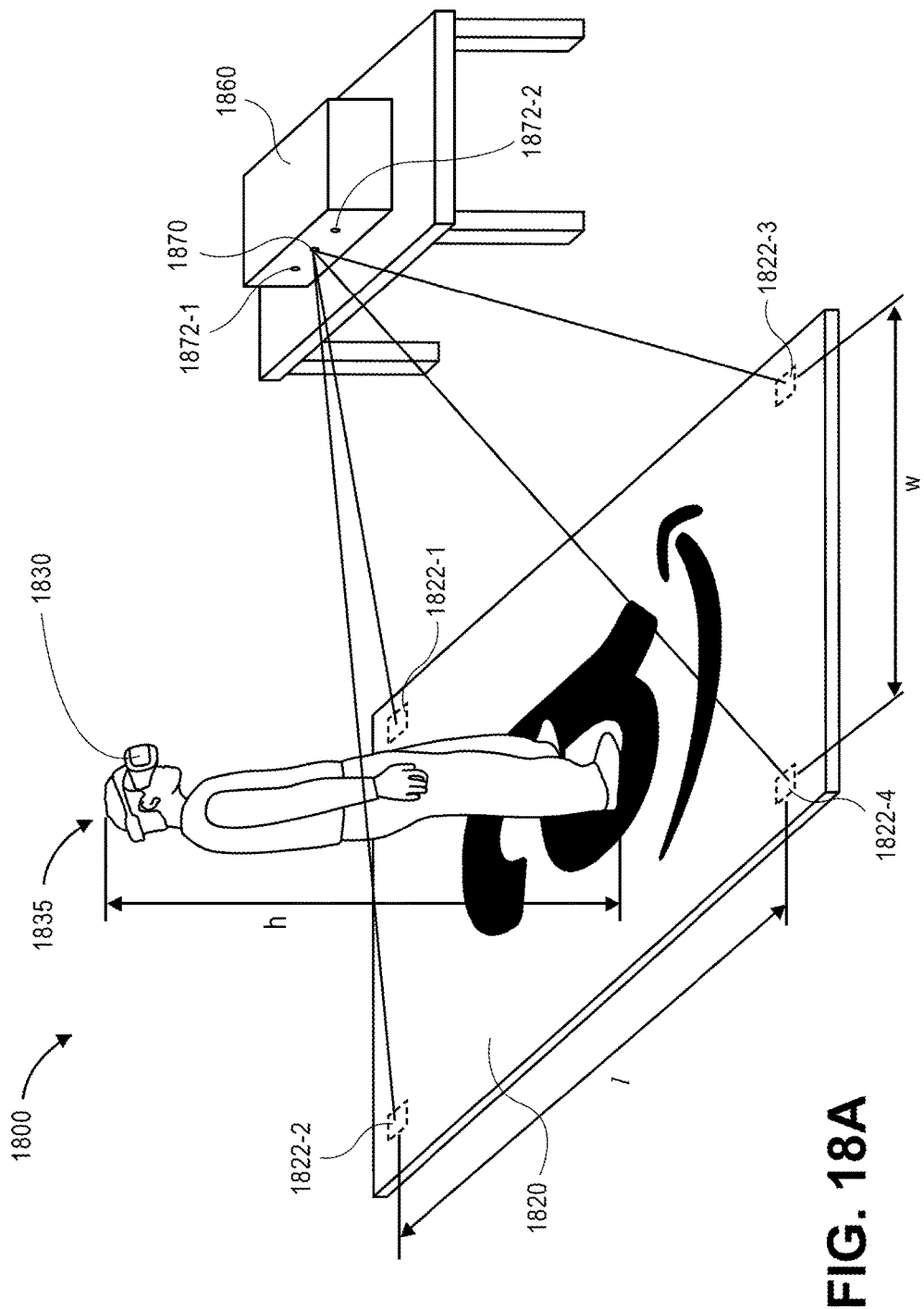

Referring to FIGS. 18A and 18B, views of aspects of one virtual reality system in accordance with embodiments of the present disclosure are shown. Except where otherwise noted, reference numerals preceded by the number "18" shown in FIGS. 18A and 18B indicate components or features that are similar to components or features having reference numerals preceded by the number "16" shown in FIGS. 16A and 16B, by the number "15" shown in FIGS. 15A through 15C, by the number "14" shown in FIGS. 14A through 14E, by the number "13" shown in FIG. 13A or 13B, by the number "12" shown in FIGS. 12A through 12D, by the number "10" shown in FIG. 10, by the number "9" shown in FIG. 9A or 9B, by the number "8" shown in FIG. 8A or 8B, by the number "7" shown in FIG. 7, by the number "6" shown in FIG. 6, by the number "4" shown in FIG. 4, by the number "2" shown in the block diagram of FIG. 2 or by the number "1" shown in the system 100 of FIGS. 1A through 1E.

As is shown in FIG. 18A, a virtual reality system 1800 includes an operating surface 1820, a virtual reality headset 1830 and a base station 1860. The operating surface 1820 is in the shape of a rectangle, and includes a plurality of sensors 1822-1, 1822-2, 1822-3, 1822-4 (e.g., infrared sensors) at or near corners of the operating surface 1820, separated by a length l and a width w. The base station 1860 includes an infrared transceiver 1870, a visual imaging device 1872-1 and a depth imaging device 1872-2. A user 1835 having a height h is shown as standing on the operating surface 1820, wearing the virtual reality headset 1830.

As is shown in FIG. 18B, when the user 1835 lays down atop an upper layer of the operating surface 1820, the height h of the user 1835 may be determined with respect to the length l between the sensor 1822-2 and the sensor 1822-4, or between the sensor 1822-1 and the sensor 1822-3. Alternatively, one or more additional dimensions or other attributes of the user 1835 may be determined with respect to the length l, the width w between the sensor 1822-1 and the sensor 1822-2 or between the sensor 1822-3 and the sensor 1822-4, or any other dimension or attribute of the operating surface 1820.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein refer to head-mounted virtual reality systems, the systems and methods of the present disclosure are not so limited, and may be utilized in connection with any type or form of virtual reality system, and need not be limited for use in virtual reality systems that are mounted to heads (e.g., headsets, goggles or glasses). Additionally, although some of the embodiments disclosed herein refer to ground-based operating surfaces (e.g., mats), the systems and methods of the present disclosure are not so limited, and may be utilized in connection with operating surfaces provided at any angle or orientation, or with sensors or other components that are not associated with any type or form of surface at all, such as one or more of the sensors shown in FIGS. 14A through 14D.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5, 11 or 17, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an application-specific integrated circuit, or ASIC, which can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A virtual reality system comprising:
    an operating surface having a first plurality of infrared sensors, wherein the first plurality of infrared sensors comprises a first infrared sensor, a second infrared sensor, a third infrared sensor and a fourth infrared sensor;
    a headset comprising:
        a frame adapted for mounting about a human head, wherein the frame defines an interior cavity having a first opening and a second opening, and wherein the interior cavity is adapted for mating with at least a portion of a face of the human head;
        a first display mounted within the first opening of the frame, wherein the first display is adapted to display imaging data for viewing by a left eye of the face;
        a second display mounted within the second opening of the frame, wherein the second display is adapted to display imaging data for viewing by a right eye of the face; and
    a base station comprising at least one infrared transceiver and at least one computer processor, wherein the at least one computer processor is configured to at least:
        emit first infrared light by the infrared transceiver;
        determine, in response to the first infrared light, a first position of the first infrared sensor;
        determine, in response to the first infrared light, a second position of the second infrared sensor;
        determine, in response to the first infrared light, a third position of the third infrared sensor;
        determine, in response to the first infrared light, a fourth position of the fourth infrared sensor; and
        define an operating area for the virtual reality system based at least in part on the first position, the second position, the third position and the fourth position.

2. The virtual reality system of claim 1, wherein the at least one computer processor is further configured to at least:
    construct a first virtual boundary, wherein the first virtual boundary comprises a first plurality of points within a first planar section defined at least in part by a first line segment extending between the first position and the second position and between a first ray extending vertically upward from the first position and a second ray extending vertically upward from the second position;
    construct a second virtual boundary, wherein the second virtual boundary comprises a second plurality of points within a second planar section defined at least in part by a second line segment extending between the second position and the third position and between the second ray and a third ray extending vertically upward from the third position;
    construct a third virtual boundary, wherein the third virtual boundary comprises a third plurality of points within a third planar section defined at least in part by a third line segment extending between the third position and the fourth position and between the third ray and a fourth ray extending vertically upward from the fourth position; and
    construct a fourth virtual boundary, wherein the fourth virtual boundary comprises a fourth plurality of points within a fourth planar section defined at least in part by a fourth line segment extending between the fourth position and the first position and between the fourth ray and a first ray,
    wherein the operating area is defined at least in part by the first virtual boundary, the second virtual boundary, the third virtual boundary and the fourth virtual boundary.

3. The virtual reality system of claim 2, wherein the at least one computer processor is further configured to at least:
    construct a virtual floor, wherein the virtual floor comprises a fifth plurality of points within a fifth planar section defined by the first line segment, the second line segment, the third line segment and the fourth line segment,
    wherein the operating area is defined at least in part by the first virtual boundary, the second virtual boundary, the third virtual boundary, the fourth virtual boundary and the virtual floor.

4. The virtual reality system of claim 1, wherein the headset further comprises at least a fifth infrared sensor, and wherein the at least one computer processor is further configured to at least:
    emit second infrared light by the infrared transceiver;
    determine, in response to the second infrared light, a fifth position of the fifth infrared sensor;
    determine that the fifth position is not within the operating area; and
    cause a display of information on at least one of the first display or the second display, wherein the information comprises an indication that the headset is not within the operating area.

5. A computer-implemented method comprising:
    receiving at least a first signal transmitted by a first sensor and a second signal transmitted by a second sensor, wherein each of the first sensor and the second sensor is joined to at least one substrate, and wherein each of the first sensor and the second sensor is separated by a predetermined distance within the at least one substrate;

determining, by at least one computer processor, a first position of the first sensor based at least in part on the first signal;

determining, by the at least one computer processor, a second position of the second sensor based at least in part on the second signal;

defining, by the at least one computer processor, a first virtual boundary based at least in part on the first position and the second position; and establishing, by the at least one computer processor, an operating area for a virtual reality system based at least in part on the first virtual boundary.

6. The computer-implemented method of claim 5, wherein the first virtual boundary comprises a first plurality of points within a first planar space defined at least in part by:

a first line segment extending between the first position and these second position;

a first ray extending vertically upward from the first position; and a second ray extending vertically upward from the second position.

7. The computer-implemented method of claim 5, wherein the at least one substrate is formed from at least one of a wool, a nylon, a polypropylene, a polyester, a rubber, an acrylic, a cotton or a linen.

8. The computer-implemented method of claim 5, further comprising:

determining an orientation of the at least one substrate based at least in part on the first position, the second position and the predetermined distance, wherein the first virtual boundary is defined based at least in part on the orientation of the at least one substrate.

9. The computer-implemented method of claim 5, wherein a visible surface of the at least one substrate comprises at least one fiducial marking thereon, and wherein the computer-implemented method further comprises:

capturing, by at least one imaging device, at least one image of at least a portion of the visible surface; and recognizing at least a portion of the fiducial marking within the at least one image, wherein the portion of the fiducial marking comprises at least one of an edge, a contour, an outline, a color, a texture, a silhouette or a shape of the fiducial marking, and wherein at least the first virtual boundary is defined based at least in part on at least the portion of the fiducial marking.

10. The computer-implemented method of claim 5, wherein the at least one material layer further comprises at least one haptic feedback element.

11. The computer-implemented method of claim 5, wherein a plurality of sensors is joined to the at least one substrate, wherein each of the plurality of sensors is arranged in an array, and wherein the plurality of sensors includes at least the first sensor and the second sensor.

12. The computer-implemented method of claim 11, wherein receiving at least the first signal and the second signal comprises:

receiving a plurality of signals from at least some of the plurality of sensors, wherein the plurality of signals includes at least the first signal and the second signal, and wherein the at least some of the plurality of sensors includes at least the first sensor and the second sensor;

determining positions of the at least some of the plurality of sensors; and defining a virtual floor based at least in part on the positions of the at least some of the plurality of sensors.

13. The computer-implemented method of claim 5, further comprising:

determining, by the at least one computer processor, a position of at least a portion of at least one user of the virtual reality system;

determining that the position of at least the portion of the at least one user is not within the operating area; and in response to determining that the position of at least the portion of the at least one user is not within the operating area, providing feedback to the at least one user.

14. The computer-implemented method of claim 13, wherein determining the position of at least the portion of the at least one user comprises:

determining, by the at least one computer processor, a position of at least one sensor associated with a virtual reality headset worn by the at least one user, and wherein providing the feedback to the at least one user comprises:

causing a display of information on at least one display of the virtual reality headset, wherein the information comprises an indicator that at least the portion of the at least one user is not within the operating area.

15. The computer-implemented method of claim 5, wherein at least the first sensor is an infrared sensor comprising a photodiode and at least one integrated circuit, and wherein receiving at least the first signal and the second signal comprises:

receiving the first signal in response to activation of the photodiode by infrared light.

16. The computer-implemented method of claim 15, further comprising:

emitting the infrared light by at least one infrared transceiver of a base station of the virtual reality system, wherein the base station further comprises the at least one computer processor.

17. The computer-implemented method of claim 16, wherein the base station further comprises at least one imaging device including at least a portion of the operating area within a field of view, and wherein the computer-implemented method further comprises:

capturing, by the at least one imaging device, at least one image of at least the portion of the operating area;

determining, by the at least one computer processor, that the at least one image depicts at least a portion of at least one user of the virtual reality system therein; and determining, by the at least one computer processor, at least one dimension of the least one user based at least in part on:

a distance between the first position and the second position; and at least the portion of the at least one user depicted in the at least one image.

18. The computer-implemented method of claim 5, wherein receiving at least the first signal transmitted by the first sensor and the second signal transmitted by the second sensor comprises:

receiving a third signal transmitted by a third sensor, wherein the third sensor is not joined to the at least one substrate, and wherein the computer-implemented method further comprises:

determining, by the at least one computer processor, a third position of the third sensor based at least in part on the third signal; and defining, by the at least one computer processor, a second virtual boundary based at least in part on the third position, wherein the operating area is established based at least in part on the second virtual boundary.

19. An operating surface comprising:
a first layer formed at least in part from at least one of a wool, a nylon, a polypropylene, a polyester, an acrylic, a cotton or a linen, wherein the first layer has a width and a length;
a second layer formed at least in part from a rubber, wherein the second layer is joined to the first layer, and wherein the second layer has the width and the length;
a first infrared sensor comprising a first photodiode and a first integrated circuit, wherein the first integrated circuit is configured to generate a first signal in response to activation of the first photodiode by infrared radiation, and wherein at least a portion of the first infrared sensor is joined to at least one of the first layer or the second layer; and
a second infrared sensor comprising a second photodiode and a second integrated circuit, wherein the second integrated circuit is configured to generate a second signal in response to activation of the second photodiode by infrared radiation, and wherein at least a portion of the second infrared sensor is joined to at least one of the first layer and the second layer.

20. The operating surface of claim 19, further comprising:
a plurality of infrared sensors arranged in an array, wherein the plurality of infrared sensors includes the first infrared sensor and the second infrared sensor,
wherein each of the infrared sensors comprises a photodiode and an integrated circuit configured to generate a signal in response to activation of the photodiode by infrared light, and
wherein at least a portion of each of the plurality of infrared sensors is disposed between the first layer.

* * * * *